United States Patent
Kleinberger et al.

(10) Patent No.: US 7,072,902 B2
(45) Date of Patent: Jul. 4, 2006

(54) METHOD AND SYSTEM FOR ORGANIZING OBJECTS ACCORDING TO INFORMATION CATEGORIES

(76) Inventors: Paul Kleinberger, 4 Hamaapilim, Jerusalem (IL), 92545; Shlomo Bezem, 697 Har Ramon Street, Macabim (IL), 71908; Yoav Ezer, 27 Alkihi Street, Jerusalem (IL), 93807; Guy Hachlili, 32 Alkihi Street, Jerusalem (IL), 93807; Ron Jacobson, 1 Brazil Street, Tel Aviv (IL), 69710; Nimrod Sandlerman, 44 Churgin Street, Ramat Gan (IL), 52356; Doron Zilberman, 4 Rabinowitz Street, Holon (IL), 85672

(*) Notice: Subject to any disclaimer, the term of this patent is extended or adjusted under 35 U.S.C. 154(b) by 159 days.

(21) Appl. No.: 10/308,987

(22) Filed: Nov. 26, 2002

(65) Prior Publication Data

US 2003/0145002 A1    Jul. 31, 2003

Related U.S. Application Data

(63) Continuation of application No. PCT/IL01/00486, filed on May 25, 2001.
(60) Provisional application No. 60/208,110, filed on May 26, 2000.

(51) Int. Cl.
G06F 7/30 (2006.01)
G06F 7/10 (2006.01)

(52) U.S. Cl. ............ 707/102; 707/101; 707/104.1
(58) Field of Classification Search .......... 707/1–104.1
See application file for complete search history.

(56) References Cited

U.S. PATENT DOCUMENTS

| | | | | |
|---|---|---|---|---|
| 4,972,349 A | * | 11/1990 | Kleinberger | 707/1 |
| 5,050,071 A | | 9/1991 | Harris et al. | |
| 5,062,074 A | | 10/1991 | Kleinberger | |
| 5,619,709 A | * | 4/1997 | Caid et al. | 715/532 |
| 5,642,502 A | * | 6/1997 | Driscoll | 707/5 |
| 5,790,121 A | * | 8/1998 | Sklar et al. | 345/853 |
| 5,832,182 A | | 11/1998 | Zhang et al. | |
| 5,926,812 A | * | 7/1999 | Hilsenrath et al. | 707/5 |
| 6,029,195 A | * | 2/2000 | Herz | 725/116 |
| 6,041,311 A | * | 3/2000 | Chislenko et al. | 705/27 |
| 6,049,797 A | * | 4/2000 | Guha et al. | 707/6 |
| 6,236,987 B1 | * | 5/2001 | Horowitz et al. | 707/3 |
| 6,243,094 B1 | * | 6/2001 | Sklar | 345/853 |
| 6,263,334 B1 | | 7/2001 | Fayyad et al. | |
| 6,286,012 B1 | * | 9/2001 | Kindo et al. | 707/104.1 |
| 6,289,354 B1 | | 9/2001 | Aggarwal et al. | |
| 6,360,227 B1 | * | 3/2002 | Aggarwal et al. | 707/102 |
| 6,397,166 B1 | * | 5/2002 | Leung et al. | 702/179 |
| 6,411,724 B1 | * | 6/2002 | Vaithilingam et al. | 382/100 |
| 6,446,083 B1 | * | 9/2002 | Leight et al. | 707/104.1 |
| 6,510,436 B1 | * | 1/2003 | Hart | 707/102 |
| 6,567,797 B1 | * | 5/2003 | Schuetze et al. | 707/2 |
| 6,631,365 B1 | * | 10/2003 | Neal et al. | 707/2 |

\* cited by examiner

*Primary Examiner*—Luke S Wassum
*Assistant Examiner*—Linh Black
(74) *Attorney, Agent, or Firm*—Darby & Darby

(57) ABSTRACT

A method and system of organizing items including building up clusters of items, each item having information associated therewith, during building up of the clusters evaluating dynamically a metric of the cluster, the metric of the cluster expressing at least whether the items in a cluster have more in common with each other than they have in common with items outside of the cluster.

522 Claims, 34 Drawing Sheets

Score of second book: 0.416

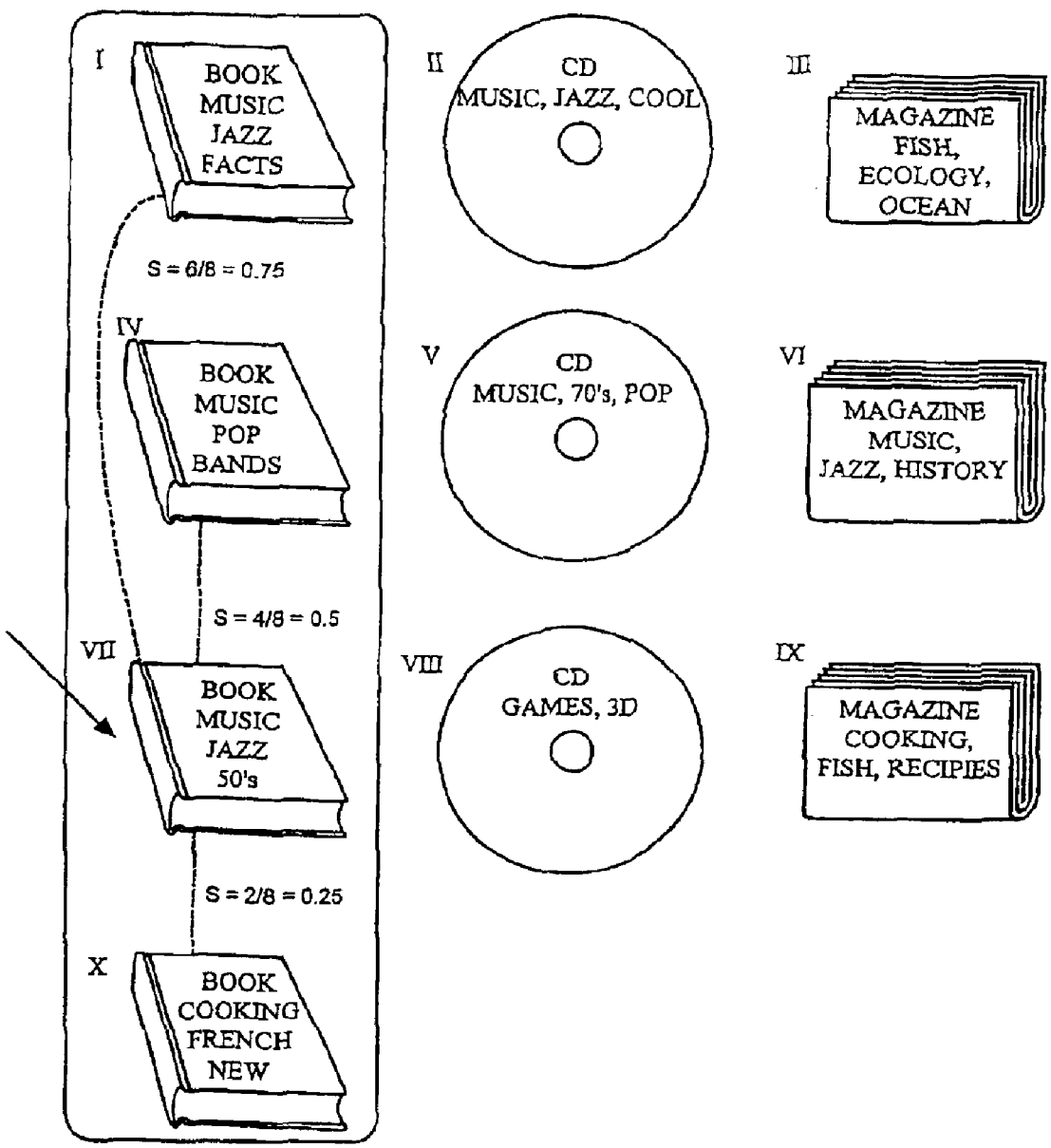

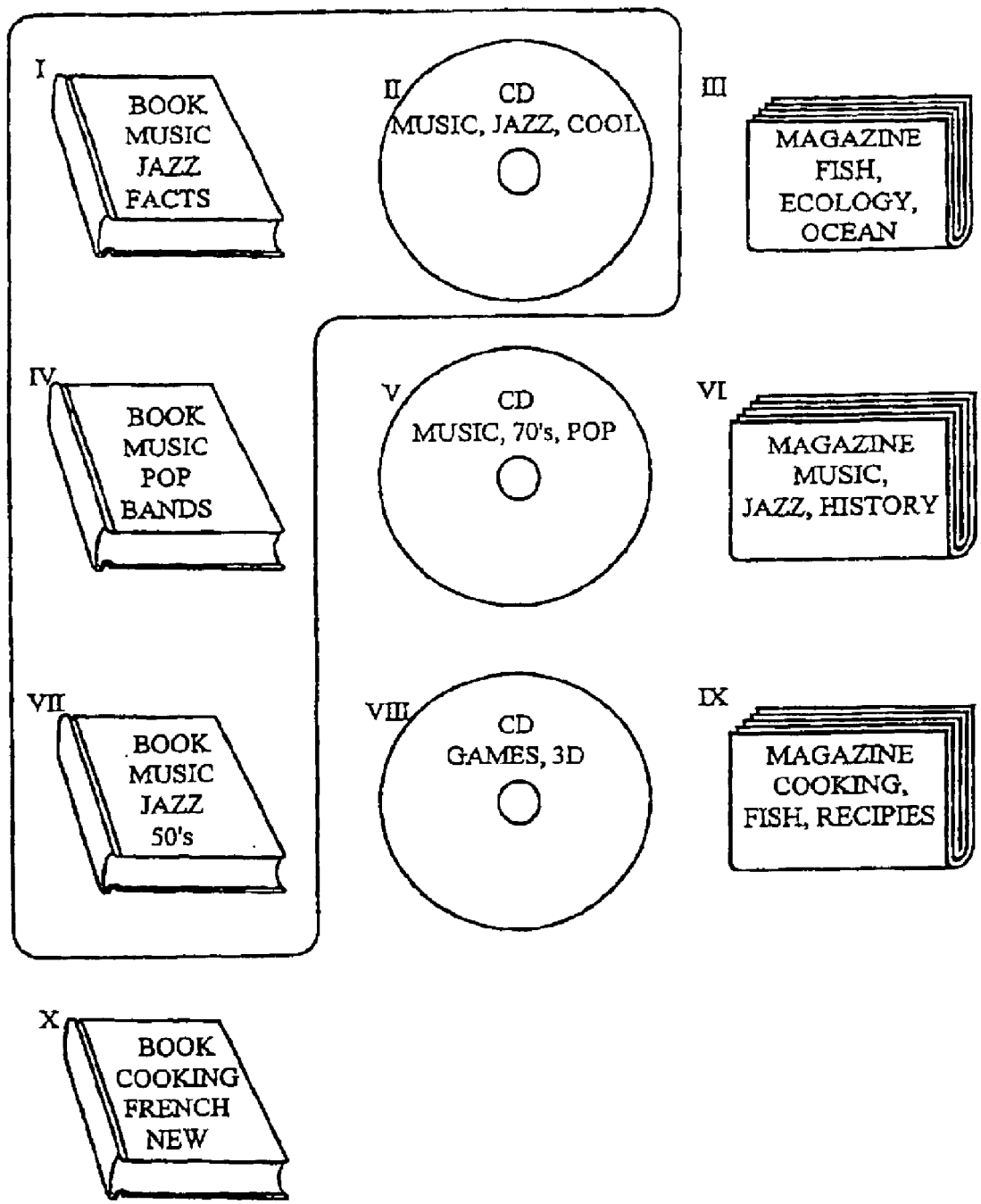

METHOD AND SYSTEM FOR ORGANIZING OBJECTS ACCORDING TO INFORMATION CATEGORIES

This is a continuation of international application Ser. No. PCT/IL01/00486, filed May 25, 2001, which claims priority of U.S. Provisional Patent Application No. 60/208,110, filed May 26, 2000, the entire disclosure of which is hereby incorporated by reference.

FIELD OF THE INVENTION

The present invention relates to systems and methodologies for organizing objects and for presenting objects in an organized manner.

BACKGROUND OF THE INVENTION

The following U.S. patents are believed to represent the most relevant prior art: U.S. Pat. Nos. 5,062,074; 5,050,071 and 4,972,349.

SUMMARY OF THE INVENTION

The present invention is especially useful when searching for specific information in a mass of information such as in performing a search in the Internet. It is appreciated that the present invention is also applicable to the retrieval and sorting of information from any suitable collection of information such as that available via intranets, extranets and other computer systems and networks.

There are two basic methods for searching for information: directory searching and free text searching.

Directory searching requires a mass of information to be organized in a hierarchical tree of subjects before the search begins. The user then selects the most relevant subject in the highest (root) menu and repeats the selection until the required information item is found. This is very effective for novice users since it does not require prior knowledge of the subject matter. However, the directory searching method but has three major disadvantages:
1. Directory searching applies only to information items that have been sorted into the tree of subjects.
2. The tree of subjects is determined for a general use and not for the particular needs of the current search.
3. An information item that contains several parts is usually sorted as a single entity.

The result is that the user may not find the way in the tree to the required information items.

Free text searching does not require pre-sorting and is not subject to any prior taxonomy and sorting. Therefore information retrieval services that employ free text search engines have much larger information content than directory services. The search engine retrieves all information items that contain the terms set in the user's query. Some search engines support sophisticated queries. The result of the search is presented to the user as a sequential list of information items with very limited information about each item. A major disadvantage of the free text search is that the result of the search contains too much information that is totally irrelevant to the needs of the user and the relevant information is buried down in the list.

Many search engines provide sorting of the retrieved information items by relevance. There are many methods for evaluating the relevance of the retrieved information items. However in most cases the user has no control over the algorithm that evaluates the relevance. A few search engines provide a limited control over the relevance sorting but these features are not applicable for novice users. The result is that the required information items retrieved by the user's query may be presented to the user far down the list.

The present invention seeks to provide the user with a directory tree prepared for the results of a free text search. This enables the user to ignore most of the retrieved information that is obviously irrelevant to its current needs and concentrate in tree branches that are most likely to contain the required information.

It is a further advantage of the present invention that the directory tree is built generally instantaneously and contains only information retrieved by the user's query and does not contain information that does not comply with the user's needs as presented in the user's query.

It is a even further advantage of the present invention that the directory tree is built for subjects that are selected from the information retrieved by the user's query.

It is still further an advantage of the present invention that the information items are grouped according to their mutual affinity based on several subjects. The common method is to associate an information item to a directory subject according to the relevance of the item to the subject.

It is a further advantage of the present invention that the directory tree is organized, and the information items are sorted into the directory tree, based on commonality metric that involves several terms.

It is still further an advantage of the present invention that the directory tree is organized, and the information items are sorted into the directory tree, based on a commonality metric that involves terms that were not necessarily specified by the user and were derived from the information items retrieved by the user's query.

It is known that automatic clustering of information may be disadvantageous when compared to manual clustering, as shown by the following examples:

Insufficient clustering may occur. For example, information items regarding Washington the person, Washington the city and Washington the state may be grouped into a single cluster.

Redundant clustering may occur. For example, information items regarding President Washington and items regarding George Washington may be grouped into two different clusters.

An advantage of the present invention is that the directory tree is organized, and the information items are sorted into the directory tree, based on a commonality metric that involves a plurality of terms, which need not be specified by the user and may be derived automatically from the information items retrieved by the user's query.

It is a further advantage of the present invention that the directory tree is organized, and the information items are sorted into the directory tree, based on a metric of lack of commonality between information items. This metric also involves a plurality of terms, which need not be specified by the user and may be derived automatically from the information items retrieved by the user's query.

It is a still further advantage of the present invention that the directory tree is organized, and the information items are sorted into the directory tree, in an iterative manner where information items are added or removed from clusters to eliminate insufficient or redundant clustering.

It is common with free text search engines that when a large number of information items are found in response to a user's query only a relatively small number of the found items are actually retrieved and presented to the user. It is therefore advantageous to perform a further query that narrows the field of search by adding required terms to the previous query (Boolean AND).

It is even further an advantage of the present invention that further queries are performed in response to a user's request for a particular preferred cluster or automatically for any number of clusters. Thus further information is retrieved and further sub-clustering is made possible.

Furthermore the present invention provides a directory tree for information retrieved from multiple sources.

A primary goal of the present invention is to provide the user with the ability to discard as much as possible of that portion of the retrieved information that the user identifies as irrelevant to the search without requiring the user to individually examine the irrelevant items and to concentrate in the remaining body of the retrieved information that the user identifies as most relevant to the search.

It is therefore important to enable the user to easily identify the irrelevant part or the relevant part of the retrieved information. This is performed in accordance with the present invention by dividing the information into clusters of information items.

The quality of the clustering enables the user to identify that part of the retrieved information which is irrelevant to the search and to select the part of the retrieved information that is most relevant to the search. It is therefore equally useful to cluster together information items that are relevant to the search and can be selected for further search, or to cluster together information items that are all irrelevant to the search and can be discarded.

A goal of the present invention is to reach a state of "best clustering" by creating a method for clustering, measuring the quality of the clustering and optimizing the clustering to reach the highest clustering quality.

There exist two basic options for clustering:
1. Mutually exclusive clustering where an information item can be associated with only one cluster of a given level.
2. Mutually non-exclusive clustering where an information item can be associated with more than one cluster.

There are provided in accordance with the present invention, two principal ways to create preferred clustering:
1. Measure the quality of a cluster, create the most preferred cluster and then create the second most preferred cluster and so on.
2. Measure the quality of a group of clusters, create several alternative groups of clusters and select the best group.

There is thus provided in accordance with a preferred embodiment of the present invention a method of organizing items. The method includes building up clusters of items, each item having information associated therewith, during building up of the clusters evaluating dynamically a metric of the cluster, the metric of the cluster expressing at least whether the items in a cluster have more in common with each other than they have in common with items outside of the cluster.

There is also provided in accordance with another preferred embodiment of the present invention a method of organizing information. The method includes breaking down clusters of information items, during breaking down of the clusters evaluating dynamically a metric of the cluster, the metric of the cluster expressing at least whether the items in a cluster have more in common with each other than they have in common with items outside of the cluster.

There is further provided in accordance with another preferred embodiment of the present invention a method of organizing information. The method includes changing the population of clusters of information items, during changing the population of the clusters, evaluating dynamically a metric of the cluster, the metric of the cluster expressing at least whether the items in a cluster have more in common with each other than they have in common with items outside of the cluster.

There is provided in accordance with yet another preferred embodiment of the present invention a system for organizing items including a cluster generator operative to build up clusters of items, each item having information associated therewith and a dynamic metric evaluator, operative during building up of the clusters evaluating dynamically a metric of the cluster, the metric of the cluster expressing at least whether the items in a cluster have more in common with each other than they have in common with items outside of the cluster.

There is further provided in accordance with yet a further preferred embodiment of the present invention a system for organizing information. The system includes a cluster cracker, breaking down clusters of information items; and a dynamic metric evaluator, during breaking down of the clusters evaluating dynamically a metric of the cluster, the metric of the cluster expressing at least whether the items in a cluster have more in common with each other than they have in common with items outside of the cluster.

There is also provided in accordance with yet a further preferred embodiment of the present invention a system for organizing information. The system includes a cluster population czar, changing the population of clusters of information items and a dynamic metric evaluator, during changing the population of the clusters, evaluating dynamically a metric of the cluster, the metric of the cluster expressing at least whether the items in a cluster have more in common with each other than they have in common with items outside of the cluster.

Further in accordance with a preferred embodiment of the present invention the metric is a commonality metric. Alternatively, the metric is a similarity metric, a non-commonality metric or a non-similarity metric.

Still further in accordance with a preferred embodiment of the present invention each item includes at least one descriptor and the metric expresses at least whether the descriptors of the items in a cluster have more in common with each other than they have in common with items outside of the cluster.

Preferably, a similarity score S is calculated for first and second items, each having at least one descriptor.

Further in accordance with a preferred embodiment of the present invention the similarity score S is calculated for each descriptor in each item of a pair of items, by determining whether the same descriptor exists in both items of the pair. Preferably, the similarity score S is calculated based on descriptors which are not identical but are considered to be identical.

Still further in accordance with a preferred embodiment of the present invention the similarity calculation is carried out on selected descriptors among the descriptors of each item, the selected descriptors being qualified descriptors. Preferably, the qualified descriptors are selected according to a rule the rule includes a rule that only descriptors existing in at least 80% of the items in a particular set of items are qualified descriptors.

Additionally in accordance with a preferred embodiment of the present invention the step of calculating the similarity score includes assigning at least one of a match count and an unmatch count to a pair of items and further includes weighting at least one of the match count and the unmatch count.

Further in accordance with a preferred embodiment of the present invention the metric includes a metric which is equal to the weighted match count. Alternatively, the metric includes a metric which is equal to the weighted unmatch count.

Preferably, the metric includes a function which grows as commonality between the items in the cluster grows and diminishes as uncommonality between the items in the cluster grows.

Further in accordance with a preferred embodiment of the present invention and wherein $$S = \frac{C}{(C+UC)}$$

where S is a symmetry metric, C is the commonality metric and UC is the uncommonality metric.

Alternatively, S=C−UC where S is a symmetry metric and where C is the commonality metric and where UC is the uncommonality metric.

Further in accordance with a preferred embodiment of the present invention the similarity metric may be calculated for all possible item pairs in a collection of items.

Still further in accordance with a preferred embodiment of the present invention a gravity score (GS) is calculated for one item in a collection with respect to a set of items in that collection, each item having at least one descriptor. Preferably, the calculation of the gravity score (GS) for a given item with respect to a given set of items employs the similarity metrics S calculated for each item pair that may be formed including the given item and another item in the set.

Alternatively the calculation of the gravity score (GS) for a given item with respect to a given set of items employs the commonality metrics C for each item pair calculated for each item pair that may be formed including the given item and another item in the set.

Further in accordance with a preferred embodiment of the present invention and wherein $$GSi = \frac{1}{N}\sum_{j=1}^{N} Sij$$

where GSi is gravity score for each given item i with respect to a given set and where Sij is the similarity of item i with respect to item j of the set and where N is the number of items in the set.

Further in accordance with a preferred embodiment of the present invention a cluster quality metric CQM is calculated for a cluster and wherein the cluster is a selected set of items in a collection of items, each item having at least one descriptor. Preferably, the cluster quality metric CQM represents a measure of the quality of differentiation between the cluster and the remaining body of information.

Still further in accordance with a preferred embodiment of the present invention the cluster quality metric CQM includes a function that increases as the cluster increasingly contains information that is substantially similar to the remaining body of the information in the cluster and diminishes as the cluster increasingly contains information that is substantially different from the remaining body of the information in the collection.

Alternatively, the cluster quality metric CQM includes a function that increases as the cluster increasingly contains information that is substantially different from the remaining body of the information in the collection.

Further in accordance with a preferred embodiment of the present invention the cluster quality metric CQM includes a function that diminishes as the cluster increasingly contains information that is substantially similar to the remaining body of the information in the collection.

Preferably, an intra cluster gravity score ICGS is calculated and wherein the intra cluster gravity score represents the similarity among the information items within the cluster.

Additionally or alternatively an intra cluster gravity score ICGS is calculated and wherein the intra cluster gravity score represents the similarity among the information items within the cluster.

Still further in accordance with a preferred embodiment of the present invention an intra cluster gravity score ICGS is calculated and wherein the extra cluster gravity score represents the similarity between the information items within the cluster and information items outside the cluster.

Preferably, an intra cluster gravity score ECGS is calculated and wherein the ECGS is equal to the total of the gravity scores for each item in the cluster with respect to all items outside the cluster in the collection divided by the number of items in the cluster.

Further in accordance with a preferred embodiment of the present invention the cluster quality metric CQM is calculated based on a combination of the Intra-Cluster Gravity Score ICGS and the Extra-Cluster Gravity Score ECGS.

Still further in accordance with a preferred embodiment of the present invention the cluster quality metric CQM increases as an intra-cluster gravity score grows.

Additionally in accordance with a preferred embodiment of the present invention the cluster quality metric CQM increases as an intra-cluster gravity score decreases as an extra-cluster gravity score grows.

Further in accordance with a preferred embodiment of the present invention and wherein $$ICGS = \frac{1}{N} \times \sum_{i=1}^{N} IGSi$$

where item i is a part of a the cluster in a the collection of items, and ICGS is the intra cluster gravity score for the cluster and IGSi is the gravity score for each given item i with respect to the cluster and N is the number of items in the cluster.

Still further in accordance with a preferred embodiment of the present invention and wherein $$ECGS = \frac{1}{N} \times \sum_{i=1}^{N} EGSi$$

where item i is a part of a the cluster in a the collection of items, ECGS is the extra cluster gravity score for the cluster and EGSi is the gravity score for each given item i with respect to the cluster and N is the number of items in the cluster.

Additionally in accordance with a preferred embodiment of the present invention and wherein $$CQM = \frac{ICGS}{ECGS}$$

where CQM is the cluster quality metric, ICGS is the intra cluster gravity score and ECGS is the extra cluster gravity score.

Moreover in accordance with a preferred embodiment of the present invention and wherein CQM=ICGS−ECGS where CQM is the cluster quality metric, ICGS is the intra cluster gravity score and ECGS is the extra cluster gravity score.

Preferably, the cluster quality metric for a cluster is increased by adding or removing items to or from a cluster.

Additionally or alternatively the method for creating a best cluster of items, the method involving creating a cluster, modifying the cluster, measuring the cluster quality metric CQM of the modified cluster and selecting the cluster having the highest CQM.

Further in accordance with a preferred embodiment of the present invention a qualified item for addition to a given cluster is selected and wherein the addition of the qualified item to the cluster provides the highest increase of the Cluster Quality Metric for the given cluster.

Still further in accordance with a preferred embodiment of the present invention a qualified item for removal from a given cluster is selected and wherein the removal of the qualified item from the cluster provides the highest increase of the Cluster Quality Metric for the given cluster.

Alternatively, a given cluster is enhanced by adding and removing items to and from the given cluster.

Preferably, a structure of clusters is created and wherein a first cluster is the most preferred cluster within the collection of items and wherein a second cluster is the most preferred cluster within the first cluster.

Further in accordance with a preferred embodiment of the present invention a structure of clusters is created and wherein a first cluster is the most preferred cluster within the collection of items and wherein a second cluster is the most preferred cluster within the items not included in the first cluster.

Still further in accordance with a preferred embodiment of the present invention a structure of clusters is created and wherein a first cluster is the most preferred cluster within the collection of items and wherein a second cluster is the second most preferred cluster within the same collection of items.

Preferably, a most preferred cluster has the highest Cluster Quality Metric of all possible first clusters available for comparison.

Alternatively, a structure of clusters is presented to the user as a hierarchical tree.

Further in accordance with a preferred embodiment of the present invention all clusters are mutually exclusive. Alternatively, some clusters are mutually non-exclusive.

Additionally in accordance with a preferred embodiment of the present invention a good cluster is identified within a collection of items and wherein the method further includes selecting a group of candidate clusters, each cluster is a set of items having at least one descriptor, calculating cluster quality metric CQM for all the clusters, optionally enhancing the cluster and selecting the cluster having the highest CQM.

Further in accordance with a preferred embodiment of the present invention a group of candidate items is selected by selecting all possible combinations of items within the collection.

Additionally in accordance with a preferred embodiment of the present invention a group of candidate items is selected by selecting a group of randomly chosen sets of items. Alternatively, a group of candidate items is selected by selecting sets of items having descriptors listed in a predetermined list of descriptors.

Preferably, the predetermined list of descriptors is created by choosing descriptors most widely represented in the items of the collection. Alternatively, the selection of qualified items to be added or removed from the cluster in a process of cluster enhancement is that a descriptor is qualified if it is found in at least some percentage.

Further in accordance with a preferred embodiment of the present invention the predetermined list of descriptors is created by choosing descriptors existing in at least 80% of the items in a particular set of items are qualified descriptors.

Preferably, a collection of items is determined to be a qualified items for addition to a cluster and the method also includes determining the qualified descriptors for the collection, determining the number of qualified descriptors for the collection (NQDC) of items, selecting all item of the collection having qualified descriptors (NQDI) of at least some minimum percentage of the number of qualified descriptors (NQDC) for the collection of items.

Alternatively, a collection of items is determined to be qualified items for removal from a cluster. The method also includes determining the qualified descriptors for the cluster, determining the number of qualified descriptors for the cluster (NQDC) and selecting all item of the cluster having number of qualified descriptors (NQDI) of at the most some maximum percentage of the number of qualified descriptors (NQDC) for the cluster.

Preferably, the removal of items from and addition of items to the cluster cause a re-definition of the list of qualified descriptors, thereby giving occasion to additional additions and removals of items.

Preferably, the process of cluster enhancement is repeated either until no change is effected.

Further in accordance with a preferred embodiment of the present invention the process of cluster enhancement is repeated until a set number of iterations have taken place.

Still further in accordance with a preferred embodiment of the present invention the limitation of calculations to qualified descriptors are used for calculating a Cluster Quality Metric CQM: CQM=aX+bY+cV−dU where: a, b, c, d are adjustable coefficients, X is the number of items in the cluster, Y is the number of qualified descriptors in the cluster and V is defined by the following formula:

$$V = \frac{s_1 + s_2 + \ldots + s_y}{X * Y},$$

where $S_1 \ldots S_y$ are, for each qualified descriptor in the cluster, a count of the number of items in the cluster including that descriptor, U is defined by the following formula:

$$U = \frac{r_1 + r_2 + \ldots + r_n}{n * Y},$$

where $r_1 \ldots r_n$ are, for each item of the set outside the cluster, the number of qualified descriptors of the cluster found in that item Further in accordance with a preferred embodiment of the present invention the method includes finding a preferred cluster within a collection of items each having at least one descriptor. The method also includes the following steps: (a). All unique descriptors of the items of the collection are identified, (b). The identified descriptors are ranked according to their popularity in the collection, (c). A "base item" is chosen as a first item of a "base cluster", (d). A plurality of "comparison items" are chosen, (e). the base item is considered to be a first item in a "base cluster", and each comparison item is considered to be a first item in a "comparison cluster", (f). The base cluster, now including all items of the collection having a higher gravity score with respect to the base cluster than with respect to any of the comparison clusters, is retained as the desired preferred cluster for the collection.

Further in accordance with a preferred embodiment of the present invention the identified unique descriptors are the highly ranking descriptors and wherein descriptors that exist in many items of the collection of items are ranked above descriptors existing in few items of the collection.

Preferably, each descriptor receives a rank score equal to the number of items of the collection in which that descriptor exists.

Further in accordance with a preferred embodiment of the present invention the ranking is influenced by a weighting factor dependent on some characteristics of the descriptors. Preferably, the ranking is influenced by a weighting factor dependent on some characteristics of the items in which they appear.

Preferably, the ranking is influenced by a weighting factor dependent on some characteristics of descriptors of items having few descriptors are given greater weight than descriptors of items having many descriptors.

Alternatively, the ranking is influenced by a weighting factor dependent on some characteristics of descriptors which are nouns are given more weight or less weight than descriptors that are other parts of speech such as adjectives.

Preferably, the base item is chosen as that item having the highest-ranking combination of high-ranking descriptors.

Alternatively, the ranking is accomplished by first calculating an item score for each item, which is the sum of the scores for each descriptor of the item. Preferably, the base item is then chosen by identifying the item having the highest item score.

Further in accordance with a preferred embodiment of the present invention a first comparison item is an item having a high item score, yet also having a low similarity score when compared to the base item. Additionally, comparison items are chosen, being items having a high item score, yet also having a low similarity score when compared to the base item and further having a low similarity score when compared to all previously chosen comparison items.

Additionally in accordance with a preferred embodiment of the present invention the method also includes selecting a base cluster and a plurality of comparison clusters, each of these clusters having a single item. Preferably, in step (e) a gravity score is calculated for each item of the collection with respect to the base cluster and with respect to each comparison cluster, and each item is added to the cluster with respect to which it has the highest gravity score. Preferably, in step (e), each item in the collection has been added either to the base cluster or to one of the comparison clusters.

Additionally, steps (a)–(f) may be repeated recursively, taking as the collection referred to in step 1 either the items of the base cluster, disregarding any descriptors common to all the items, or the items of the collection exclusive of the base cluster.

Further in accordance with a preferred embodiment of the present invention the gravity calculations are made only with respect to the qualified descriptors, according to a rule in which the qualified descriptors of any particular cluster are those descriptors appearing in some given percentage P of the items of that cluster.

BRIEF DESCRIPTION OF THE DRAWINGS

The present invention will be understood and appreciated more fully from the following detailed description, taken in conjunction with the drawings in which:

FIGS. 4A–4I are illustrations useful in the understanding of the functionality of FIGS. 3A–3D;

FIGS. 7A, 7B and 7C are illustrations of examples of cluster enhancement employing methodologies described hereinbelow with reference to FIGS. 6A–6C;

DETAILED DESCRIPTION OF PREFERRED EMBODIMENTS

Figure 1:
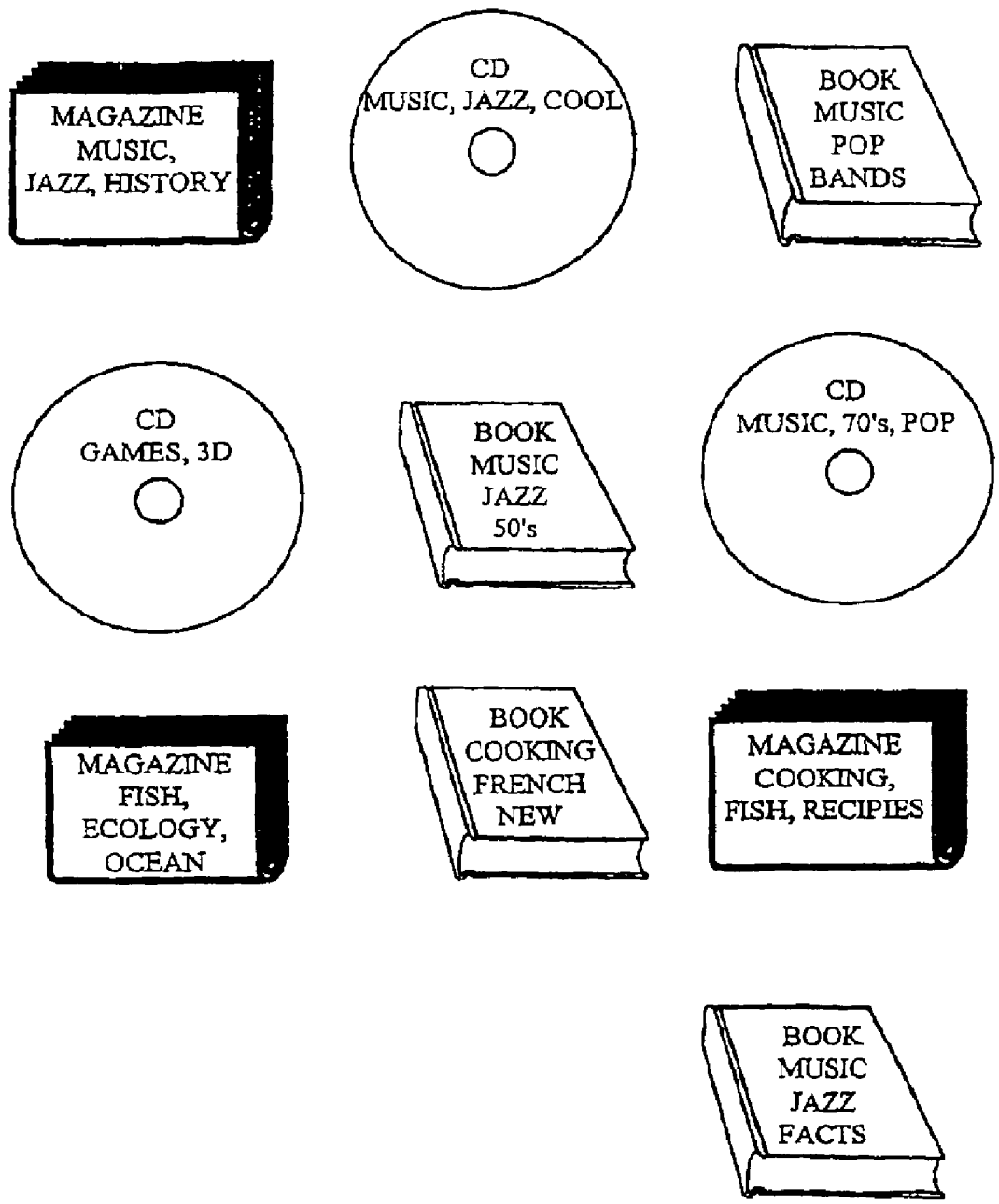
FIG. 1 is an illustration of a disorganized set of objects useful in understanding the operation of a preferred embodiment of the present invention.

Reference is now made FIG. 1, which is an illustration of a disorganized set of objects useful in understanding the operation of a preferred embodiment of the present invention. As seen in FIG. 1, there is provided a disorganized set of objects which includes randomly ordered objects of various types, such as books, CDs (compact discs) and magazines. It is noted that each of the types of objects typically has various characteristics, here termed "descriptors". These descriptors may relate to various aspects of the objects, such as object type (e.g. book, CD, magazine) and content characteristic (e.g. music, cooking, games, ecology, pop, jazz, fish, 50's, 70's, French, new, recipes, ocean, 3-D, bands, facts, cool).

It is appreciated that the disorganized set of objects may be classified into object groups, here termed "clusters". The clusters need not be grouped merely by obvious characteristics, such as, for example, by object type. For example, all red objects may be grouped together, all objects published by Time Warner may be grouped together or all objects relating to Jazz may be grouped together.

Figure 2A:
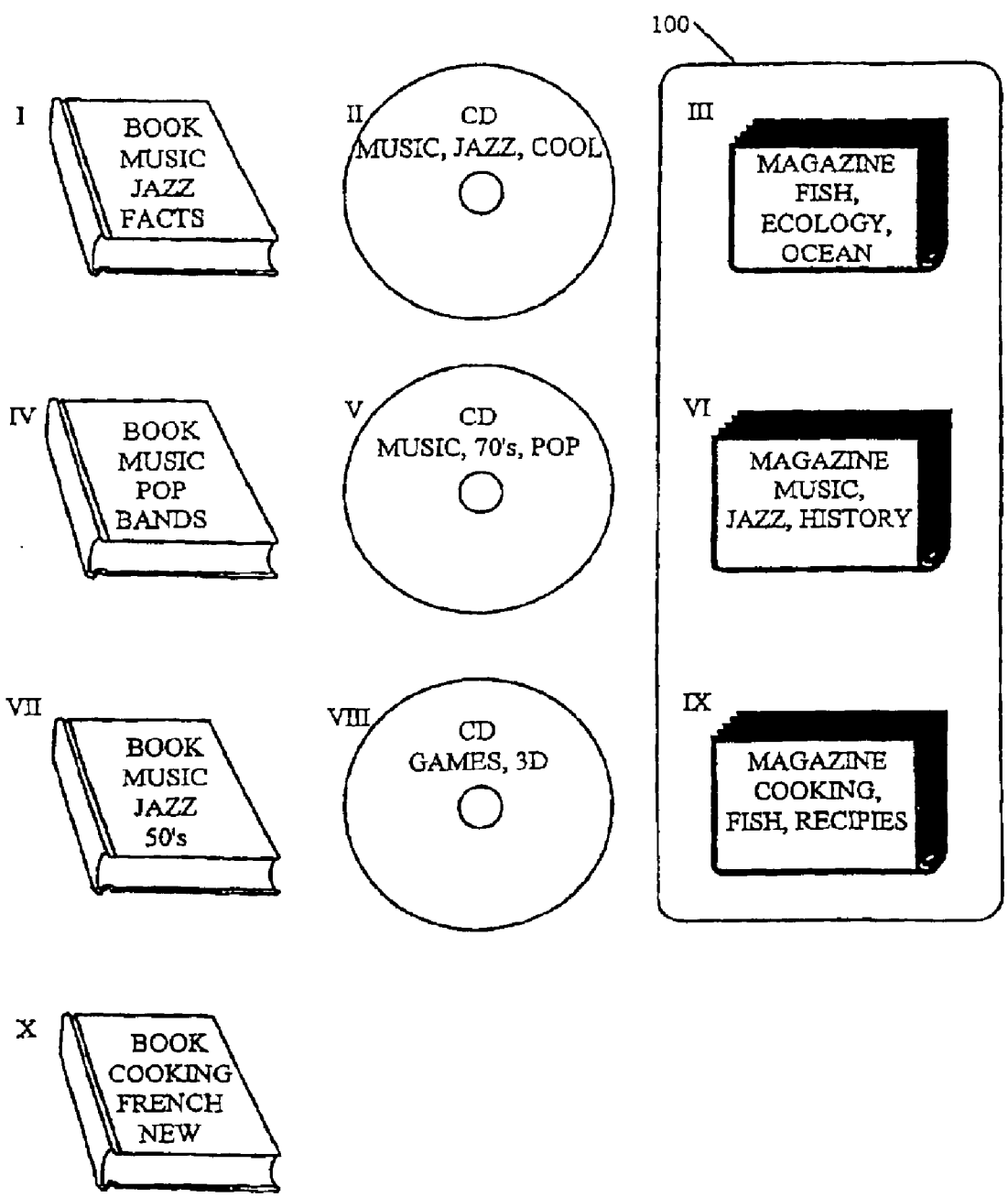
FIGS. 2A and 2B are illustrations of two alternative possibilities of a first clustering of the disorganized set of objects.

Reference is now made to FIG. 2A, which illustrates classification of the disorganized set of objects of FIG. 1 according whether they are magazines. Thus, one sees that in a group 100, there are found magazines relating to various subjects, each such magazine having various and sundry content characteristics. Thus it is seen in FIG. 2A, there remain outside of the MAGAZINES group, various objects of various types, such as books, relating inter alia to cooking and CDs, relating inter alia to jazz music. It is observed that in the classification functionality of FIG. 2A, many of the objects in the MAGAZINES group may be considered to have more in common with objects outside of their own group than they do with objects in their group. This phenomenon is considered to be negative and indicates a sub-optimal grouping functionality.

Figure 2B:
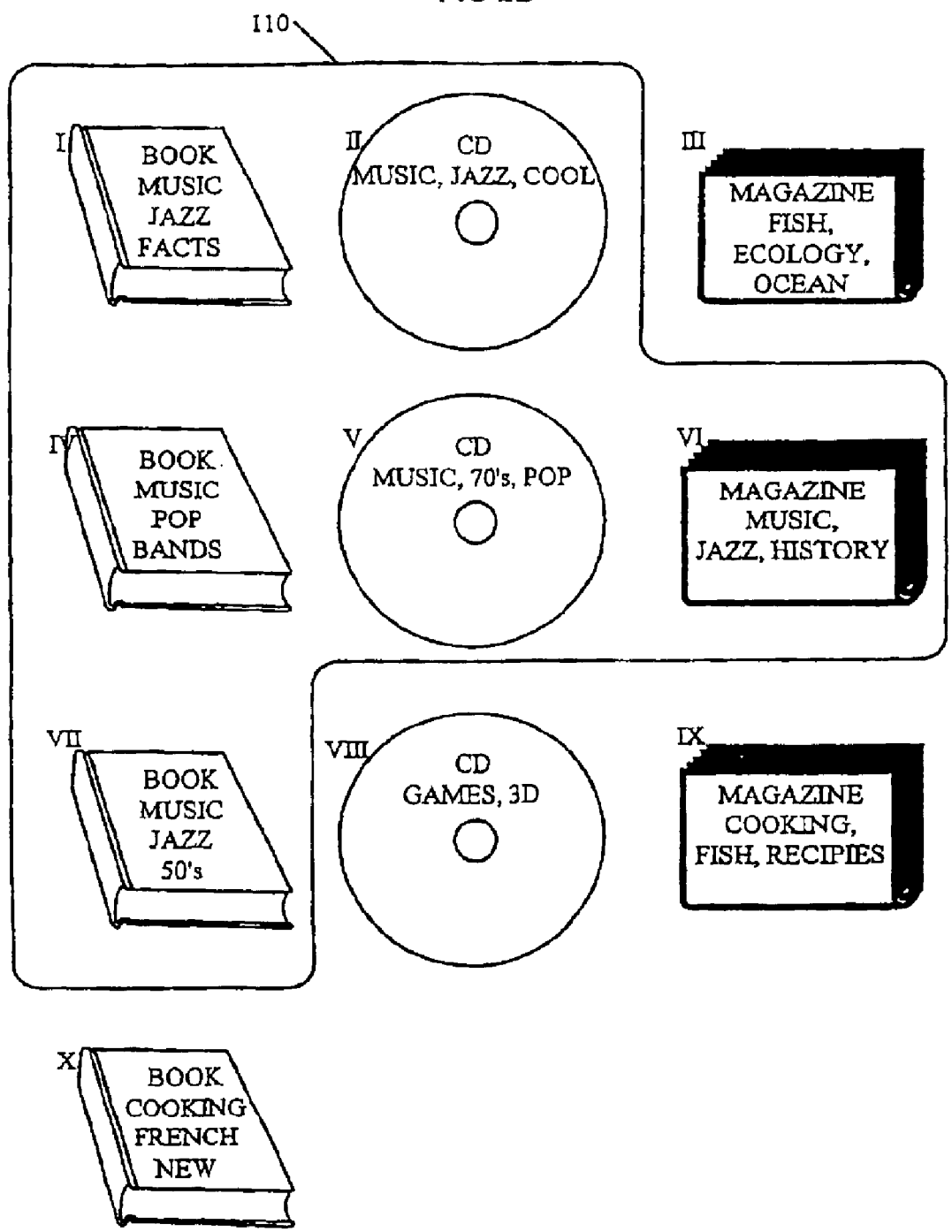

Reference is now made to FIG. 2B, which illustrates classification of the disorganized set of objects of FIG. 1 according to whether they relate to music. Thus, one sees that in a group 110, there are found magazines, CDs and books, all of which relate to music. Thus it is seen in FIG. 2B, there remain outside of the MUSIC group, various objects of various types, such as books, CDs and magazines, relating inter alia to games, cooking and ecology. It is observed that in the classification functionality of FIG. 2B, many of the objects in the MUSIC group may be considered to have more in common with other objects within the MUSIC group than they do with objects outside the MUSIC group. This phenomenon is considered to be positive and indicates a helpful classification functionality.

Figure 3A:
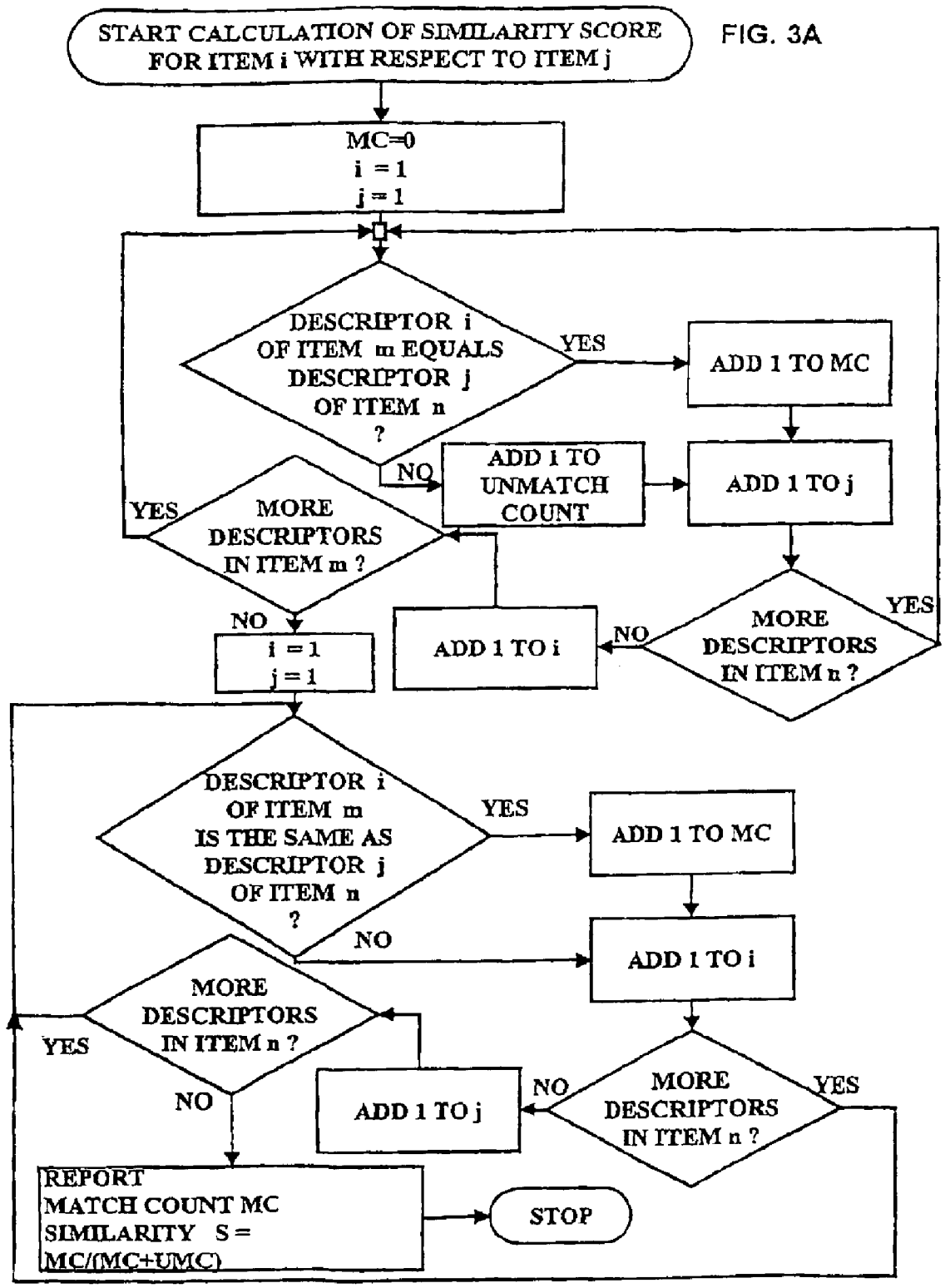
FIGS. 3A, 3B, 3C and 3D together are a flow chart illustrating evaluation of the quality of a cluster in accordance with a preferred embodiment of the present invention.
Figure 3B:
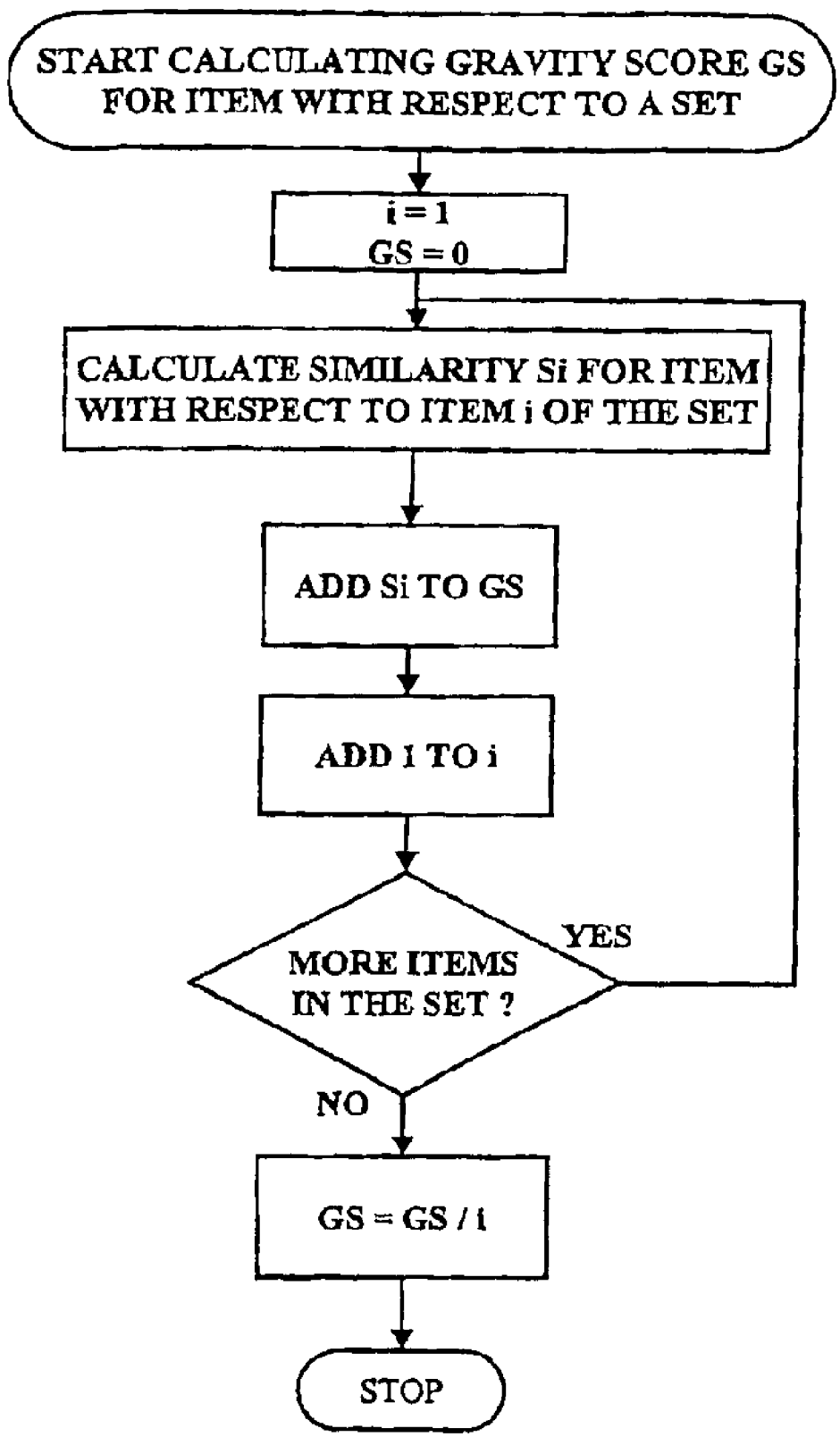
Figure 3C:
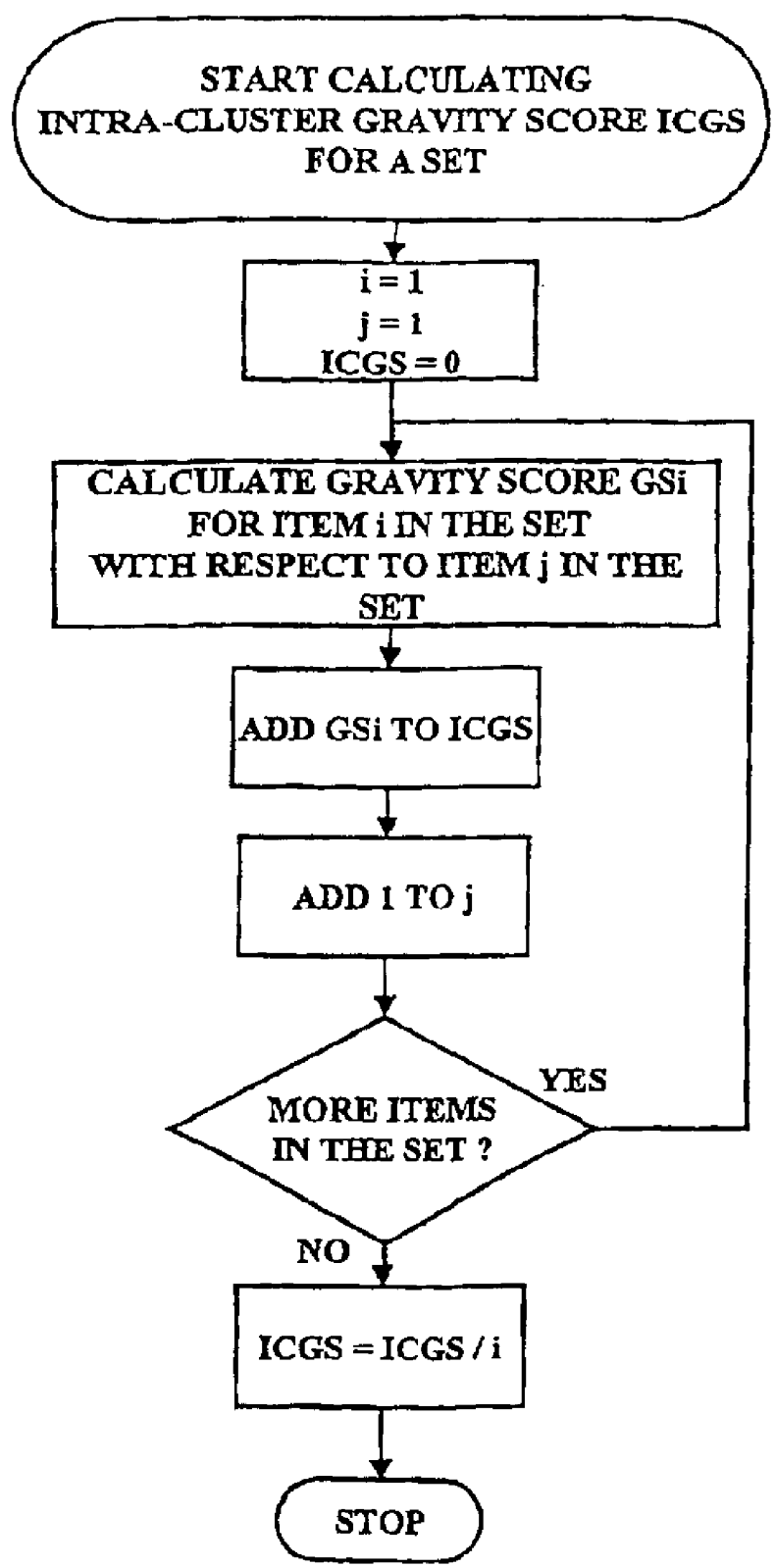

Reference is now made to FIGS. 3A, 3B and 3C, which together are a flow chart illustrating evaluation of the quality of a cluster in accordance with a preferred embodiment of the present invention, and to FIGS. 4A–4I, which are useful in understanding the subject matter of FIGS. 3A–3C.

As seen in FIG. 3A, a similarity score S, described hereinbelow, is calculated for first and second items, each having at least one descriptor. This calculation preferably is carried out for each descriptor in each item of a pair of items, by determining whether the same descriptor exists in both items of the pair. Alternatively the determination is based not on the existence of identical descriptors but rather on descriptors which for the present purpose are considered to be identical. Further alternatively, this calculation may be carried out on selected descriptors among the descriptors of each item, such selected descriptors being referred to herein as "descriptors", the selection being made according to a rule. An example of such a rule is the rule that only descriptors existing in at least 80% of the items in a particular set of items are qualified descriptors for the purposes of this calculation.

Figure 4A:
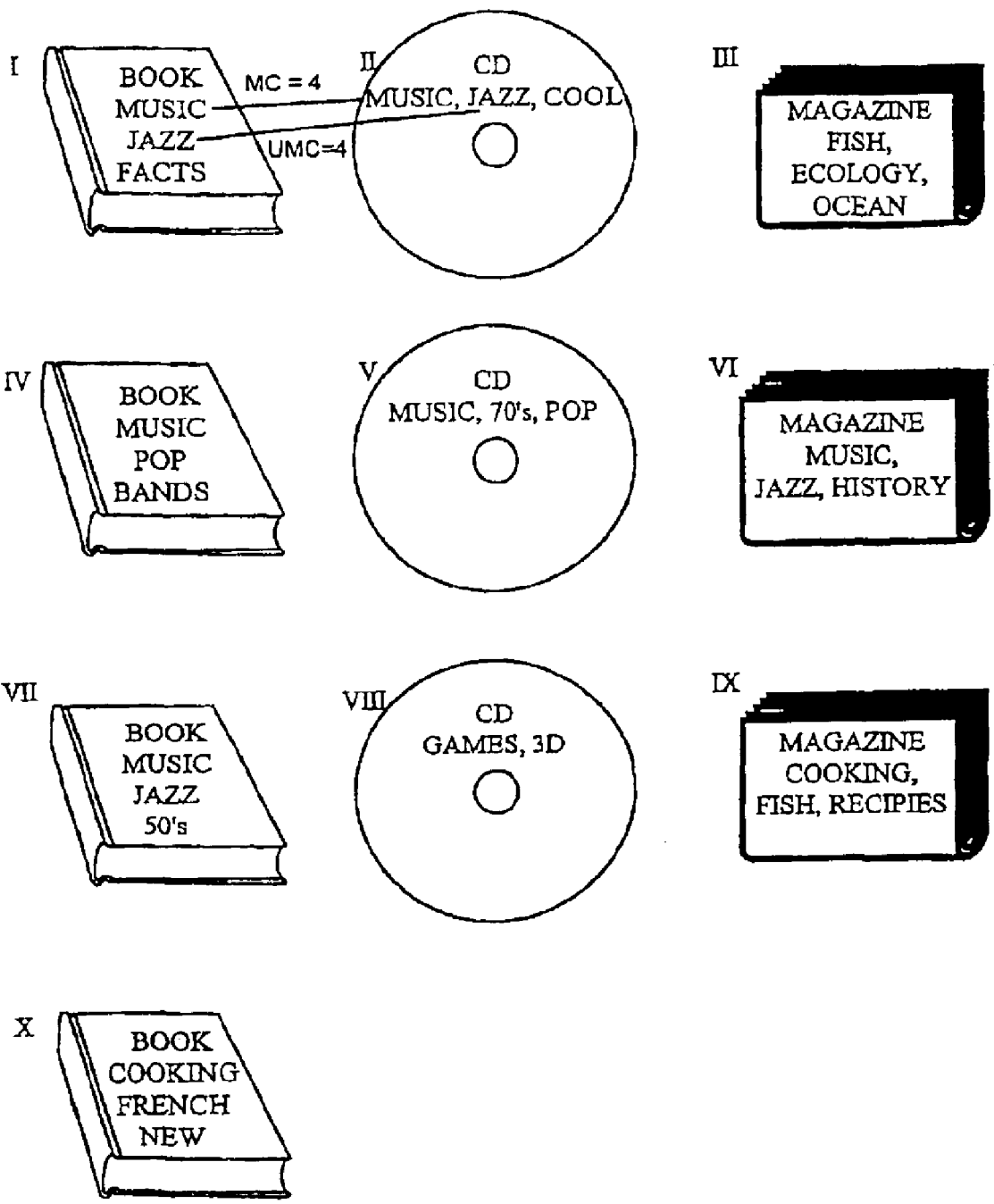

Referring also to FIG. 4A, it is seen that a collection of items is shown to include ten items, here labeled by Roman numerals I–X, it being appreciated that the collection of items typically may include many thousands or hundreds of thousands of items. A pair of items is here designated arbitrarily as the pair including items I and II. It is seen that typically item I has the following descriptors: BOOK, MUSIC, JAZZ and FACTS and item II has the following descriptors: CD, MUSIC, JAZZ and COOL. It is appreciated that the descriptors MUSIC and JAZZ are found in both items of the I, II item pair.

A match count (MC) of 4 is therefore assigned to the I, II item pair, inasmuch as 4 descriptors are matched. An unmatch count (UMC) of 4 is also assigned to the I, II item pair, inasmuch as 4 descriptors are unmatched.

In the illustrated embodiment, no weightings are assigned to the match count and unmatch count, based on relative importance of the descriptors. Alternatively this may be done.

A commonality metric C, which is equal to the weighted match count, may be established for each item pair. In the illustrated example C is equal to the match count MC.

An uncommonality metric UC, which is equal to the weighted unmatch count, may be established for each item pair. In the illustrated example UC is equal to the unmatch count UMC.

A similarity metric S is calculated. The similarity metric is preferably any suitable function which grows as the commonality grows and diminishes as the uncommonality grows. The following two examples are presented for calculating the similarity metric. According to Example S1, the similarity metric is calculated as follows:

$$S1 = \frac{C}{(C + UC)}$$

According to Example S2, the similarity metric is calculated as follows:

$$S2 = C - UC$$

At present, example S1 is preferred and thus is employed herein, referred to as S.

It is appreciated that a similarity metric may be calculated for all possible item pairs in a collection of items.

Reference is now made to FIG. 3B, which illustrates calculation of a gravity score (GS) for one item in a collection with respect to a set of items in that collection, each item having at least one descriptor. FIGS. 4B–4I illustrate various examples of this calculation.

Calculation of the gravity score (GS) for a given item with respect to a given set employs the similarity metrics S calculated for each item pair that may be formed including the given item and another item in the set. Alternatively, the commonality metrics C for each item pair may be employed instead of the similarity metrics S.

The gravity score for each given item i with respect to a given set may be calculated as follows:

$$GSi = \frac{1}{N} \sum_{j=1}^{N} Sij$$

where Sij is the similarity of item i with respect to item j of the set and where N is the number of items in the set.

Figure 4B:
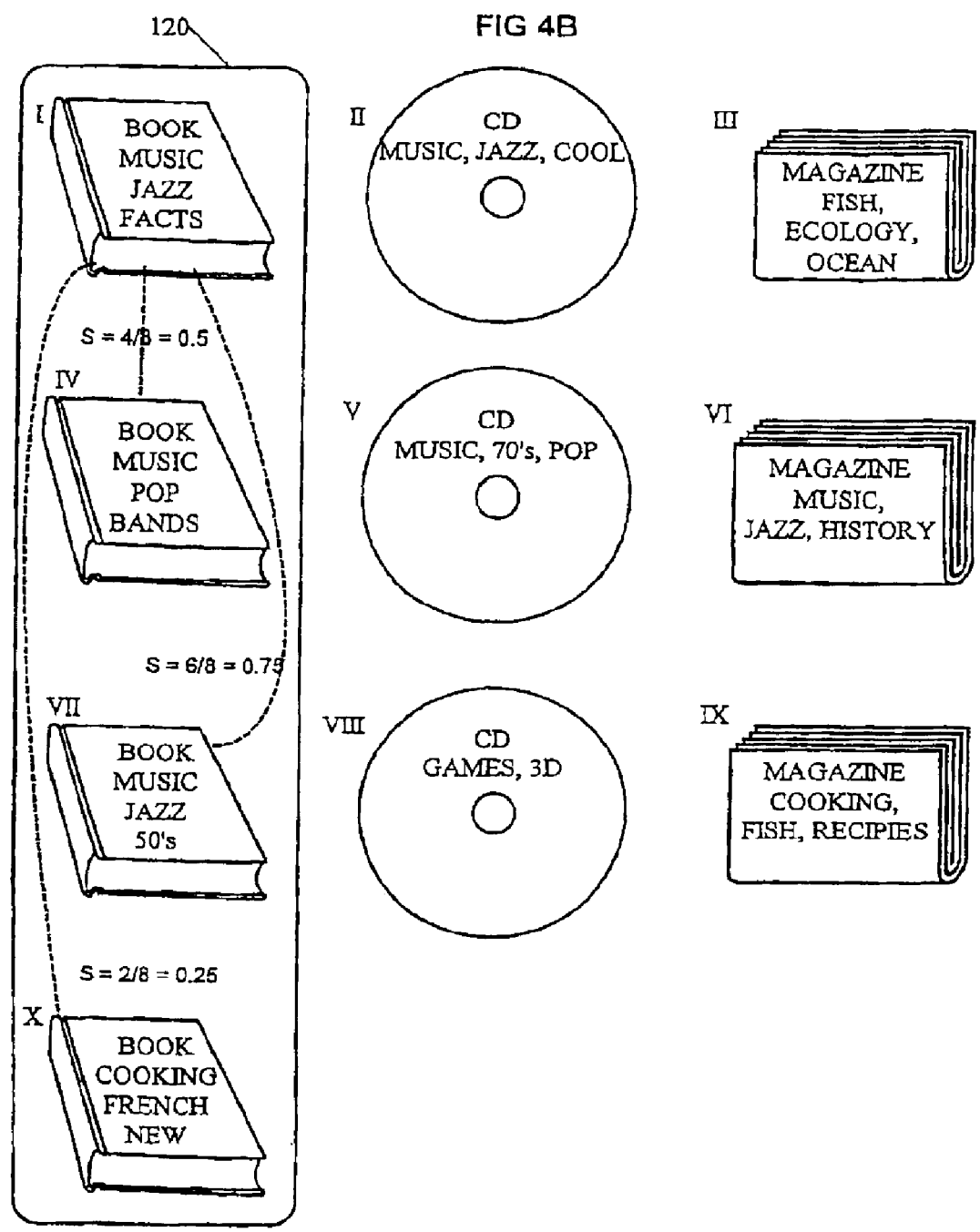

FIG. 4B illustrates calculation of the gravity score GS for an item, here item I, with respect to a set including the remaining books in the collection, i.e. items IV, VII and X. It is seen that the calculation of GS for the example of FIG. 4B is as follows:

$$GS = \frac{1}{3} \times (0.5 + 0.75 + 0.25) = 0.5$$

Figure 4C:
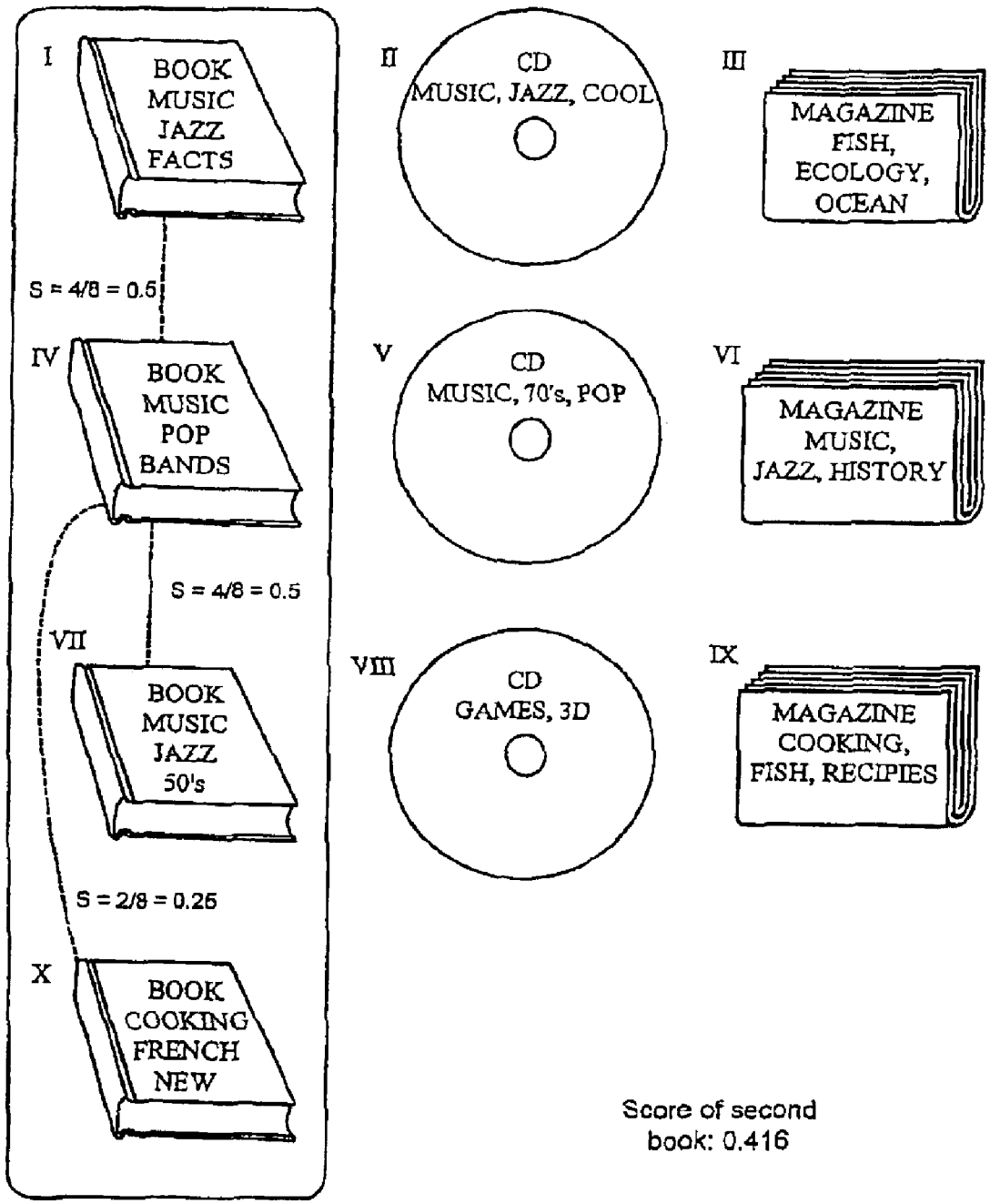

FIG. 4C illustrates calculation of the gravity score GS for an item, here item IV, with respect to a set including the remaining books in the collection, i.e. items I, VII and X. It is seen that the calculation of GS for the example of FIG. 4C is as follows:

$$GS = \frac{1}{3} \times (0.5 + 0.5 + 0.25) = 0.416$$

FIG. 4D illustrates calculation of the gravity score GS for an item, here item VII, with respect to a set including the remaining books in the collection, i.e. items I, IV and X. It is seen that the calculation of GS for the example of FIG. 4D is as follows:

$$GS = \frac{1}{3} \times (0.75 + 0.5 + 0.25) = 0.5$$

Figure 4E:
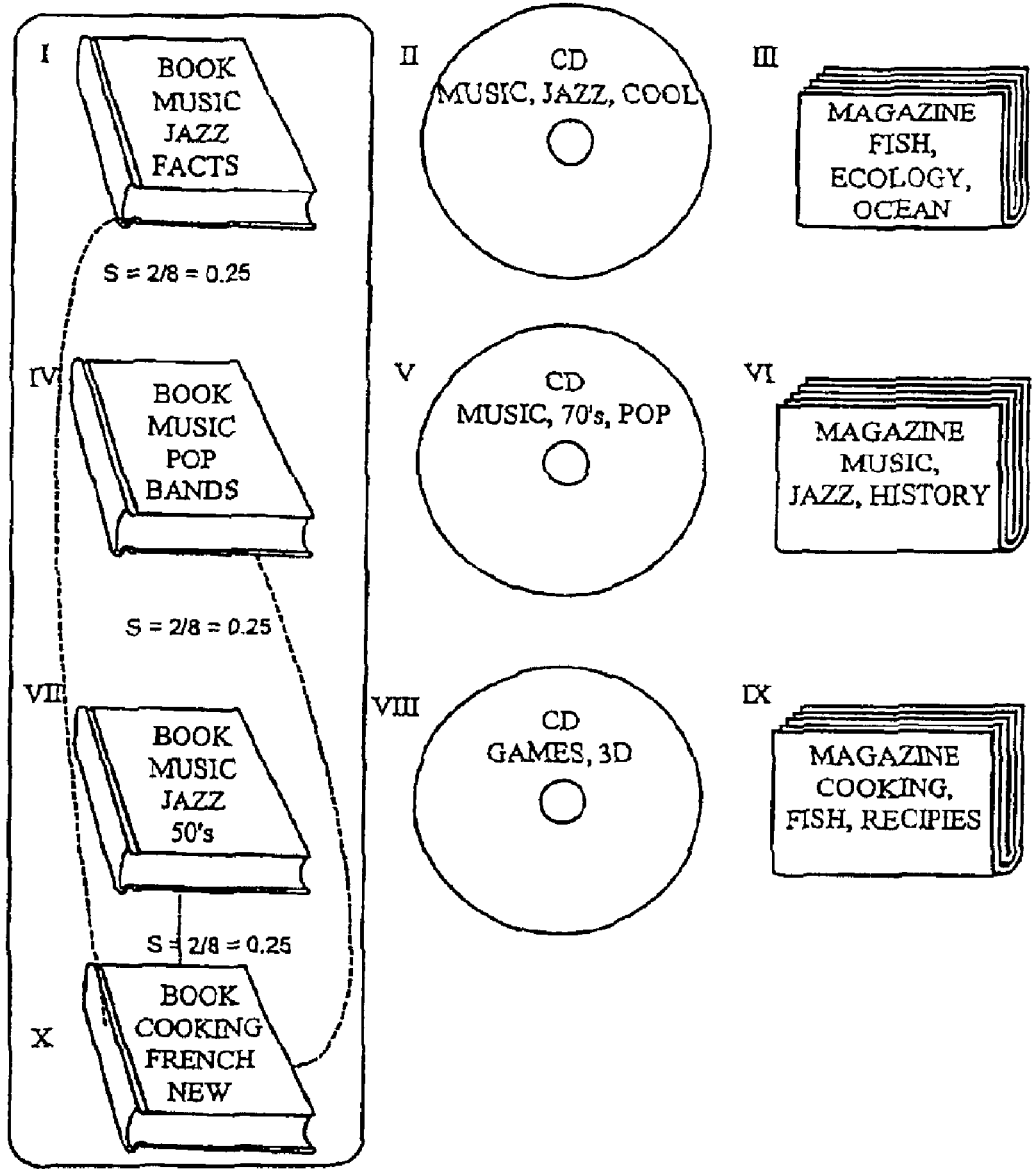

FIG. 4E illustrates calculation of the gravity score GS for an item, here item X, with respect to a set including the remaining books in the collection, i.e. items I, IV and VII.

It is seen that the calculation of GS for the example of FIG. 4E is as follows:

$$GS = \frac{1}{3} \times (0.25 + 0.25 + 0.25) = 0.25$$

Figure 4F:
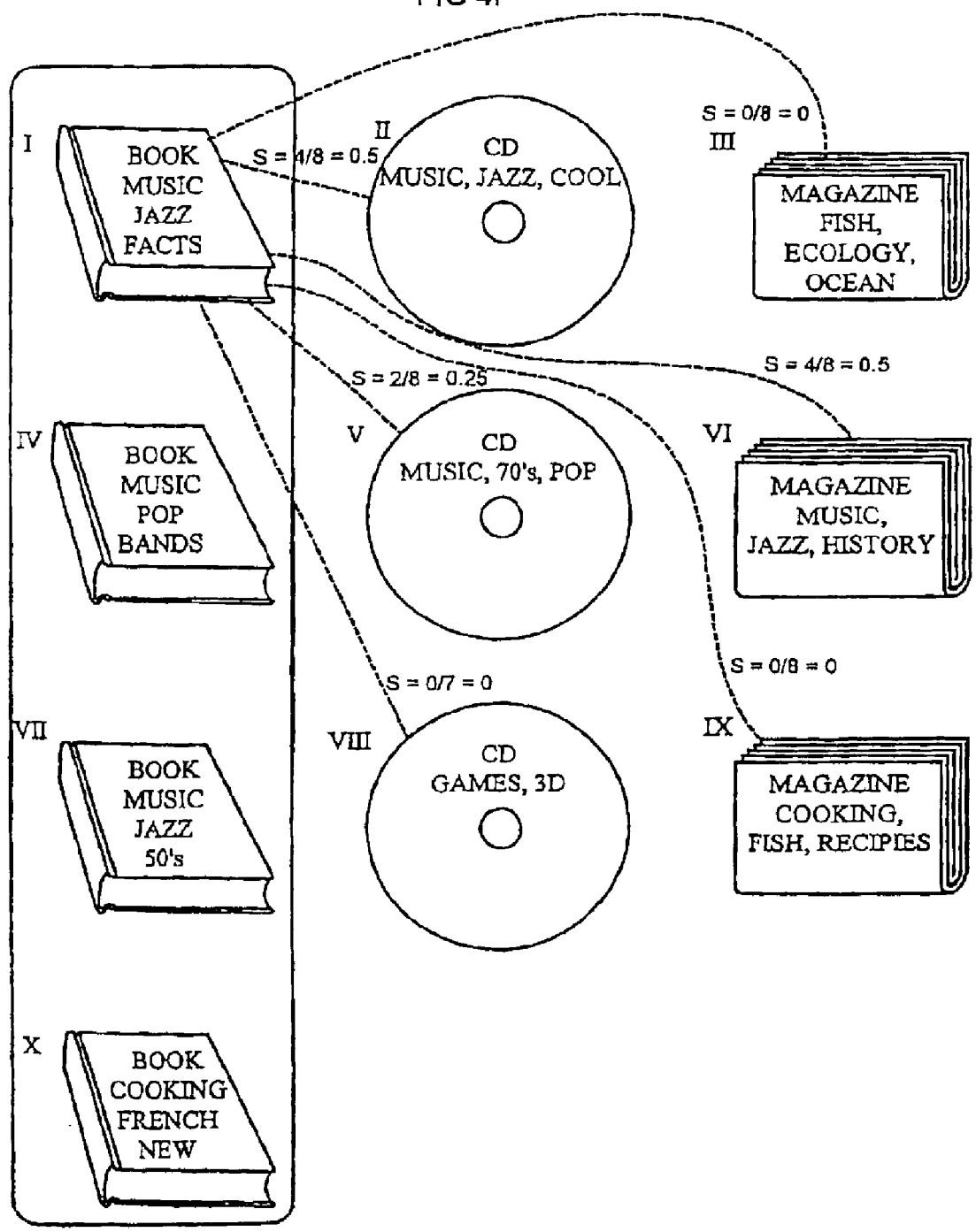

FIG. 4F illustrates calculation of the gravity score GS for an item, here item I, with respect to a set including all of the items in the collection which are not books, i.e. items II, III, V, VI, VIII and IX. It is seen that the calculation of GS for the example of FIG. 4F is as follows:

$$GS = \frac{1}{6} \times (0.5 + 0 + 0.25 + 0.5 + 0 + 0) = 0.208$$

Figure 4G:
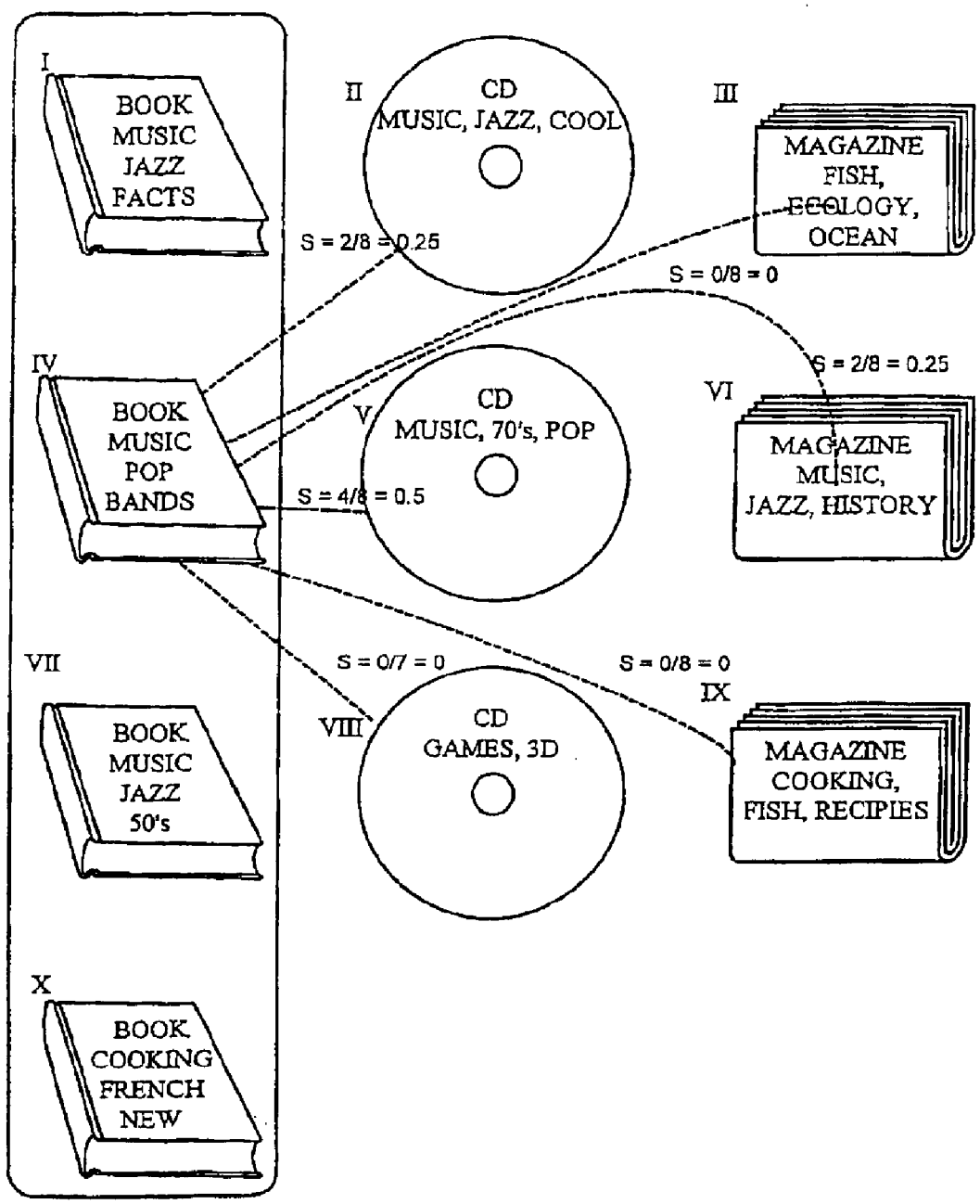

FIG. 4G illustrates calculation of the gravity score GS for an item, here item IV, with respect to a set including all of the items in the collection which are not books, i.e. items II, III, V, VI, VIII and IX. It is seen that the calculation of GS for the example of FIG. 4G is as follows:

$$GS = \frac{1}{6} \times (0.25 + 0 + 0.5 + 0.25 + 0 + 0) = 0.166$$

Figure 4H:
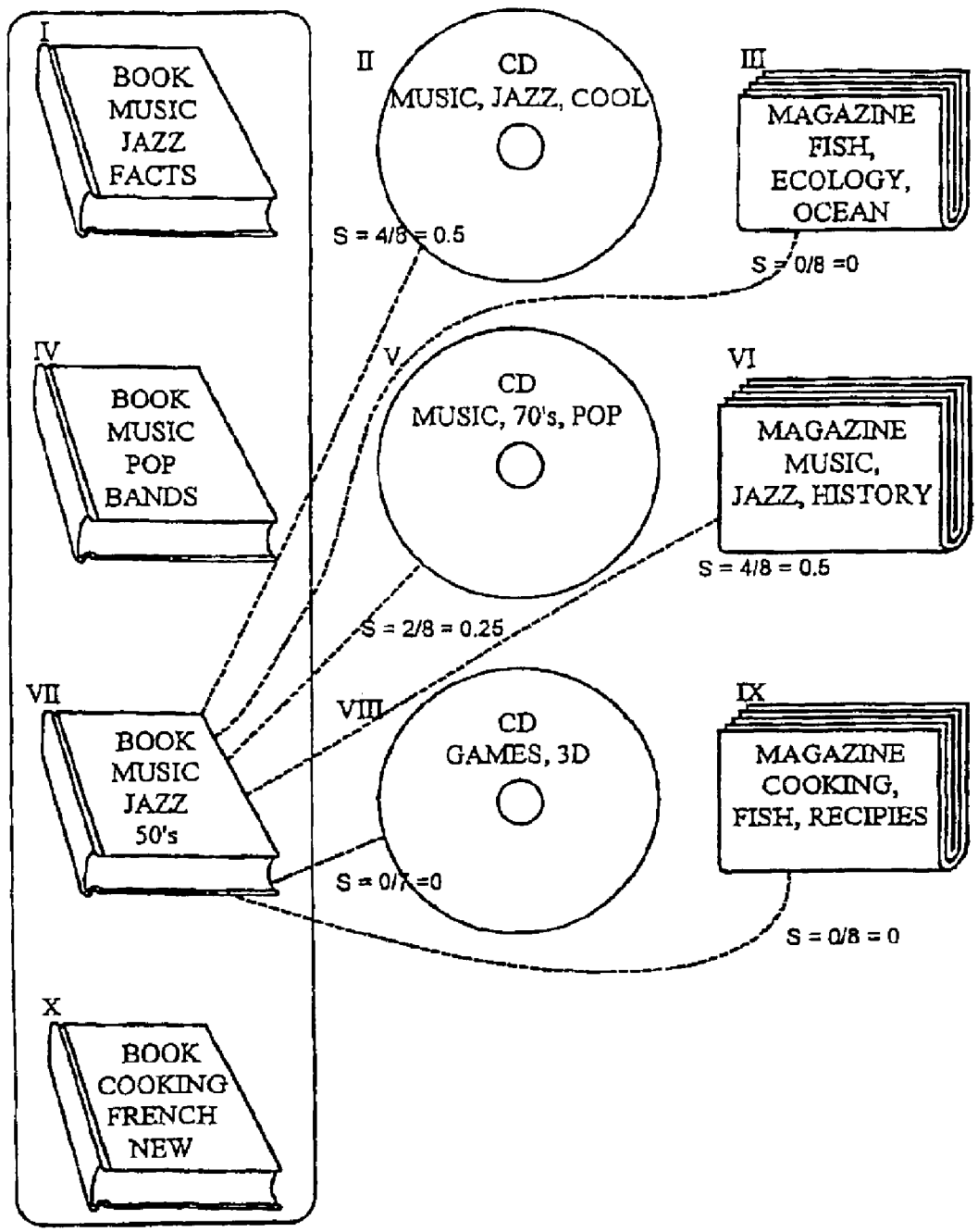

FIG. 4H illustrates calculation of the gravity score GS for an item, here item VII, with respect to a set including all of the items in the collection which are not books, i.e. items II, III, V, VI, VIII and IX. It is seen that the calculation of GS for the example of FIG. 4H is as follows:

$$GS = \frac{1}{6} \times (0.5 + 0 + 0.25 + 0.5 + 0 + 0) = 0.208$$

Figure 4I:
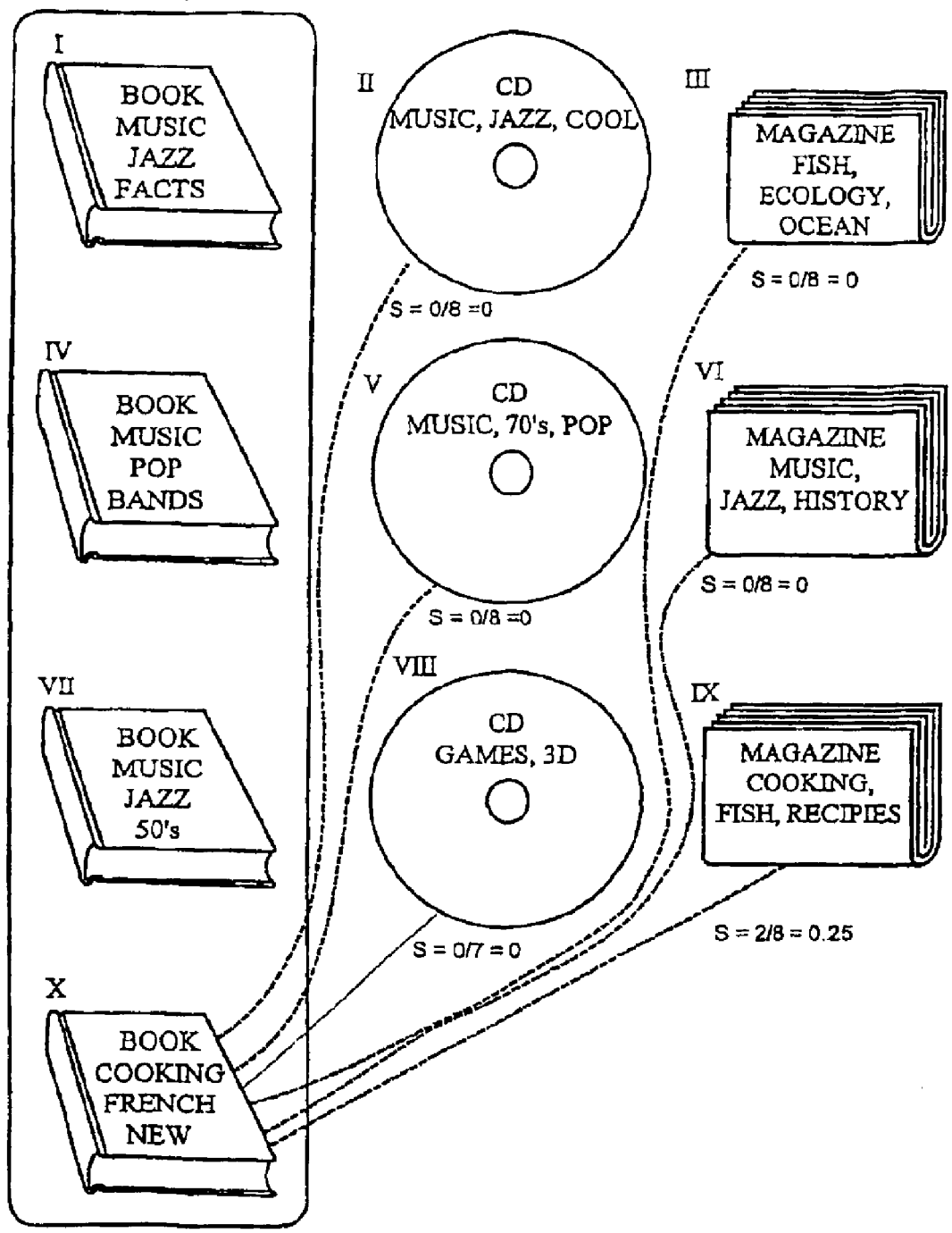

FIG. 4I illustrates calculation of the gravity score GS for an item, here item X, with respect to a set including all of the items in the collection which are not books, i.e. items II, III, V, VI, VIII and IX. It is seen that the calculation of GS for the example of FIG. 4I is as follows:

$$GS = \frac{1}{6} \times (0 + 0 + 0 + 0 + 0 + 0.25) = 0.041$$

There are two main types of gravity score with respect to a specific cluster of several items in a collection of items. The IGS is the Internal Gravity Score and is the Gravity Score of an item in the cluster with respect to all other items in that cluster. The EGS is the External Gravity Score and is the Gravity Score of an item in the cluster with respect to all items in the collection and outside that cluster.

Figure 3D:
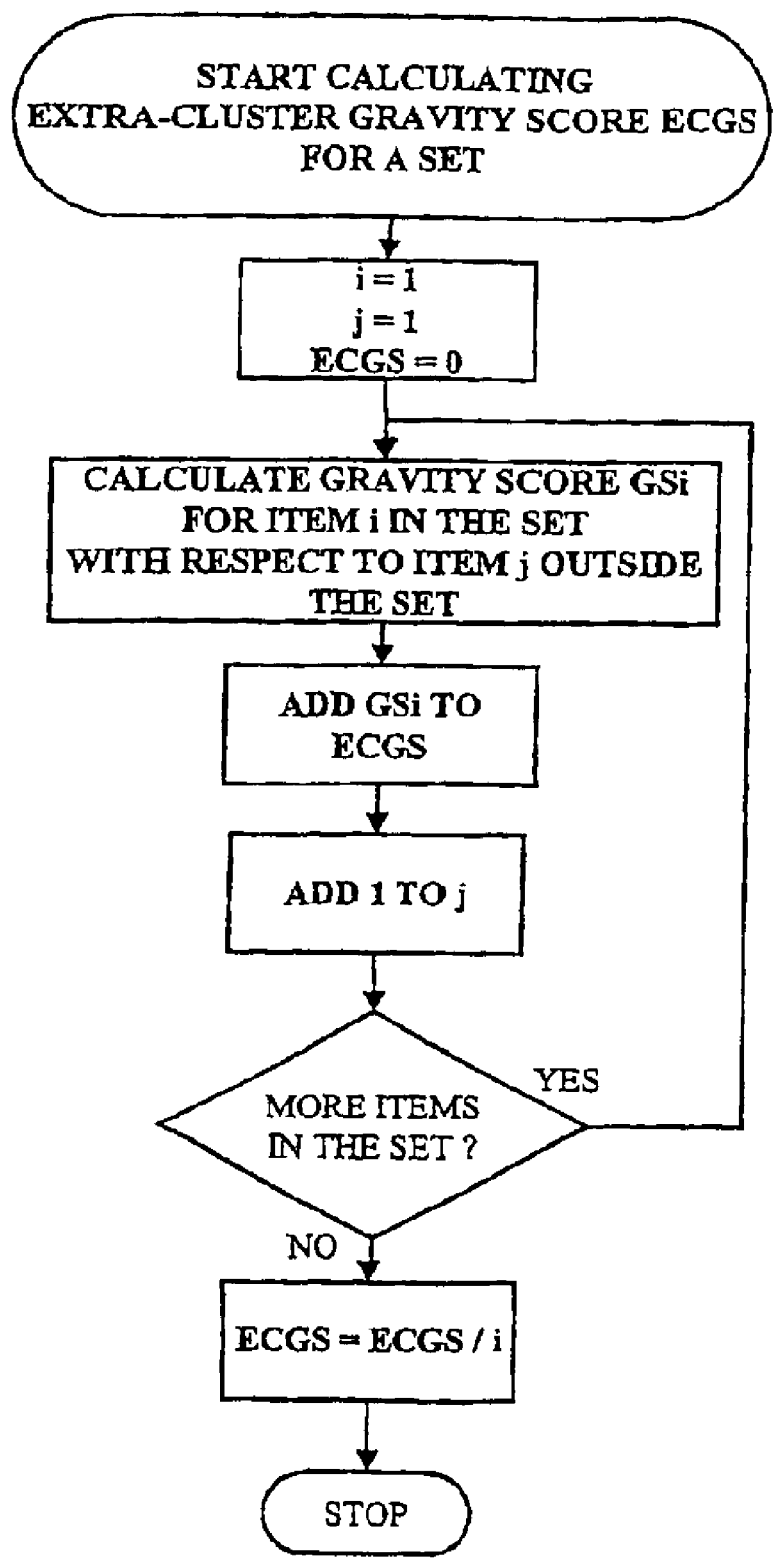

Reference is now made to FIGS. 3C and 3D, which illustrate steps in the calculation of a Cluster Quality Metric (CQM) for a cluster which is a selected set of items in a collection, each item having at least one descriptor.

The CQM represents a measure of the quality of differentiation between the cluster and the remaining body of information. As the CQM increases the cluster increasingly contains information that is substantially different from the remaining body of the information in the collection.

The CQM is calculated based on a combination of a measure of the similarity among the information items within the cluster, represented by the Intra-Cluster Gravity Score (ICGS), and a measure of the dissimilarity between the items in the cluster and the items outside the cluster, represented by the Extra-Cluster Gravity Score (ECGS). CQM increases as an intra-cluster gravity score grows and decreases as an extra-cluster gravity score grows. Two examples of calculation of CQM appear in the following equations:

$$CQM = \frac{ICGS}{ECGS}$$

$$CMQ = ICGS - ECGS$$

The equation CQM=ICGS−ECGS is believed to be preferred and is employed in the description which follows:

ICGS is an intra-cluster gravity score which is equal to the total of the gravity scores for each item in a cluster with respect to all other items in the cluster divided by the number of items in the cluster. An example of calculation of CQM appear in the following equation.

$$ICGS = \frac{1}{N} \times \sum_{j=1}^{N} IGSi$$

Where IGSi is the Internal Gravity Score for item I and N is the number of items in the cluster.

Reference is now made to FIGS. 3C and 4B–4E that illustrate the calculation of the Intra-Cluster Gravity Score (ICGS). FIG. 3C is a simplified flow diagram of an algorithm that calculates the ICGS for a cluster of items. FIGS. 4B–4E are useful in understanding the procedure described in FIG. 3C, as they describe the calculation of the elements of the ICGS for a cluster consisting of items I, IV, VII and X of FIGS. 4B–4E.

Thus, in the example of FIGS. 4A–4I, the intra-cluster gravity score (ICGS) of a cluster consisting of items I, IV, VII and X is equal to the sum of the gravity scores calculated as shown in FIGS. 4B, 4C, 4D and 4E divided by 4 and may be thus expressed as follows:

$$ICGS = \frac{GS(I; IV \& VII \& X) + GS(IV; I \& VII \& X) + GS(VII; I \& IV \& X) + GS(X; I \& IV \& IIV)}{4}$$

$$= \frac{0.5 + 0.416 + 0.5 + 0.25}{4}$$

$$= 0.395$$

ECGS is an extra-cluster gravity score which is the total of the gravity scores for each item in a cluster with respect to all items outside the cluster in the collection divided by the number of items in the cluster. An example of calculation of CQM appear in the following equation.

$$ECGS = \frac{1}{N} \times \sum_{i=1}^{N} EGSi$$

Where EGSi is the External Gravity Score for item I and N is the number of items in the cluster.

Reference is now made to FIGS. 3D and 4F–4I that illustrate the calculation of the Extra-Cluster Gravity Score (ECGS). FIG. 3D is a simplified flow diagram of an algorithm that calculates the ECGS for the cluster of items I, IV, VII and X. FIGS. 4F–4I are useful in understanding the procedure described in FIG. 3D.

In the example of FIGS. 4A–4I, the extra-cluster gravity score is equal to the sum of the gravity scores calculated as shown in FIGS. 4F, 4G, 4H and 4I divided by 4 and may be thus expressed as follows:

$$ECGS = \frac{1}{4} \times \begin{bmatrix} GS(\text{I; II \& III \& V \& VI \& VII \& IX}) + \\ GS(\text{IV; II \& III \& V \& VI \& VIII \& IX}) + \\ GS(\text{VII; II \& III \& V \& VI \& VIII \& IX}) + \\ GS(\text{X; II \& III \& V \& VI \& VIII \& IX}) \end{bmatrix}$$

$$ECGS = \frac{GS(\text{I; II \& III \& V \& VI \& VII \& IX}) +}{4}$$
$$+ \frac{GS(\text{IV; II \& III \& V \& VI \& VIII \& IX})}{4} +$$
$$\frac{GS(\text{VII; II \& III \& V \& VI \& VIII \& IX}) +}{4}$$
$$\frac{GS(\text{X; II \& III \& V \& VI \& VIII \& IX})}{4}$$
$$= \frac{0.208 + 0.166 + 0.208 + 0.041}{4}$$
$$= 0.156$$

In accordance with a preferred embodiment of the present invention the cluster quality metric is thus calculated as follows:

$$CQM = ICGS - ECGS$$
$$= 0.395 - 0.156$$
$$= 0.239$$

Figure 5A:
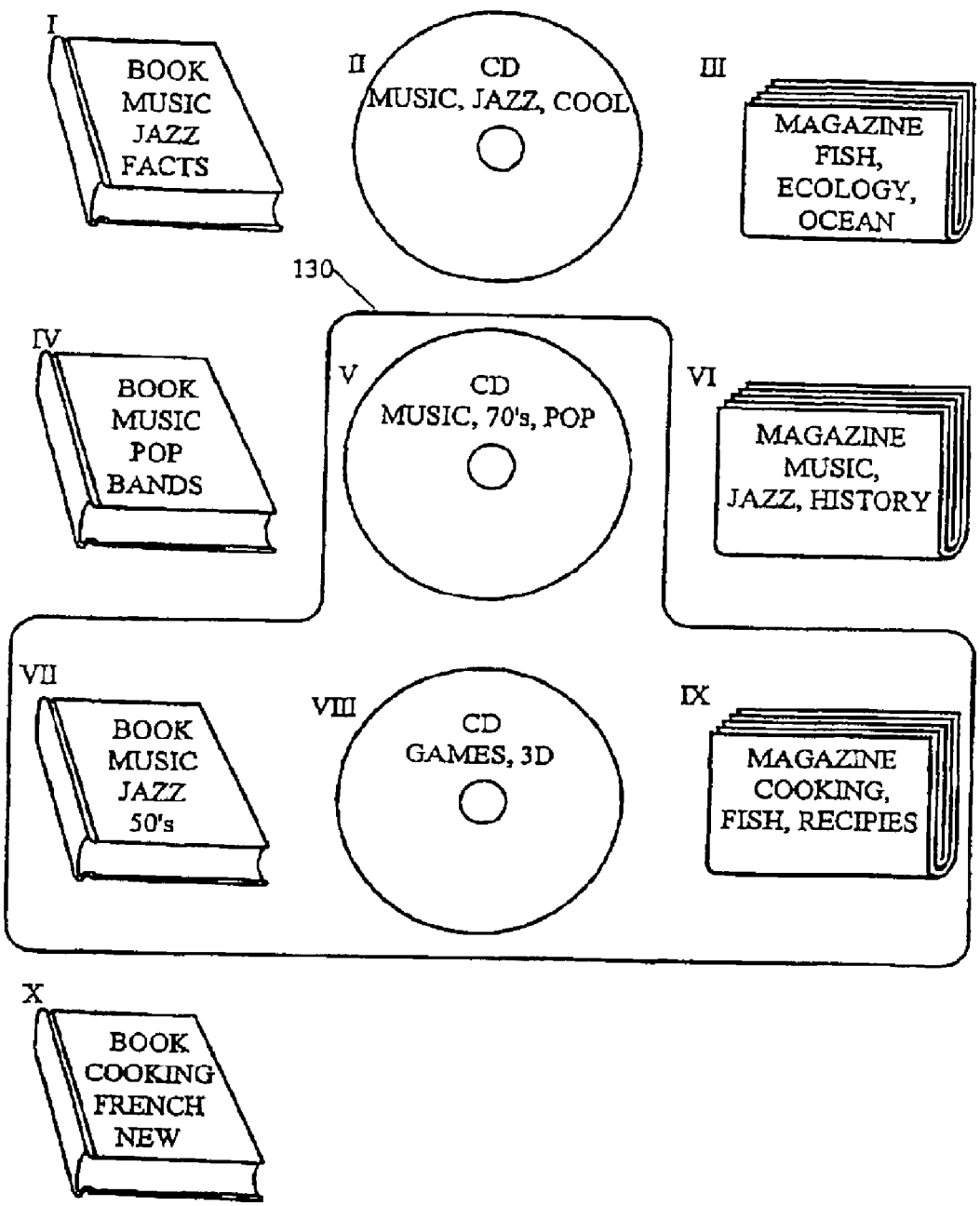
FIGS. 5A and 5B are illustrations useful in understanding a comparison between the qualities of two clusters.
Figure 5B:
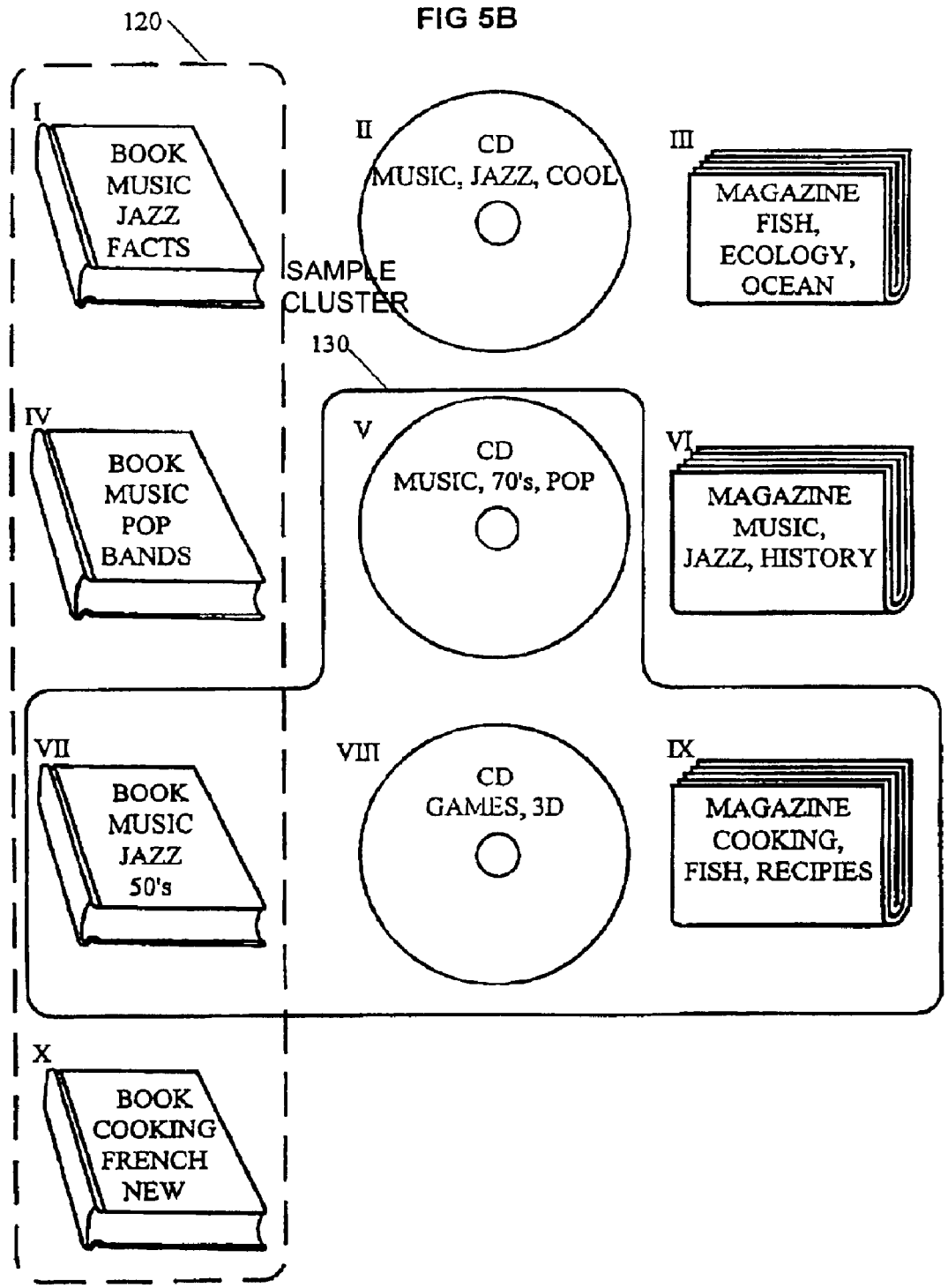

Reference is now made to FIGS. 5A and 5B that together illustrate a comparison between two clusters. FIG. 5A illustrates a cluster 130 of items V, VII, VIII and IX of the collection of items I to X. The Inter Cluster Gravity Score (ICGS) and the Extra Cluster Gravity Score (ECGS) of cluster 130 are calculated to be 0.089 and 0.22 respectively. The Cluster Quality Metric (CQM) is therefore calculated to be $$CQM = ICGS - ECGS = 0.089 - 0.22 = -0.131$$

FIG. 5B illustrates both clusters 120 and 130 and their respective CQMs 0.239 and −0.131. It is evident the cluster 120 is much better than cluster 130.

Figure 6A:
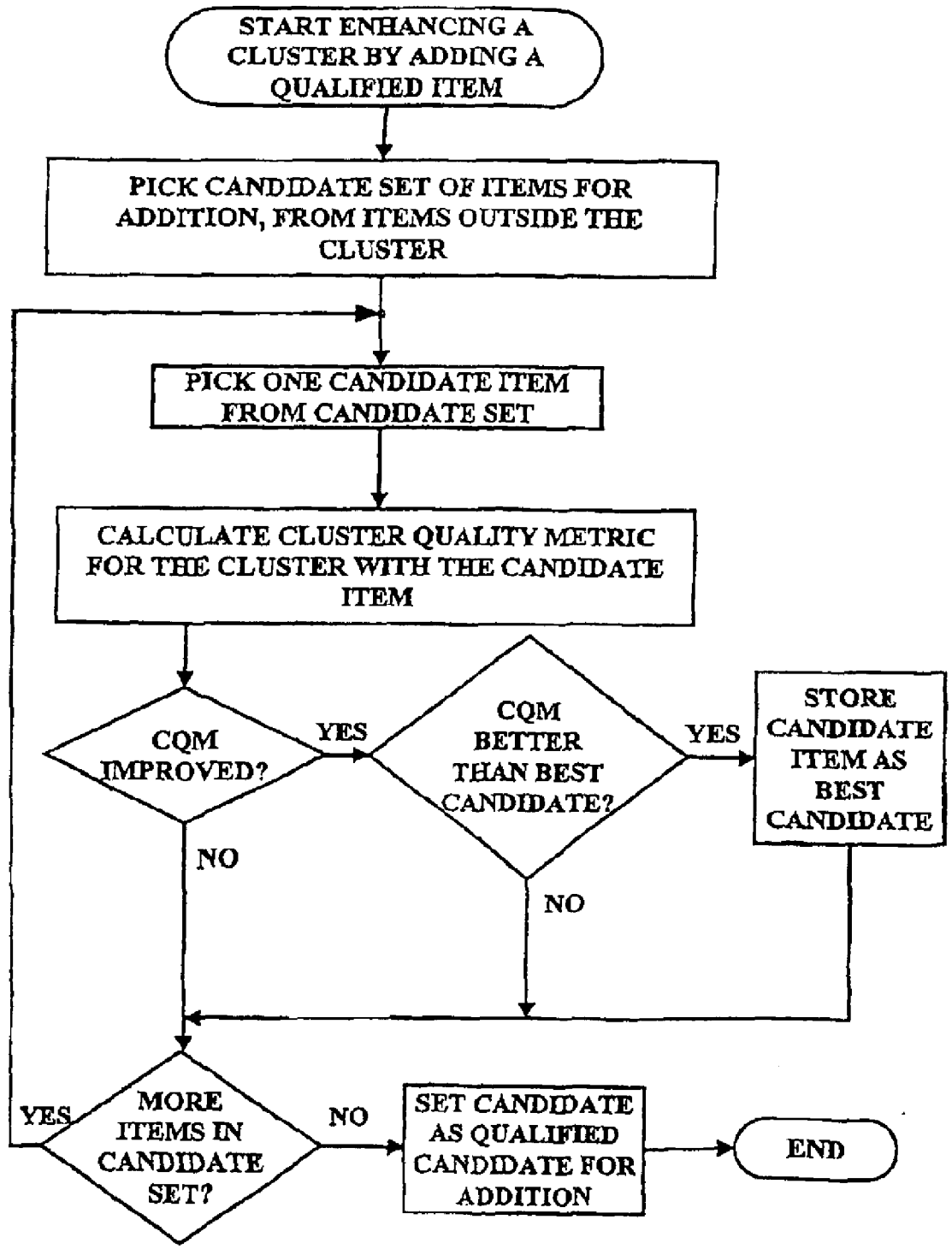
FIGS. 6A, 6B and 6C are simplified flowcharts useful in understanding various techniques for enhancing a cluster.
Figure 6B:
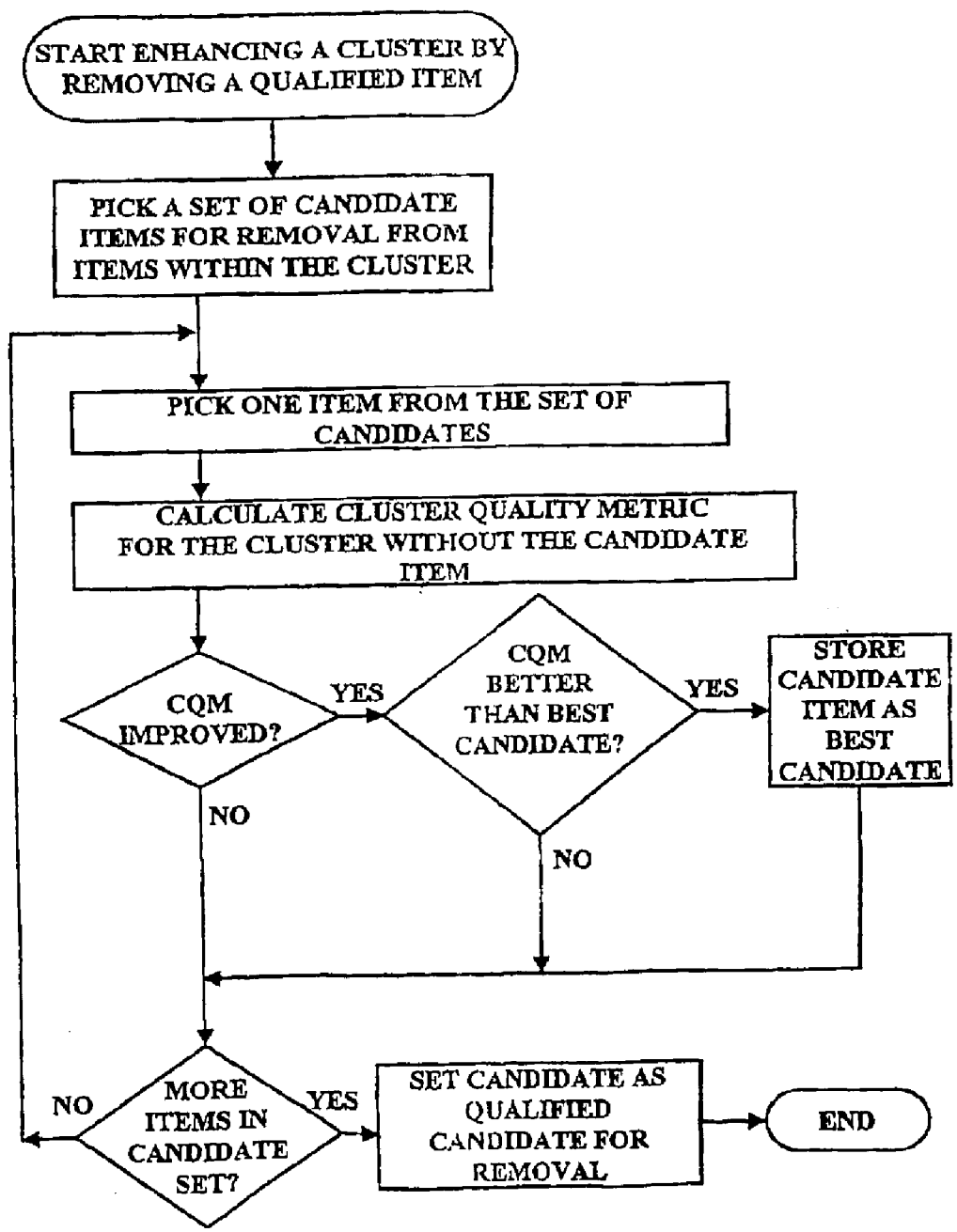
Figure 6C:
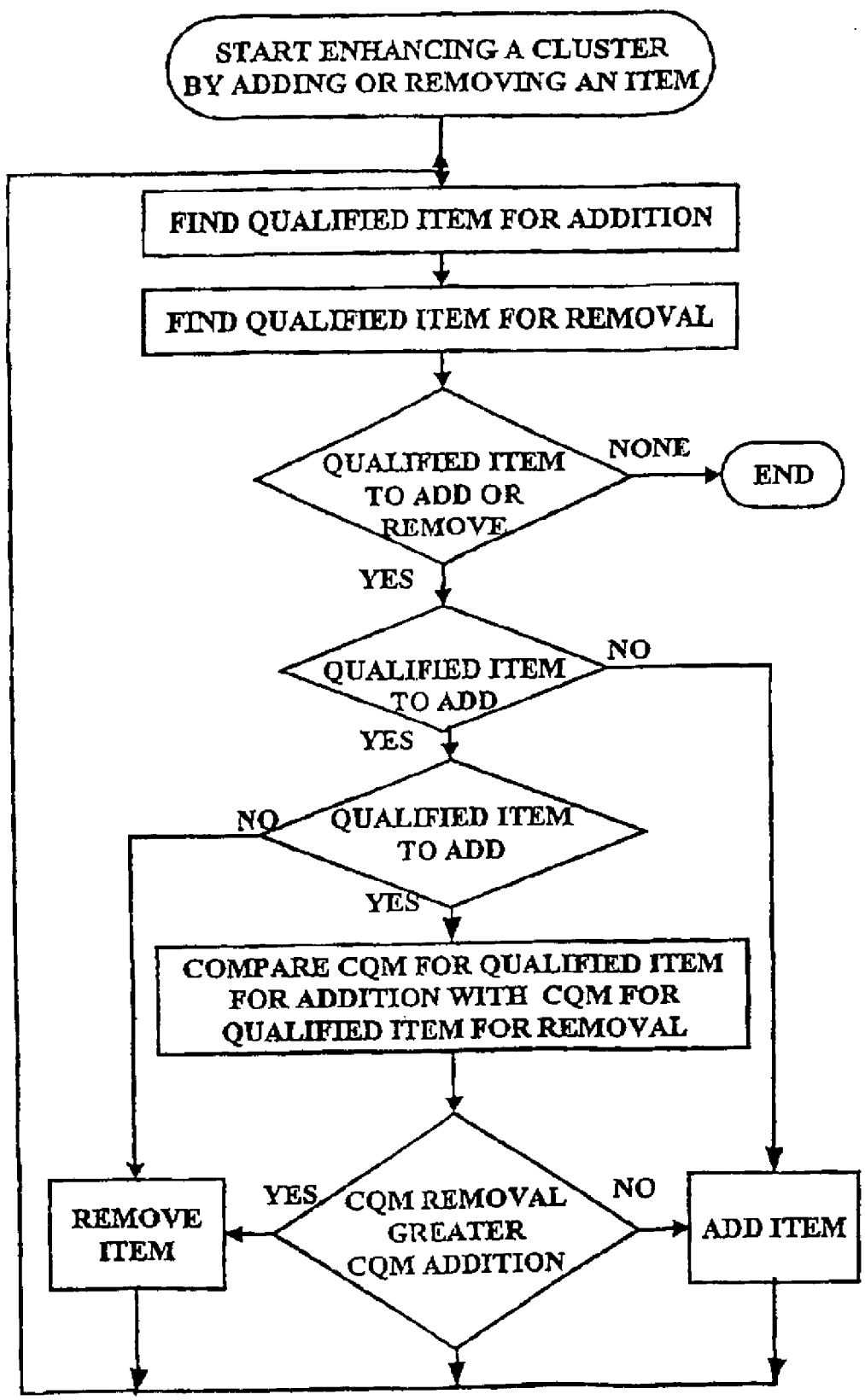
Figure 7A:
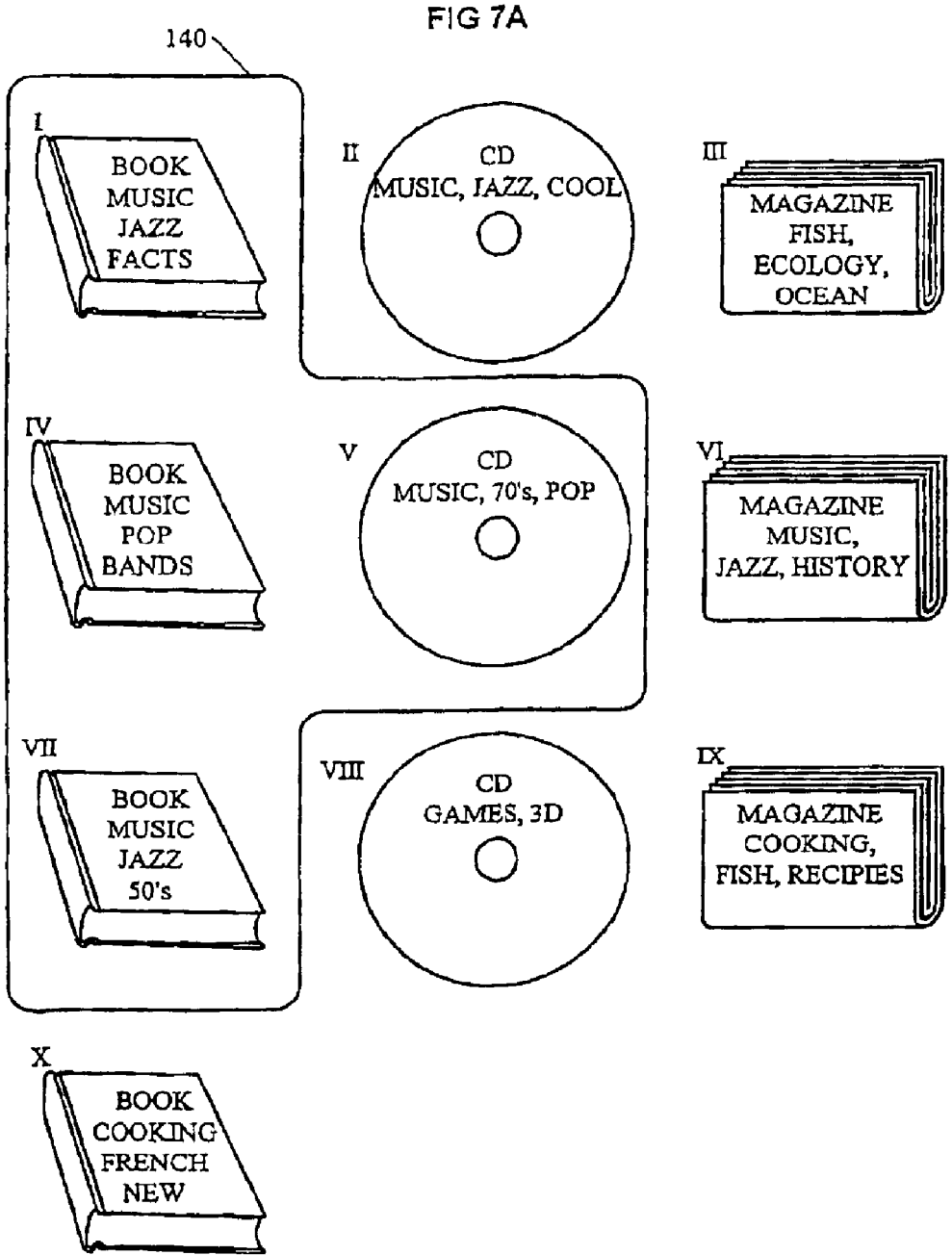
Figure 7B:
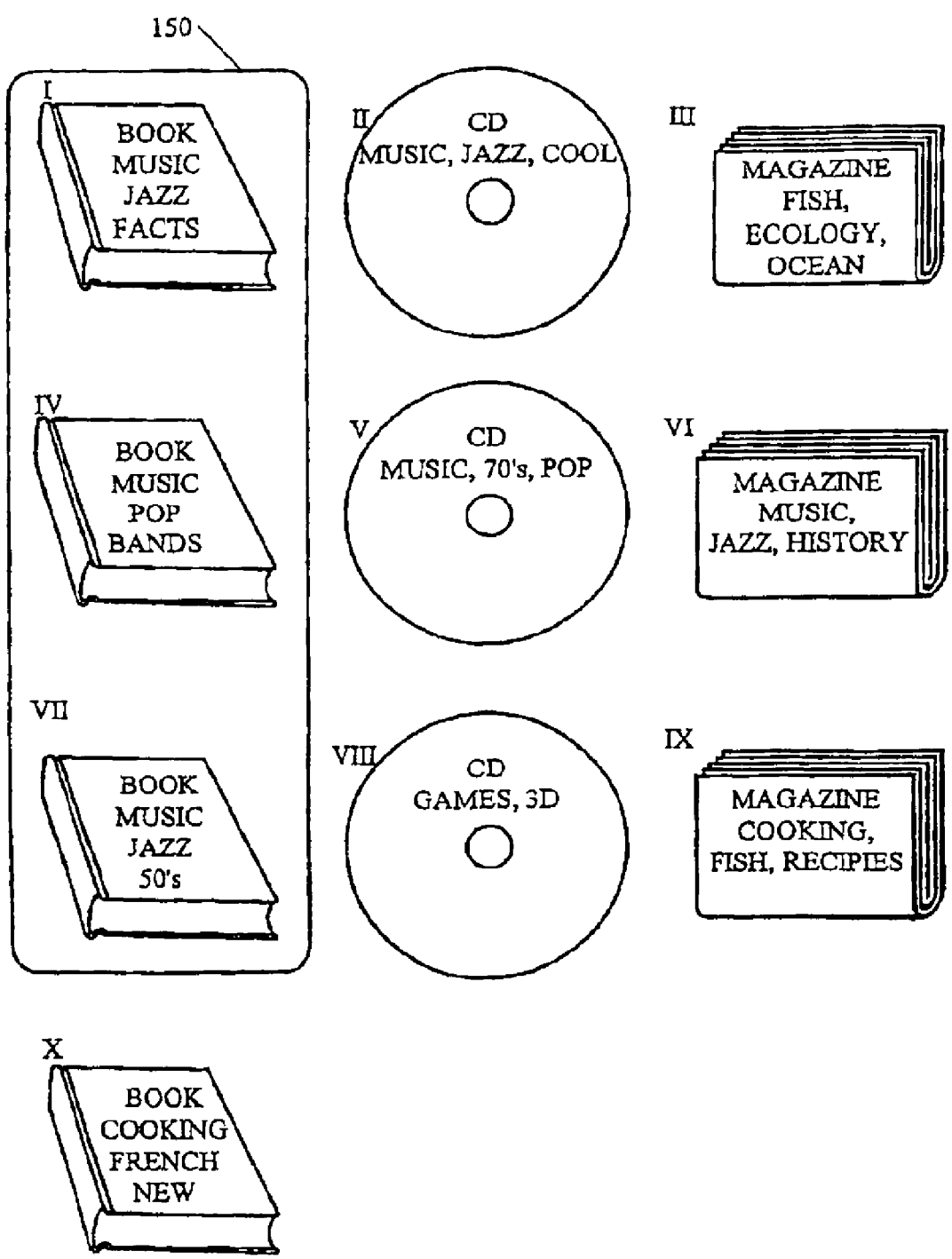

Reference is now made to FIGS. 6A, 6B and 6C and to FIGS. 7A, 7B and 7C. FIGS. 6A, 6B and 6C are simplified flowcharts of an algorithm according to a preferred embodiment of the present invention for enhancing a cluster by adding or removing items to or from a cluster. FIGS. 7A, 7B and 7C are illustrations useful in understanding the algorithm of FIGS. 6A, 6B and 6C.

FIGS. 7A, 7B and 7C illustrate three different clusters. The cluster of FIG. 7B is created by a modification of the cluster of FIG. 7A and the cluster of FIG. 7C is created by a modification of the cluster of FIG. 7B. Thus it is seen that FIGS. 7A, 7B and 7C illustrate a method for creating a best cluster by attempted gradual improvement of the cluster, for example by adding and removing items to or from a cluster. The method involves creating a cluster, modifying the cluster, measuring the quality of the modified cluster and then selecting the best cluster.

FIG. 7A illustrates a collection of information items I to X and a cluster 140 that consists of items I, IV, V and VII. The ICGS of cluster 140 is 0.458, the ECGS of cluster 140 is 0.178 and the CQM of cluster 140 is 0.28.

FIG. 7B illustrates a cluster 150 that is a modification of cluster 140 by the removal of item V. The ICGS of cluster 140 is 0.583, the ECGS of cluster 140 is 0.202 and the CQM of cluster 140 is 0.381.

FIG. 7C illustrates a cluster 160 that is a modification of cluster 150 by the addition of item II. The ICGS of cluster 140 is 0.5, the ECGS of cluster 140 is 0.178 and the CQM of cluster 140 is 0.322.

It is evident that cluster 150 is the best of the three clusters 140, 150 and 160. Further modifications can be created by adding and removing information items until the best configuration is selected.

FIG. 6A is a simplified flowchart of an algorithm of a preferred embodiment of the present invention that selects a qualified item for addition to a given cluster. The addition of the qualified item to the cluster provides the highest increase of the Cluster Quality Metric for the given cluster.

FIG. 6B is a simplified flowchart of an algorithm of a preferred embodiment of the present invention that selects a qualified item for removal from a given cluster. The removal of the qualified item from the cluster provides the highest increase of the Cluster Quality Metric for the given cluster.

FIG. 6C is a simplified flowchart of an algorithm of a preferred embodiment of the present invention that enhances a given cluster by adding and removing items to and from the given cluster.

Figure 8A:
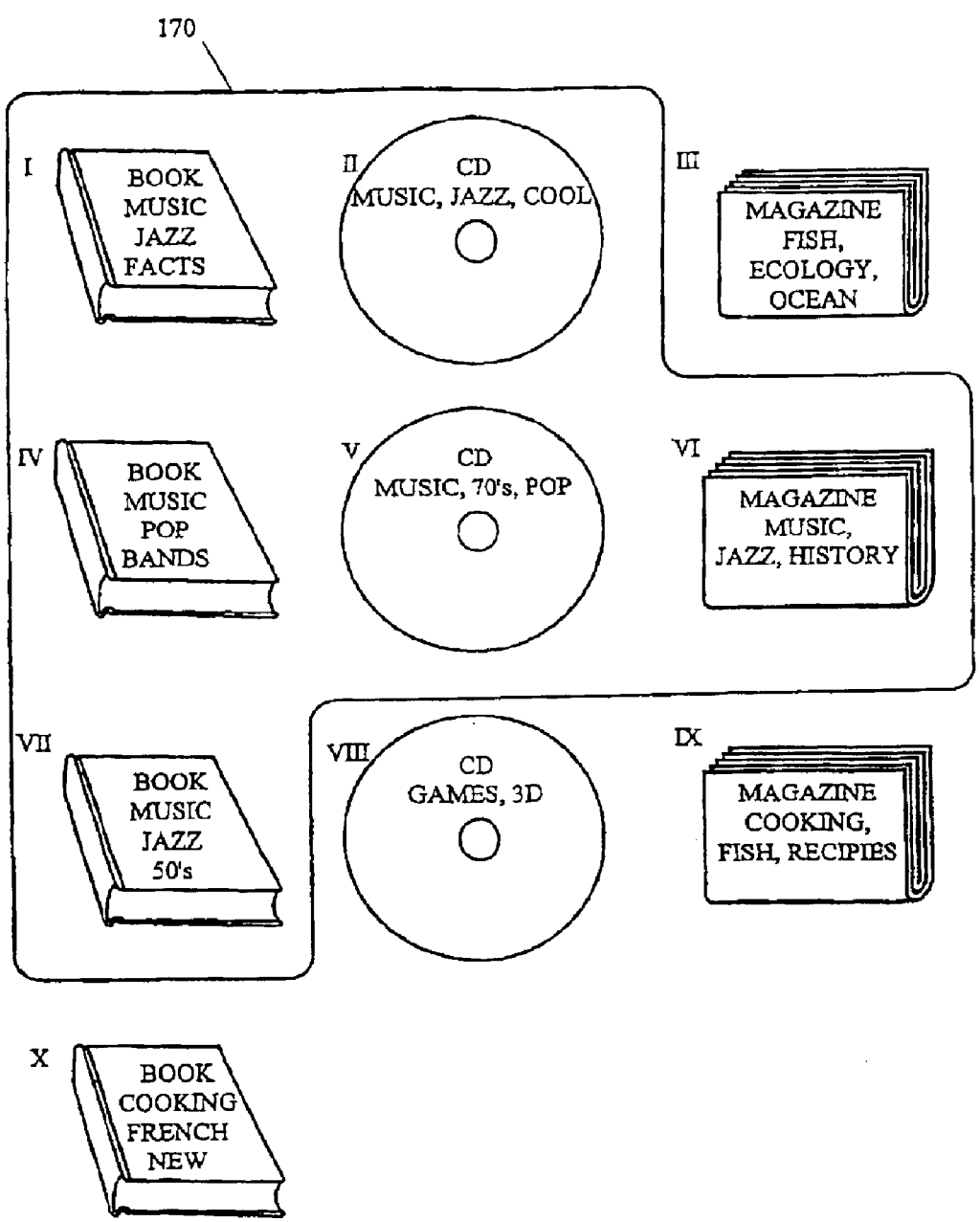
FIGS. 8A, 8B, 8C, 8D and 8E are illustrations of steps in a methodology for building a structure of clusters in the form of a directory tree.

Reference is now made to FIGS. 8A, 8B, 8C and 8D which illustrate further steps in the clustering process which result in the creation of a structure of clusters. FIG. 8A illustrates a first cluster 170 defined within a collection of items I to X where the cluster consists of items I, II, IV, V, VI and VII. Cluster 170 is assumed for the purposes of illustration to be the most preferred cluster within the collection of items I to X by virtue of its being assumed to have the highest Cluster Quality Metric of all possible first clusters.

Figure 8B:
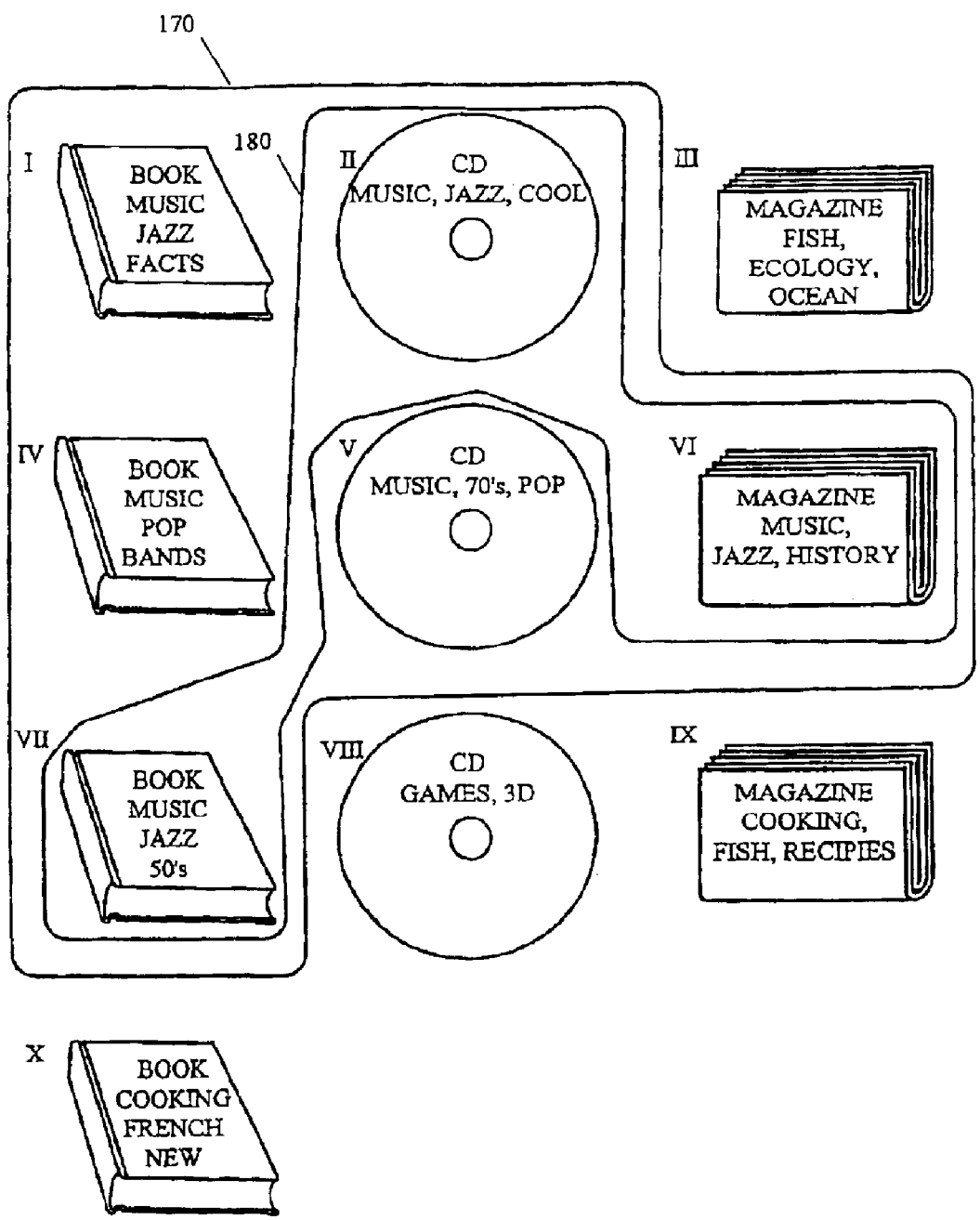

FIG. 8B is an illustration of an example of a next most preferred cluster 180, in this case defined within cluster 170 of FIG. 8A. Cluster 180 consists of items V, VI and VII and is assumed to have the highest Cluster Quality Metric of all possible clusters of items from the items of I, II, IV, V, VI and VII of Cluster 170 except for cluster 170 itself. The procedure to select cluster 180 from within cluster 170 may be identical to the procedure for selecting cluster 170 from within the entire collection of items.

Figure 8C:
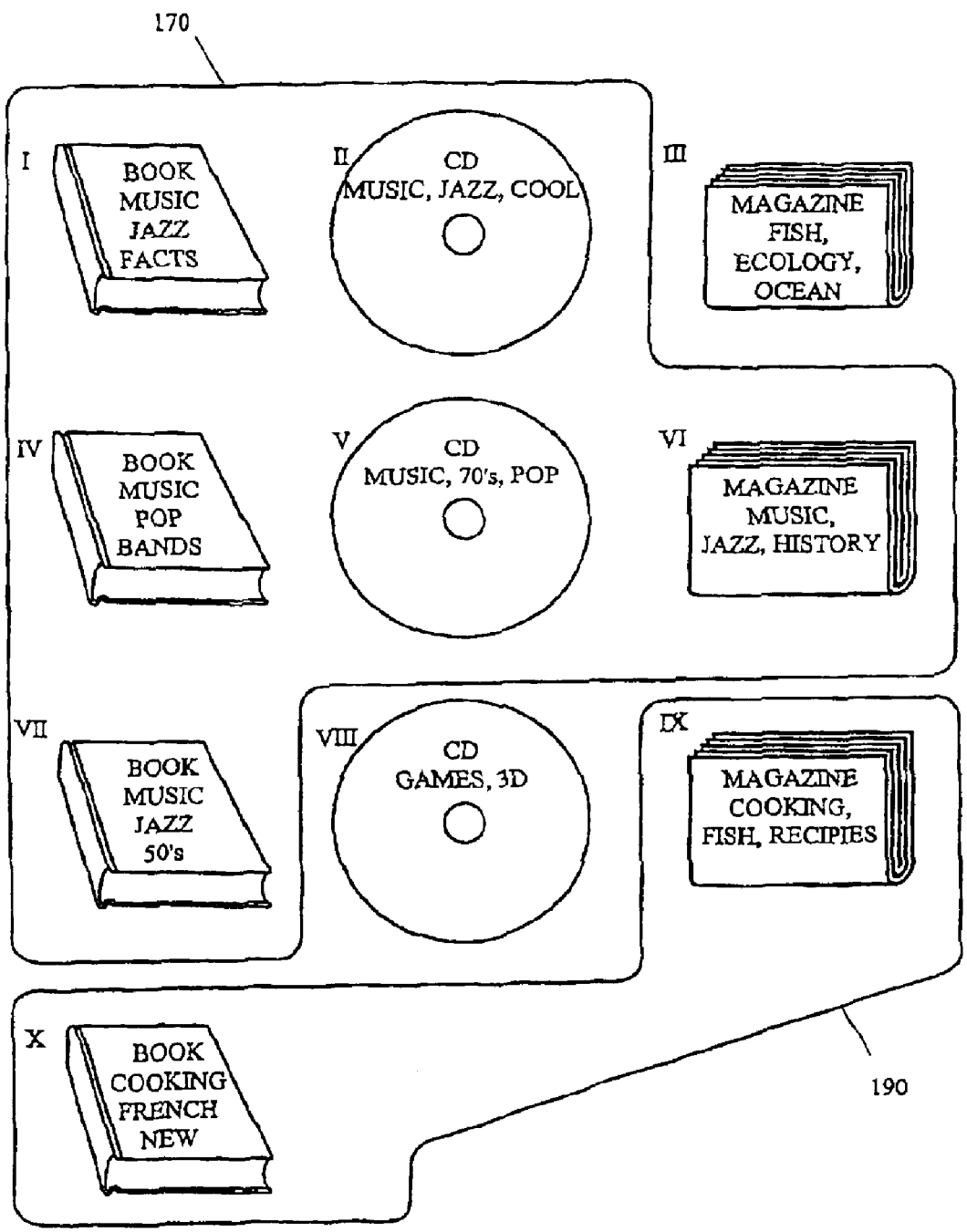

FIG. 8C is an illustration of an example of an alternative next most preferred cluster 190, in this case defined outside cluster 170. Cluster 190 consists of items IX and X and is assumed to have the highest Cluster Quality Metric of all possible clusters within the collection of items I to X and excluding cluster 170.

Figure 8D:
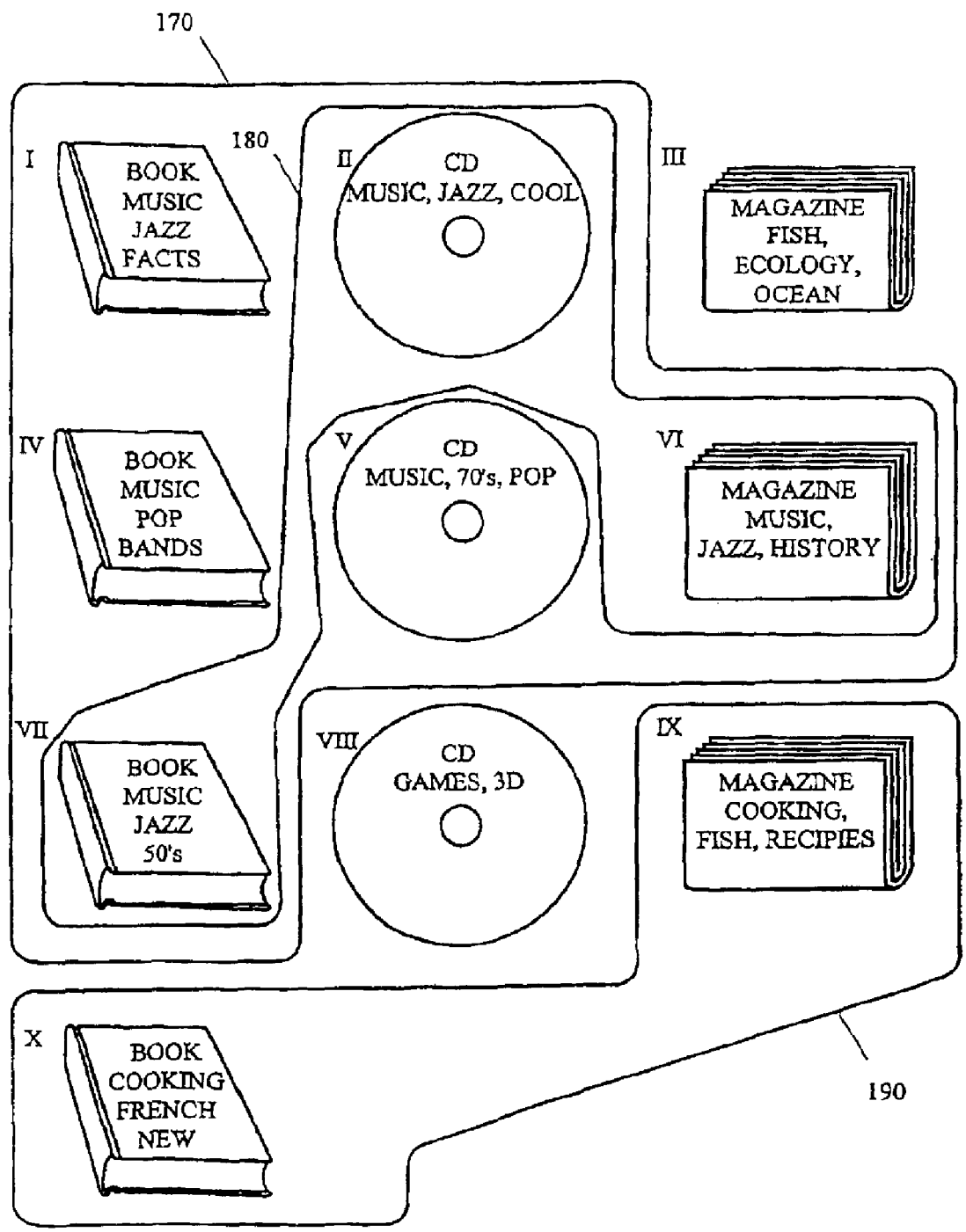

FIG. 8D is an illustration of all three clusters 170, 180 and 190 that are assumed to be the first, second and third most preferred clusters within the collection of items I to X. These three clusters are presented to the user using their preferred descriptors as follows:

| | |
|---|---|
| I. MUSIC | Cluster 170 |
| A. JAZZ | Cluster 180 |
| II. COOKING | Cluster 190 |

Figure 8E:
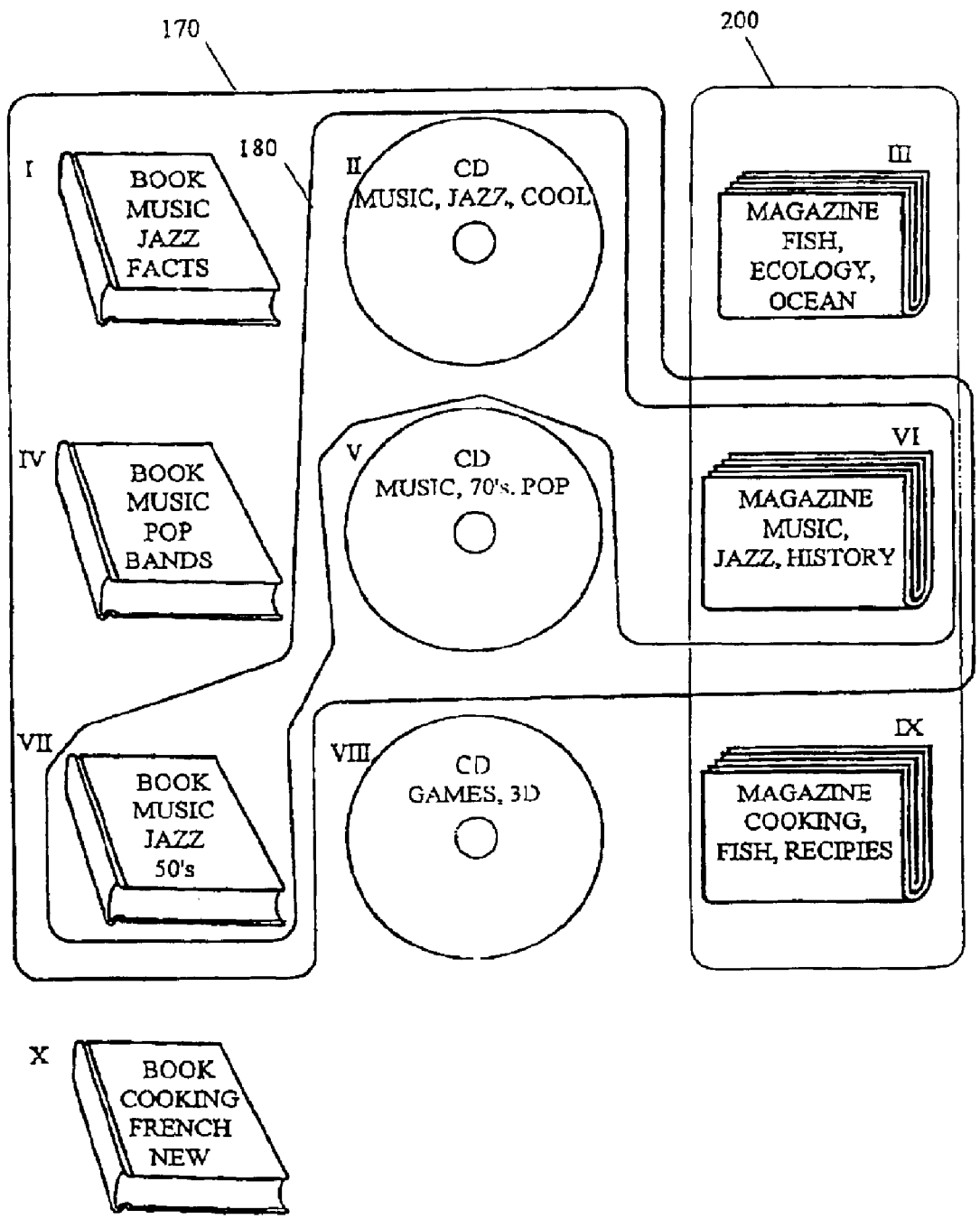

Reference is now made to FIG. 8E that illustrates alternative first and second assumed most preferred clusters 170 and 200. Clusters 170 and 190 of FIG. 8D are mutually exclusive as none of their items is associated with both clusters. Alternatively, in FIG. 8E, a first most preferred cluster 170 and a second most preferred cluster 200 are mutually non-exclusive as cluster 200 includes item VI that is also included in cluster 170.

Figure 9:
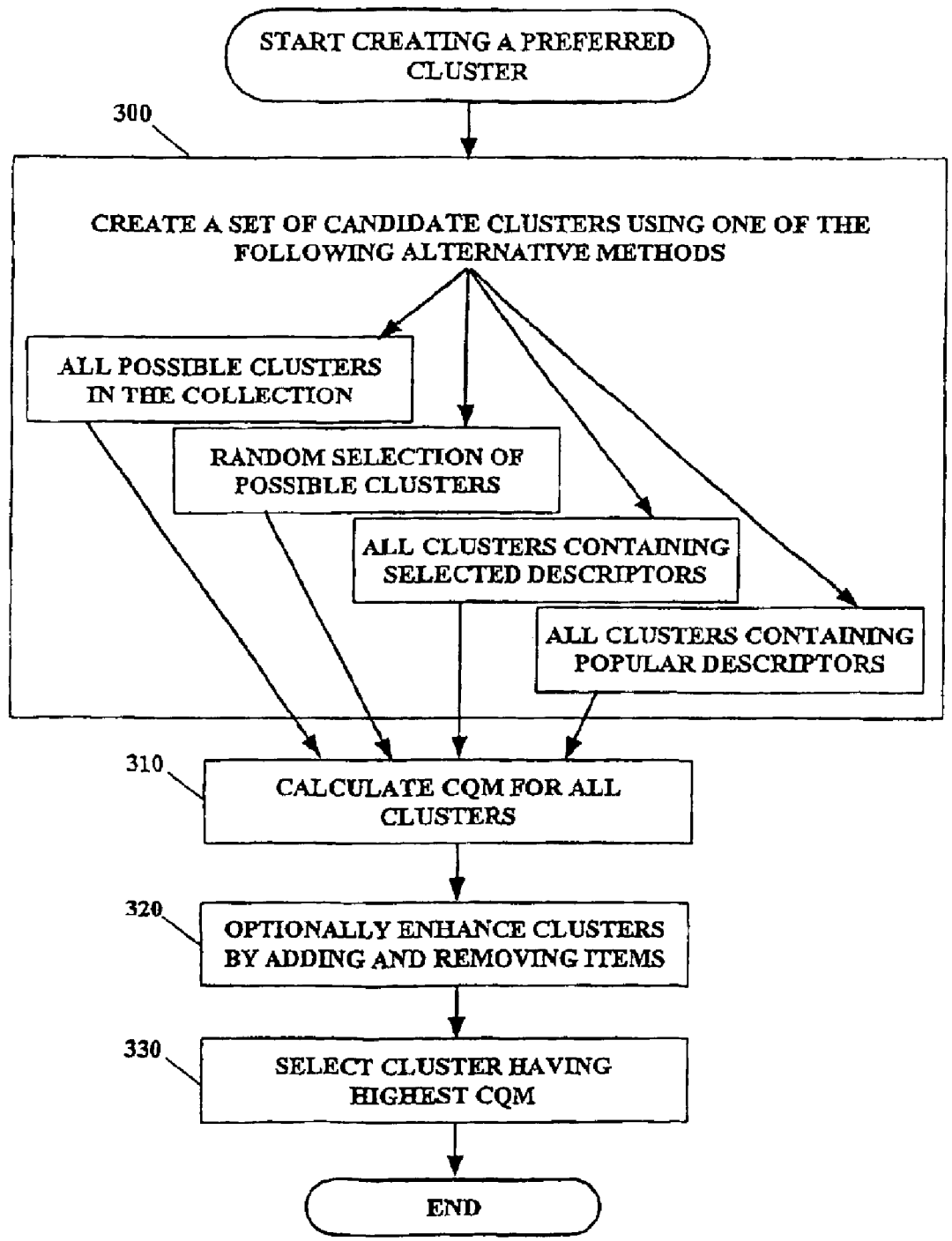
FIG. 9 is a simplified flowchart illustrating creation of a preferred cluster in accordance with a preferred embodiment of the present invention.

Reference is now made to FIG. 9 which is a simplified block diagram of a procedure for identifying a good cluster within a collection of items.

In step 300, a group of candidate clusters is selected. Each cluster is a set of items having at least one descriptor. The selected group of candidate items may be selected using any method. Representative examples of appropriate methods include the following:

(i) selecting all possible clusters, i.e., all possible combinations of items within the collection. This method is appropriate for small collections;

(ii) selecting a group of randomly chosen sets of items;

(iii) selecting sets of items having descriptors listed in a predetermined list of descriptors; and (iv) finding those descriptors ("popular descriptors") most widely represented in the items of the collection, and building candidate clusters by including in each candidate cluster all of the items including one of the chosen popular descriptors.

Alternatively candidate clusters may be selected according to various known methods.

In step 310 the CQM is calculated for all the clusters.

In step 320, each candidate cluster is optionally enhanced such as by using the method illustrated in FIGS. 6A, 6B & 6C.

In step 330 the candidate with the highest CQM is selected.

Figure 10:
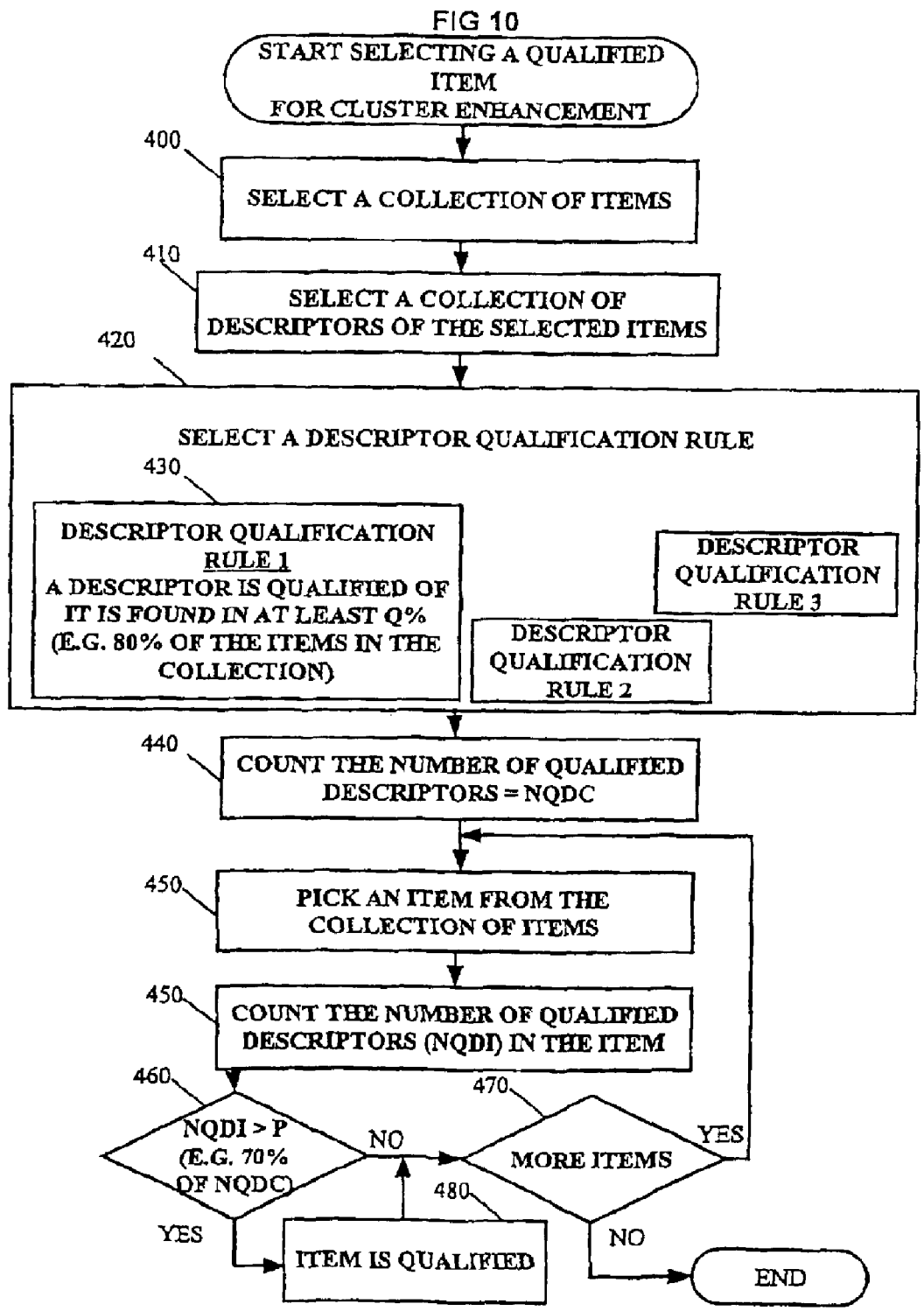
FIG. 10 is a simplified flowchart illustrating selection of a qualified item for cluster enhancement in accordance with a preferred embodiment of the present invention.

Reference is now made to FIG. 10 which illustrates selection of qualified items to be added or removed from the cluster in a process of cluster enhancement in accordance with a preferred embodiment of the present invention. The rule used in the preferred embodiment presented in FIG. 10 is that a descriptor is qualified if it is found in at least some percentage Q %, for example Q=80%, of the items in given cluster. The method as presented in FIG. 10 is then to determine which of the items in the given collection are qualified items for addition or removal, according to the rule. For example, if in the cluster consisting of items I, IV, VII, and X of FIGS. 4A–4I, the descriptors "book" and "music" would be qualified descriptors, the descriptors "facts", "pop", "jazz", "bands", "50's", "cooking", "French", and "new" would not be qualified descriptors.

In steps 450–470, qualified descriptors of the cluster are determined, according to a rule. In step 450 and 460, each item of the cluster having qualified descriptors (NQDI) of at least some minimum percentage Z, for example Z=70%, of the number of qualified descriptors (NQDC) for the collection of items is determined to be a qualified item for addition. Similarly, each item of the cluster having qualified descriptors NQDI lower than the minimum percentage Z of the number of qualified descriptors (NQDC) for the collection of items is determined to be a qualified item for removal. In a preferred embodiment, this addition or removal is executed only if the cluster's CQM is improved thereby.

Referring to the example of the cluster including items I, IV, VII, and X of FIGS. 4A–4I and assuming a threshold P=50%, the descriptors "book", "music", and "jazz" would be identified as qualified descriptors. The item X would be removed from the cluster, since it does not contain at least 50% of those three descriptors and items II and VI would be added, as they do contain at least 50% of the cluster's qualified descriptors.

It should be noted that the removal of items from and addition of items to the cluster will in many cases cause a re-definition of the list of qualified descriptors, thereby giving occasion to additional additions and removals of items.

Since this process is not necessarily guaranteed to be finite in nature, depending as it does on the particular items of the collection and the particular selection of the percentages X, Y, and Z, the process is preferably designed so as to be sensitive to considerations of efficiency of operation. In a preferred embodiment the process is repeated either until no change is effected, or until a set number of iterations, for example five iterations, have taken place.

It should be noted that whereas the percentages Q=50% and P=50% are useful for purposes of illustration with respect to the examples presented in FIGS. 4A–4I, in a preferred mode of operation, Q and P are each preferably 80%.

Limitation of calculations to qualified descriptors may also be used in an alternative method for calculating a Cluster Quality Metric, herein referred to as CQM2. CQM2 is calculated according to the following formula:

$$CQM2 = aX + bY + cV - dU$$

where:

a, b, c, d are adjustable coefficients. In a preferred embodiment they are chosen so as to give equal influence to the factors X, Y, V, and U.

X is the number of items in the cluster

Y is the number of qualified descriptors in the cluster

V is defined by the following formula:

$$V = \frac{s_1 + s_2 + \cdots + s_y}{X * Y}$$

Where $S_1 \ldots S_y$ are, for each qualified descriptor in the cluster, a count of the number of items in the cluster including that descriptor. It is noted that that the calculation of V is similar, but not identical, to the calculation of ICGS.

U is defined by the following formula:

$$U = \frac{r_1 + r_2 + \cdots + r_n}{n * Y}$$

where $r_1 \ldots r_n$ are, for each item of the set outside the cluster, the number of qualified descriptors of the cluster found in that item. Note that the calculation of U is similar to the calculation of ECGS. As U grows CQM2 decreases, whereas when X, Y & X grow, CQM2 increases.

Figure 11:
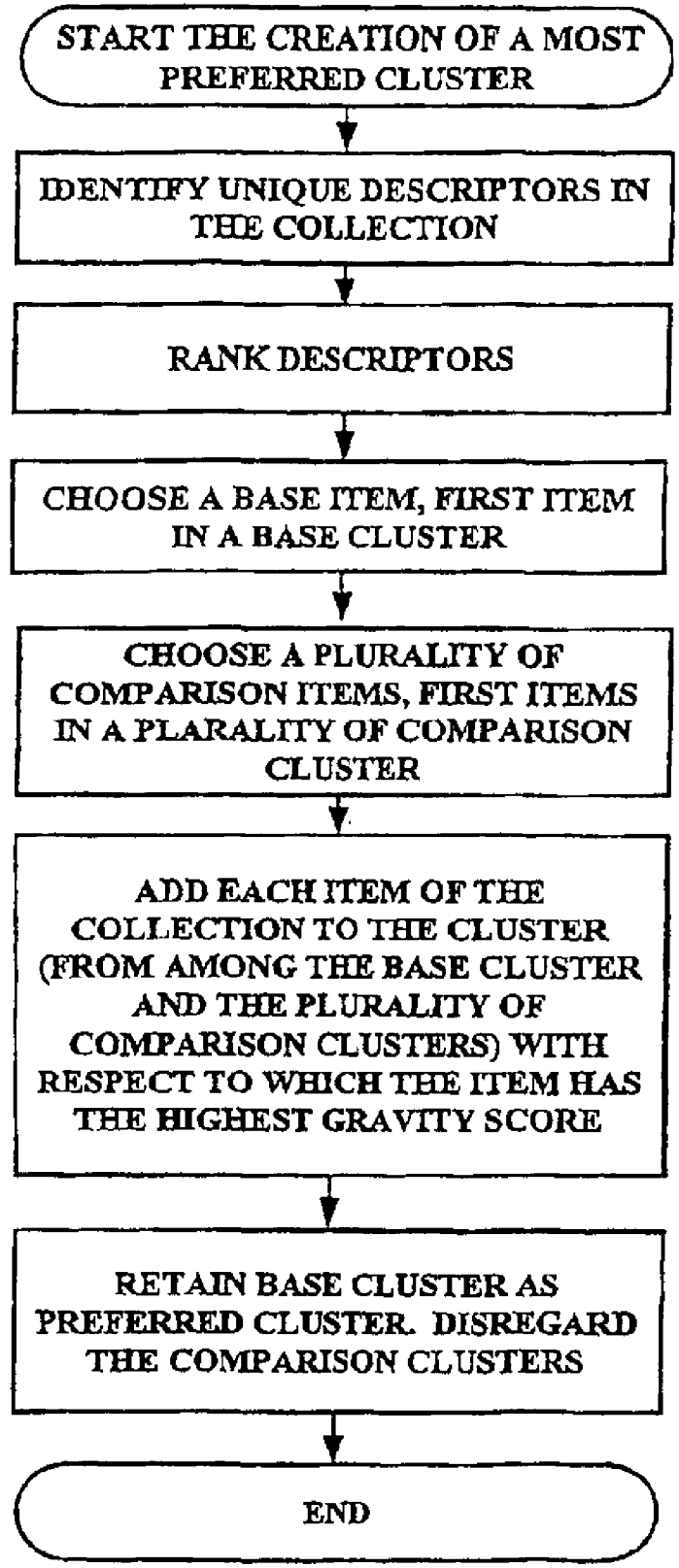
FIG. 11 is a simplified flowchart illustrating an alternative method for enhancing a cluster.

Reference is now made to FIG. 11, which illustrates another method for finding a preferred cluster within a collection of items each having at least one descriptor. The method of this embodiment comprises the steps of identifying a "base item" as an initial item of the cluster, and subsequently adding similar items to that cluster.

At step 1, all unique descriptors of the items of the collection are identified.

At step 2, the identified descriptors are ranked according to their popularity in the collection. That is, descriptors that exist in many items of the collection of items are ranked above descriptors existing in few items of the collection. In a preferred embodiment, each descriptor receives a "rank score" equal to the number of items of the collection in which that descriptor exists.

Optionally, this ranking may also be influenced by a weighting factor dependent on some characteristics of the descriptors, or of the items in which they appear. For example, descriptors of items having few descriptors might be given greater weight than descriptors of items having many descriptors. In an additional example, descriptors which are nouns might be given more weight or less weight than descriptors that are other parts of speech such as adjectives.

At step 3, a "base item" is chosen as a first item of a "base cluster". The base item is chosen as that item having the highest-ranking combination of high-ranking descriptors. In a preferred embodiment, this is accomplished by first calculating an item score for each item, which is the sum of the scores for each descriptor of the item. In this preferred embodiment the base item is then chosen by identifying the item having the highest item score.

At step 4, a plurality of "comparison items" are chosen. A first comparison item is an item having a high item score, yet also having a low similarity score when compared to the base item. Additional comparison items are chosen, being items having a high item score, yet also having a low similarity score when compared to the base item and further having a low similarity score when compared to all previously chosen comparison items. The number of comparison items to be selected is not critical, and may be determined according to convenience. In a preferred embodiment, when applied to collections numbering in the low hundreds of items, 10 comparison items are selected.

In step 5, the base item is considered to be a first item in a "base cluster", and each comparison item is considered to be a first item in a "comparison cluster". Thus at the start of step 5, there is a base cluster and a plurality of comparison clusters, each of these clusters having a single item. In step 5 a gravity score calculated for each item of the collection with respect to the base cluster and with respect to each comparison cluster, and each item is added to that cluster with respect to which it has the highest gravity score. Thus, at the end of step 5, each item in the collection has been added either to the base cluster or to one of the comparison clusters.

At step 6, the base cluster, now including all items of the collection having a higher gravity score with respect to the base cluster than with respect to any of the comparison clusters, is retained as the desired preferred cluster for the collection. The comparison clusters, having served their purpose of helping define the members of the base cluster, are disregarded for further use.

Optionally, steps 1–6 may be repeated recursively, taking as the collection referred to in step 1 either the items of the base cluster, disregarding any descriptors common to all the items, or the items of the collection exclusive of the base cluster.

It should be noted that the method of FIG. 11, similarly to the method of FIGS. 6A–6C and 10, may also be operated in a mode in which gravity calculations are made only with respect to qualified descriptors, according to a rule in which the qualified descriptors of any particular cluster are those descriptors appearing in some given percentage P of the items of that cluster.

Figure 12A:
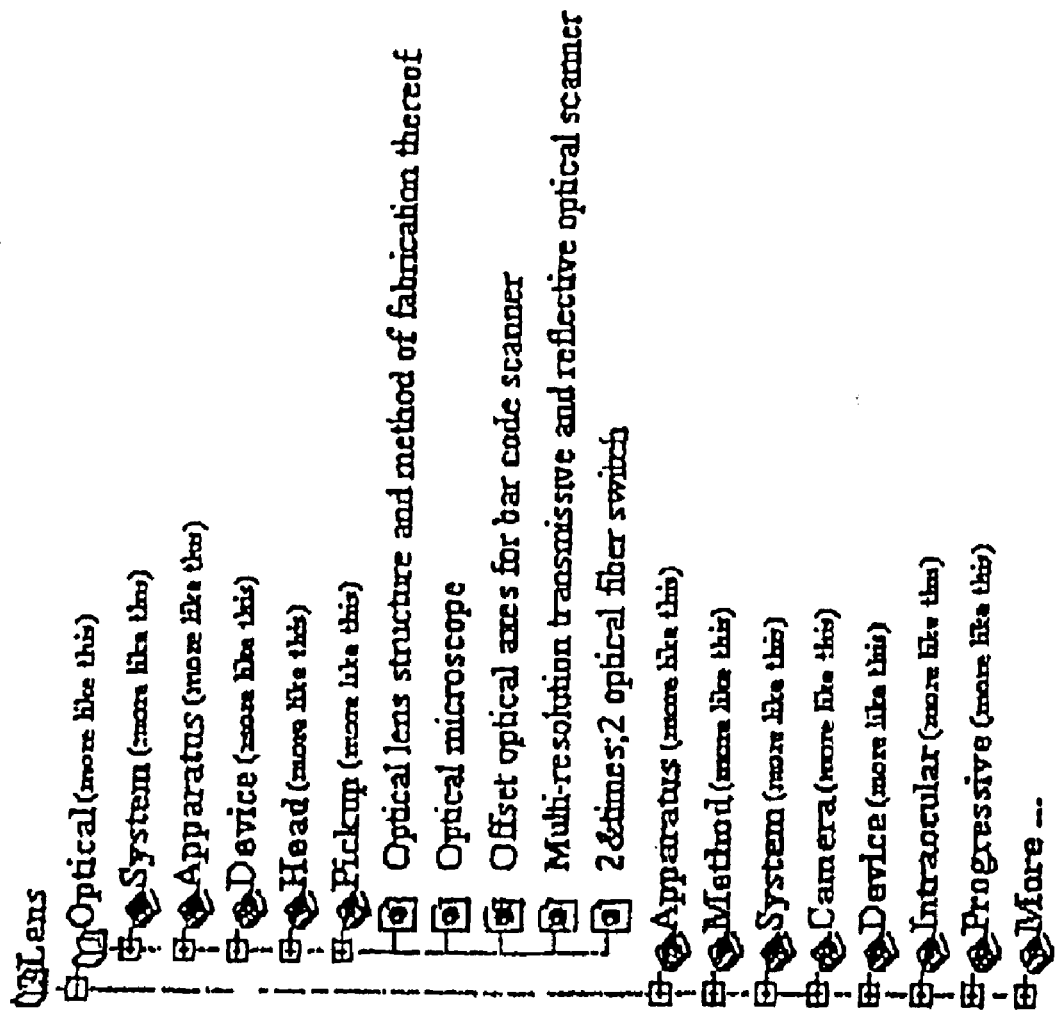
FIGS. 12A and 12B are screen shots produced respectively according to the prior art and according to the present invention.

Reference is now made to FIG. 12A, which is a typical screen display generated by a clustering system according to the teachings of prior art. In the example, the prior art method employed is that taught by U.S. Pat. No. 4,972,349 to Kleinberger. In FIG. 12A are seen a plurality of categories of information identified by this prior art clustering system, wherein categories are chosen by virtue of their having been found to have in common a particular descriptor or plurality of descriptors. The material being organized is a subset (typically including about 200 items) returned by a search for the word "lens" in the titles of recent U.S. patents. Words from the titles of the found documents, exclusive of connective words like "and" and "of" and "the", are taken as descriptors of the documents.

At first glance the tree structure generated as output of this prior art system appears to present meaningful categories, but closer inspection reveals an important weakness in the system. A category such as "camera" is indeed a useful category, in that it divides the collection of items about "lens" and "lenses" in a meaningful way: patents about camera lenses are likely to have significant commonalities when compared to patents about other types of lenses. However, categories such as "system", "apparatus", "device", and "method" clearly give very little information about the type of lens or lens patent contained therein. Methods for grinding lenses, methods for selling lenses, and methods for using lenses are grouped together under a "method" category. Moreover it may be seen from the example that the subcategories identified within the major category "optical" are virtually identical to the subcategories outside the category "optical". This is probably an indication that the presence or absence of the word "optical" in the title of a lens patent in this collection is not necessarily indicative that the lenses under discussion are other than optical in their construction and use.

In other words, many of the categories created by this prior art methodology in the given example have little predictive power with respect to the contents of the categories so described, beyond the presence or absence of the particular descriptor whose presence or absence defined the category according to this prior art method. Items within a category such as "optical" clearly seem to have about as much in common with items outside the category "optical" as they seem to have in common with each other.

Figure 12B:
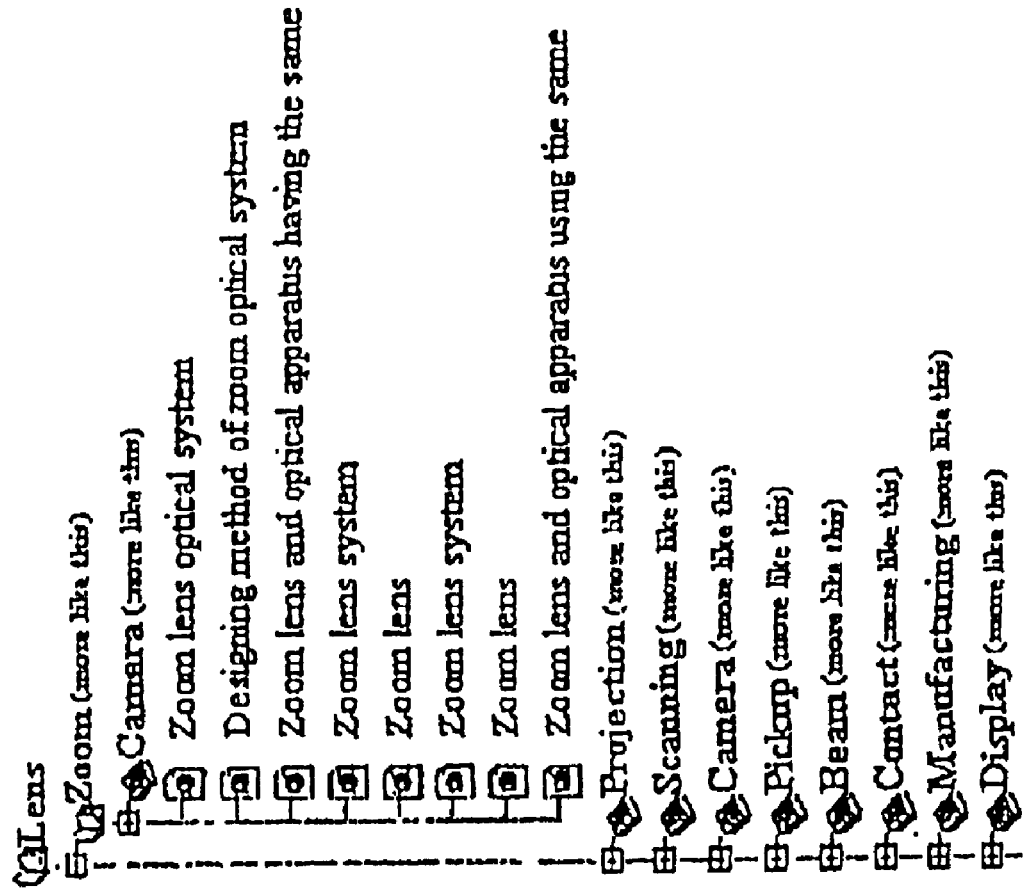

FIG. 12B presents a contrasting picture, in which the identical collection of items found by the identical search was divided into clusters by software designed and constructed according to a preferred embodiment of the present invention. In the search output presented by FIG. 12B, the relatively useless categories like "method" and "system" and "device" have disappeared, and in their place more meaningful categories such as "zoom" (zoom lenses), "projection", "scanning", "manufacturing", "contact" (contact lenses) etc. have appeared. This more felicitous choice of categories is enabled by the methodologies presented hereinabove.

It will be appreciated by persons skilled in the art that the present invention is not limited to what has been particularly shown and described hereinabove. Rather the scope of the present invention includes both combinations and subcombinations of the various features described hereinabove and shown in the drawings as well as modifications and further developments thereof which would occur to a person skilled in the art upon reading the foregoing description and which are not in the prior art.

What is claimed is:

1. A method of organizing items comprising:
    building up clusters of items, each item having information including at least one descriptor associated therewith;
    during building up of the clusters;
        calculating a similarity score S for first and second ones of said items, said calculating being carried out on selected descriptors among the descriptors of each item, said selected descriptors being qualified descriptors;
        selecting said qualified descriptors according to a rule; said rule specifying that only descriptor existing in at least 80% of the items in the particular set of items are qualified descriptors.
        evaluating dynamically a metric of the cluster based on said similarity score, the metric of the cluster expressing at least whether the descriptors of the items in the cluster have more in common with each other than they have in common with items outside of the cluster.

2. A method of organizing items according to claim 1 and wherein said metric is a commonality metric.

3. A method of organizing items according to claim 1 and wherein said metric is a similarity metric.

4. A method of organizing items according to claim 1 and wherein said metric is a non-commonality metric.

5. A method of organizing items according to claim 1 and wherein said metric is a non-similarity metric.

6. A method according to claim 1 and wherein said similarity score S is calculated for each descriptor in each item of a pair of items, by determining whether the same descriptor exists in both items of the pair.

7. A method according to claim 1 and wherein calculating said similarity score includes assigning at least one of a match count and an unmatch count to a pair of items.

8. A method according to claim 7 and also comprising weighting at least one of said match count and said unmatch count.

9. A method according to claim 1 and wherein said metric includes a function which grows as commonality between said items in said cluster grows and diminishes as uncommonality between said items in said cluster grows.

10. A method according to claim 1 and also comprising calculating a similarity metric for all possible item pairs in a collection of items, said calculating being based on said similarity score.

11. A method according to claim 10 and also comprising calculating a gravity score (GS) for one item in a collection with respect to a set of items in that collection, each item having at least one descriptor.

12. A method according to claim 11 wherein calculating of said gravity score (GS) for a given item with respect to a given set of items employs said similarity metric calculated for each item pair that may be formed including said given item and another item in said set.

13. A method according to claim 11 wherein calculating of said gravity score (GS) for a given item with respect to a given set of items employs a commonality metric for each item pair calculated for each item pair that may be formed including the given item and another item in said set.

14. A method according to claim 1 and wherein a cluster quality metric CQM is calculated for a cluster and wherein said cluster is a selected set of items in a collection of items, each item having at least one descriptor.

15. A method according to claim 14 and wherein said cluster quality metric CQM represents a measure of the quality of differentiation between said cluster and the remaining body of information.

16. A method according to claim 14 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

17. A method according to claim 1 and wherein an intra cluster gravity score ICGS is calculated based on said similarity score, and wherein said intra cluster gravity score represents the similarity among the information items within said cluster.

18. A method according to claim 1 and wherein an extra cluster gravity score ECGS is calculated based on said similarity score, and wherein said extra cluster gravity score represents said similarity between the information items within said cluster and information items outside said cluster.

19. A method according to claim 11 and wherein an intra cluster gravity score ICGS is calculated and wherein said ICGS is equal to the total of said gravity scores for each item in said cluster with respect to all items inside said cluster in said collection divided by the number of items in said cluster.

20. A method according to claim 11 and wherein an extra cluster gravity score ECGS is calculated and wherein said ECGS is equal to the total of said gravity scores for each item in said cluster with respect to all items outside said cluster in said collection divided by the number of items in said cluster.

21. A method according to claim 14 and wherein said cluster quality metric CQM increases as an intra-cluster gravity score grows.

22. A method according to claim 14 and wherein said cluster quality metric for said cluster is increased by adding or removing items to or from said cluster.

23. A method according to claim 14 for creating a best cluster of items, the method involving creating a cluster, modifying said cluster, measuring said cluster quality metric CQM of said modified cluster and selecting the cluster having the highest CQM.

24. A method according to claim 1 and also comprising creating a structure of clusters, wherein a first cluster is a most preferred cluster within the collection of items and wherein a second cluster is a most preferred cluster within the first cluster.

25. A method according to claim 1 and also comprising creating a structure of clusters, wherein a first cluster is a most preferred cluster within the collection of items and wherein a second cluster is a most preferred cluster within the items not included in the first cluster.

26. A method according to claim 24 and wherein said most preferred cluster has the highest Cluster Quality Metric of all possible first clusters available for comparison.

27. A method according to claim 24 wherein said structure of clusters is presented to the user as a hierarchical tree.

28. A method according to claim 24 and wherein a preferred cluster is identified within a collection of items, the method comprising:
    selecting a group of candidate clusters, each cluster comprising a set of items having at least one descriptor;
    calculating cluster quality metric CQM for all said clusters;
    optionally enhancing each of said clusters; and
    selecting the cluster having the highest CQM.

29. A method according to claim 28 and wherein a collection of items is determined to include qualified item for enhancement of a cluster by addition to the cluster, the method comprising:
    determining the qualified descriptors for each of said items in said collection;
    determining the number of said qualified descriptors for said collection (NQDC) of items;
    determining the number of said qualified descriptors for each said item in said collection of items (NQDI); and
    selecting all said items of the collection having said qualified descriptors (NQDI) of at least some minimum percentage of said number of qualified descriptors (NQDC) for said collection of said items.

30. A method according to claim 28 and wherein a collection of items is determined to include qualified items for enhancement of a cluster by removal from the cluster the method comprising:

determining the qualified descriptors for each of said items in said cluster;

determining the number of qualified descriptors for said cluster (NQDC);

determining the number of said qualified descriptors for each said item in said collection of items (NQDI); and selecting all items of said cluster having number of qualified descriptors (NQDI) of at the most some maximum percentage of said number of qualified descriptors (NQDC) for said cluster.

31. A method according to claim 28 and wherein the enhancement of a cluster causes a re-definition of the list of qualified descriptors, thereby giving occasion to additional additions and removals of items.

32. A method according to claim 31 and wherein the process of cluster enhancement is repeated until no change is effected.

33. A method according to claim 31 and wherein the process of cluster enhancement is repeated until a set number of iterations have taken place.

34. A method according to claim 31 for finding a preferred cluster within a collection of items each having at least one descriptor, the method comprising:

identifying all the unique descriptors of the items of the collection;

ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

35. A method according to claim 34 and wherein said identified unique descriptors are the highly ranking descriptors and wherein descriptors that exist in many items of the collection of items are ranked above descriptors existing in few items of the collection.

36. A method according to claim 34 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

37. A method according to claim 36 and wherein identifying, marking, selecting and retaining may be repeated recursively, taking as the collection either the items of said base cluster, disregarding any descriptors common to all said items, or said items of the collection exclusive of said base cluster.

38. A method according to claim 34 and wherein a directory tree is created automatically for the results of a free text search.

39. A method according to claim 38 and wherein said directory tree is built generally instantaneously.

40. A method according to claim 38 and wherein said directory tree is organized, and the information items are sorted into the directory tree, based on a commonality metric that involves several terms.

41. A method according to claim 38 and wherein said directory tree is organized, and the information items are sorted into the directory tree, based on a commonality metric that involves a plurality of terms.

42. A method according to claim 38 and wherein said directory tree is organized, and the information items are sorted into the directory tree, in an iterative manner where information items are added or removed from clusters to eliminate insufficient or redundant clustering.

43. A method according to claim 38 and wherein further queries are performed in response to a user's request for a particular preferred cluster.

44. A method of organizing information comprising:

breaking down clusters of information items, each item including at least one descriptor;

during breaking down of the clusters:

calculating a similarity score S for first and second ones of said items, said calculating being carried out on selected descriptors among the descriptors of each item, said selected descriptors being qualified descriptors;

selecting said qualified descriptors according to a rule; said rule specifying that only descriptor existing in at least 80% of the items in the particular set of items are qualified descriptors evaluating dynamically a metric of the cluster based on said similarity score, the metric of the cluster expressing at least whether the descriptors of the items in the cluster have more in common with each other than they have in common with items outside of the cluster.

45. A method of organizing information according to claim 44 and wherein said metric is a commonality metric.

46. A method of organizing information according to claim 44 and wherein said metric is a similarity metric.

47. A method of organizing information according to claim 44 and wherein said metric is a non-commonality metric.

48. A method of organizing information according to claim 44 and wherein said metric is a non-similarity metric.

49. A method according to claim 44 and wherein said similarity score S is calculated for each descriptor in each item of a pair of items, by determining whether the same descriptor exists in both items of the pair.

50. A method according to claim 44 and wherein calculating said similarity score includes assigning at least one of a match count and an unmatch count to a pair of items.

51. A method according to claim 50 and also comprising weighting at least one of said match count and said unmatch count.

52. A method according to claim 44 and wherein said metric includes a function which grows as commonality between said items in said cluster grows and diminishes as uncommonality between said items in said cluster grows.

53. A method according to claim 44, and also comprising calculating where a similarity metric for all possible item pairs in a collection of items, said calculating being based on said similarity score.

54. A method according to claim 53 and also comprising calculating a gravity score (GS) for one item in a collection with respect to a set of items in that collection, each item having at least one descriptor.

55. A method according to claim 54 wherein calculating of said gravity score (GS) for a given item with respect to a given set of items employs said similarity metric calculated for each item pair that may be formed including said given item and another item in said set.

56. A method according to claim 54 wherein calculating of said gravity score (GS) for a given item with respect to a given set of items employs a commonality metric for each item pair calculated for each item pair that may be formed including the given item and another item in said set.

57. A method according to claim 44 and wherein a cluster quality metric CQM is calculated for a cluster and wherein said cluster is a selected set of items in a collection of items, each item having at least one descriptor.

58. A method according to claim 57 and wherein said cluster quality metric CQM represents a measure of the quality of differentiation between said cluster and the remaining body of information.

59. A method according to claim 57 and wherein said cluster quality metric CQM includes a function that increases as the cluster increasingly contains information that is substantially similar to the remaining body of the information in said cluster and diminishes as said cluster increasingly contains information that is substantially different from the remaining body of the information in said collection.

60. A method according to claim 44 wherein an intra cluster gravity score ICGS is calculated based on said similarity score and wherein said intra cluster gravity score represents the similarity among the information items within said cluster.

61. A method according to claim 44 and wherein an extra cluster gravity score ECGS is calculated based on said similarity score and wherein said extra cluster gravity score represents the similarity between the information items within said cluster and information items outside said cluster.

62. A method according to claim 54 and wherein an intra cluster gravity score ICGS is calculated and wherein said intra cluster gravity score is equal to the total of said gravity scores for each item in said cluster with respect to all items inside said cluster in said collection divided by the number of items in said cluster.

63. A method according to claim 54 and wherein an extra cluster gravity score ECGS is calculated and wherein said ECGS is equal to the total of said gravity scores for each item in said cluster with respect to all items outside said cluster in said collection divided by the number of items in said cluster.

64. A method according to claim 57 and wherein said cluster quality metric CQM increases as an intra-cluster gravity score grows.

65. A method according to claim 57 and wherein said cluster quality metric for said cluster is increased by adding or removing items to or from a cluster.

66. A method according to claim 57 for creating a best cluster of items, the method involving creating a cluster, modifying said cluster, measuring said cluster quality metric CQM of the modified cluster and selecting said cluster having the highest CQM.

67. A method according to claim 44 and wherein also comprising creating a structure of clusters, wherein a first cluster is a most preferred cluster within the collection of items and wherein a second cluster is a most preferred cluster within the first cluster.

68. A method according to claim 44 and also comprising creating a structure of clusters, wherein a first cluster is a most preferred cluster within the collection of items and wherein a second cluster is a most preferred cluster within the items not included in the first cluster.

69. A method according to claim 67 and wherein said most preferred cluster has the highest Cluster Quality Metric of all possible first clusters available for comparison.

70. A method according to claim 67 and wherein said structure of clusters is presented to the user as a hierarchical tree.

71. A method according to claim 67 and wherein a preferred cluster is identified within a collection of items, the method comprising:
    selecting a group of candidate clusters, each cluster comprising a set of items having at least one descriptor;
    calculating cluster quality metric CQM for all said clusters;
    optionally enhancing each of said cluster; and
    selecting the cluster having the highest CQM.

72. A method according to claim 71 and wherein a collection of items is determined to include qualified item for enhancement of a cluster by addition to the cluster, the method comprising:
    determining the qualified descriptors for each of said items in said collection;
    determining the number of said qualified descriptors for said collection (NQDC) of items;
    determining the number of said qualified descriptors for each said item in said collection of items (NQDI); and
    selecting all said items of the collection having said qualified descriptors (NQDI) of at least some minimum percentage of said number of qualified descriptors (NQDC) for said collection of said items.

73. A method according to claim 71 and wherein a collection of items is determined to include qualified item for enhancement of a cluster by removal from the cluster, the method comprising:
    determining the qualified descriptors for each of said items in said collection;
    determining the number of said qualified descriptors for said collection (NQDC) of items;
    determining the number of said qualified descriptors for each said item in said collection of items (NQDI); and
    selecting all said items of the collection having said qualified descriptors (NQDI) of at least some maximum percentage of said number of qualified descriptors (NQDC) for said collection of said items.

74. A method according to claim 71 and wherein the enhancement of a cluster causes a re-definition of the list of qualified descriptors, thereby giving occasion to additional additions and removals of items.

75. A method according to claim 74 and wherein the process of cluster enhancement is repeated until no change is effected.

76. A method according to claim 74 and wherein the process of cluster enhancement is repeated until a set number of iterations have taken place.

77. A method according to claim 74 for finding a preferred cluster within a collection of items each having at least one descriptor, the method comprising:
    identifying all the unique descriptors of the items of the collection;
    ranking said identified descriptors according to their popularity in the collection;
    selecting a "base item" as a first item of a "base cluster";
    selecting a plurality of "comparison items", each said comparison item is considered to be a first item in a "comparison cluster"; and
    retaining said "base cluster" as the desired preferred cluster for the collection.

78. A method according to claim 77 and wherein said identified unique descriptors are the highly ranking descriptors and wherein descriptors that exist in many items of the collection of items are ranked above descriptors existing in few items of the collection.

79. A method according to claim 77 and also comprising:
selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

80. A method according to claim 79 and wherein identifying, marking, selecting and retaining may be repeated recursively, taking as the collection either the items of said base cluster, disregarding any descriptors common to all said items, or said items of the collection exclusive of said base cluster.

81. A method according to claim 77 and wherein a directory tree is created automatically for the results of a free text search.

82. A method according to claim 81 and wherein said directory tree is built generally instantaneously.

83. A method according to claim 81 and wherein said directory tree is organized, and the information items are sorted into the directory tree, based on a commonality metric that involves several terms.

84. A method according to claim 81 and wherein said directory tree is organized, and the information items are sorted into the directory tree, based on a commonality metric that involves a plurality of terms.

85. A method according to claim 81 and wherein said directory tree is organized, and the information items are sorted into the directory tree, in an iterative manner where information items are added or removed from clusters to eliminate insufficient or redundant clustering.

86. A method according to claim 81 and wherein further queries are performed in response to a user's request for a particular preferred cluster.

87. A method of organizing information comprising:
changing the population of clusters of information items, each item including at least one descriptor,
during changing the population of the clusters:
calculating a similarity score S for first and second ones of said items, said calculating being carried out on selected descriptors among the descriptors of each item, said selected descriptors being qualified descriptors;
selecting said qualified descriptors according to a rule; said rule specifying that only descriptor existing in at least 80% of the items in the particular set of items are qualified descriptors
evaluating dynamically a metric of the cluster based on said similarity score, the metric of the cluster expressing at least whether the descriptors of the items the cluster have more in common with each other than they have in common with items outside of the cluster.

88. A method of organizing information according to claim 87 and wherein said metric is a commonality metric.

89. A method of organizing information according to claim 87 and wherein said metric is a similarity metric.

90. A method of organizing information according to claim 87 and wherein said metric is a non-commonality metric.

91. A method of organizing information according to claim 87 and wherein said metric is a non-similarity metric.

92. A method according to claim 87 and wherein said similarity score S is calculated for each descriptor in each item of a pair of items, by determining whether the same descriptor exists in both items of the pair.

93. A method according to claim 87 and wherein calculating said similarity score includes assigning at least one of a match count and an unmatch count to a pair of items.

94. A method according to claim 93 and also comprising weighting at least one of said match count and said unmatch count.

95. A method according to claim 87 and wherein said metric includes a function which grows as commonality between said items in said cluster grows and diminishes as uncommonality between said items in said cluster grows.

96. A method according to claim 87 and, also comprising calculating a similarity metric for all possible item pairs in a collection of items, said calculating being based on said similarity score.

97. A method according to claim 96 and also comprising calculating a gravity score (GS) for one item in a collection with respect to a set of items in that collection, each item having at least one descriptor.

98. A method according to claim 97 wherein calculating of said gravity score (GS) for a given item with respect to a given set of items employs said similarity metric calculated for each item pair that may be formed including said given item and another item in said set.

99. A method according to claim 97 wherein calculating of said gravity score (GS) for a given item with respect to a given set of items employs a commonality metric for each item pair calculated for each item pair that may be formed including the given item and another item in said set.

100. A method according to claim 87 and wherein a cluster quality metric CQM is calculated for a cluster and wherein said cluster is a selected set of items in a collection of items, each item having at least one descriptor.

101. A method according to claim 100 and wherein said cluster quality metric CQM represents a measure of the quality of differentiation between said cluster and the remaining body of information.

102. A method according to claim 100 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

103. A method according to claim 87 and wherein an intra cluster gravity score ICGS is calculated based on said similarity score and wherein said intra cluster gravity score represents the similarity among the information items within said cluster.

104. A method according to claim 87 and wherein an extra cluster gravity score ECGS is calculated based on said similarity score and wherein said extra cluster gravity score represents the similarity between the information items within said cluster and information items outside said cluster.

105. A method according to claim 97 and wherein an intra cluster gravity score ICGS is calculated and wherein said ICGS is equal to the total of said gravity scores for each item in said cluster with respect to all items inside said cluster in said collection divided by the number of items in said cluster.

106. A method according to claim 97 and wherein an intra cluster gravity score ECGS is calculated and wherein said ECGS is equal to the total of said gravity scores for each item in said cluster with respect to all items outside said cluster in said collection divided by the number of items in the cluster.

107. A method according to claim 100 and wherein said cluster quality metric CQM increases as an intra cluster gravity score grows.

108. A method according to claim 100 and wherein said cluster quality metric for said cluster is increased by adding or removing items to or from said cluster.

109. A method according to claim 100 for creating a best cluster of items, the method involving creating a cluster, modifying the cluster, measuring the cluster quality metric CQM of the modified cluster and selecting the cluster having the highest CQM.

110. A method according to claim 87 and also comprising creating a structure of clusters, wherein a first cluster is a most preferred cluster within the collection of items and wherein a second cluster is a most preferred cluster within the first cluster.

111. A method according to claim 87 and also comprising creating a structure of clusters, wherein a first cluster is a most preferred cluster within the collection of items and wherein a second cluster is a most preferred cluster within the items not included in the first cluster.

112. A method according to claim 110 and wherein said most preferred cluster has the highest Cluster Quality Metric of all possible first clusters available for comparison.

113. A method according to claim 110 and wherein a structure of clusters is presented to the user as a hierarchical tree.

114. A method according to claim 110 and wherein a preferred cluster is identified within a collection of items, the method comprising:
   selecting a group of candidate clusters, each cluster comprising a set of items having at least one descriptor;
   calculating cluster quality metric CQM for all said clusters;
   optionally enhancing each of said clusters; and
   selecting the cluster having the highest CQM.

115. A method according to claim 114 and wherein a collection of items is determined to include qualified item for enhancement of a cluster by addition to the cluster, the method comprising:
   determining the qualified descriptors for each of said items in said collection;
   determining the number of said qualified descriptors for said collection (NQDC) of items;
   determining the number of said qualified descriptors for each said item in said collection of items (NQDI); and
   selecting all said items of the collection having said qualified descriptors (NQDI) of at least some minimum percentage of said number of qualified descriptors (NQDC) for said collection of said items.

116. A method according to claim 114 and wherein a collection of items is determined to include qualified item for enhancement of a cluster by removal from the cluster, the method comprising:
   determining the qualified descriptors for each of said items in said collection;
   determining the number of said qualified descriptors for said collection (NQDC) of items;
   determining the number of said qualified descriptors for each said item in said collection of items (NQDI); and
   selecting all said items of the collection having said qualified descriptors (NQDI) of at least some maximum percentage of said number of qualified descriptors (NQDC) for said collection of said items.

117. A method according to claim 114 and wherein the enhancement of a cluster causes a re-definition of the list of qualified descriptors, thereby giving occasion to additional additions and removals of items.

118. A method according to claim 117 and wherein the process of cluster enhancement is repeated until no change is effected.

119. A method according to claim 117 and wherein the process of cluster enhancement is repeated until a set number of iterations have taken place.

120. A method according to claim 117 for finding a preferred cluster within a collection of items each having at least one descriptor, the method comprising:
   identifying all the unique descriptors of the items of the collection;
   ranking said identified descriptors according to their popularity in the collection;
   selecting a "base item" as a first item of a "base cluster";
   selecting a plurality of "comparison items", each said comparison item is considered to be a first item in a "comparison cluster"; and
   retaining said "base cluster" as the desired preferred cluster for the collection.

121. A method according to claim 120 and wherein said identified unique descriptors are the highly ranking descriptors and wherein descriptors that exist in many items of the collection of items are ranked above descriptors existing in few items of the collection.

122. A method according to claim 120 and also method comprising:
   selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

123. A method according to claim 122 and wherein identifying, marking, selecting and retaining may be repeated recursively, taking as the collection either the items of said base cluster, disregarding any descriptors common to all said items, or said items of the collection exclusive of said base cluster.

124. A method according to claim 120 and wherein a directory tree is created automatically for the results of a free text search.

125. A method according to claim 124 and wherein said directory tree is built generally instantaneously.

126. A method according to claim 124 and wherein said directory tree is organized, and the information items are sorted into the directory tree, based on a commonality metric that involves several terms.

127. A method according to claim 124 and wherein said directory tree is organized, and the information items are sorted into the directory tree, based on a commonality metric that involves a plurality of terms.

128. A according to claim 124 and wherein said directory tree is organized, and the information items are sorted into the directory tree, in an iterative manner where information items are added or removed from clusters to eliminate insufficient or redundant clustering.

129. A method according to claim 124 and wherein further queries are performed in response to a user's request for a particular preferred cluster.

130. A method of organizing items comprising:
   building up clusters of items, each item having information including at least one descriptor associated therewith;
   during building up of the clusters:
      calculating a similarity score S for first and second ones of said items;

calculating a similarity metric for all possible item pairs in a collection of items, said calculating being based on said similarity score;

calculating a gravity score (GS) for one item in a collection with respect to a set of items in that collection, each item having at least one descriptor; and evaluating dynamically a metric of the cluster based on said similarity score, the metric of the cluster expressing at least whether the descriptors of the items in the cluster have more in common with each other than they have in common with items outside of the cluster.

131. A method of organizing items according to claim 130 and wherein said cluster metric is a commonality metric.

132. A method of organizing items according to claim 130 and wherein said cluster metric is a similarity metric.

133. A method of organizing items according to claim 130 and wherein said cluster metric is a non-commonality metric.

134. A method of organizing items according to claim 130 and wherein said cluster metric is a non-similarity metric.

135. A method according to claim 130 and wherein said similarity score S is calculated for each descriptor in each item of a pair of items, by determining whether the same descriptor exists in both items of the pair.

136. A method according to claim 130 and wherein said similarity calculating is carried out on selected descriptors among the descriptors of each item, said selected descriptors being qualified descriptors.

137. A method according to claim 136 and wherein said qualified descriptors are selected according to a rule.

138. A method according to claim 130 and wherein calculating said similarity score includes assigning at least one of a match count and an unmatch count to a pair of items.

139. A method according to claim 138 and also comprising weighting at least one of said match count and said unmatch count.

140. A method according to claim 130 and wherein said cluster metric includes a function which grows as commonality between said items in said cluster grows and diminishes as uncommonality between said items in said cluster grows.

141. A method according to claim 130 wherein calculating of said gravity score (GS) for a given item with respect to a given set of items employs said similarity metric calculated for each item pair that may be formed including said given item and another item in said set.

142. A method according to claim 130 wherein calculating of said gravity score (GS) for a given item with respect to a given set of items employs a commonality metric for each item pair calculated for each item pair that may be formed including the given item and another item in said set.

143. A method according to claim 130 and wherein a cluster quality metric CQM is calculated for a cluster and wherein said cluster is a selected set of items in a collection of items, each item having at least one descriptor.

144. A method according to claim 143 and wherein said cluster quality metric CQM represents a measure of the quality of differentiation between said cluster and the remaining body of information.

145. A method according to claim 143 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

146. A method according to claim 130 and wherein an intra cluster gravity score ICGS is calculated based on said similarity score, and wherein said intra cluster gravity score represents the similarity among the information items within said cluster.

147. A method according to claim 130 and wherein an extra cluster gravity score ECGS is calculated based on said similarity score, and wherein said extra cluster gravity score represents said similarity between the information items within said cluster and information items outside said cluster.

148. A method according to claim 130 and wherein an intra cluster gravity score ICGS is calculated and wherein said ICGS is equal to the total of said gravity scores for each item in said cluster with respect to all items inside said cluster in said collection divided by the number of items in said cluster.

149. A method according to claim 130 and wherein an extra cluster gravity score ECGS is calculated and wherein said ECGS is equal to the total of said gravity scores for each item in said cluster with respect to all items outside said cluster in said collection divided by the number of items in said cluster.

150. A method according to claim 143 and wherein said cluster quality metric CQM increases as an intra-cluster gravity score grows.

151. A method according to claim 143 and wherein said cluster quality metric for said cluster is increased by adding or removing items to or from said cluster.

152. A method according to claim 143 for creating a best cluster of items, the method involving creating a cluster, modifying said cluster, measuring said cluster quality metric CQM of said modified cluster and selecting the cluster having the highest CQM.

153. A method according to claim 130 and also comprising creating a structure of clusters, wherein a first cluster is a most preferred cluster within the collection of items and wherein a second cluster is a most preferred cluster within the first cluster.

154. A method according to claim 130 and also comprising creating a structure of clusters, wherein a first cluster is a most preferred cluster within the collection of items and wherein a second cluster is a most preferred cluster within the items not included in the first cluster.

155. A method according to claim 153 and wherein said most preferred cluster has the highest Cluster Quality Metric of all possible first clusters available for comparison.

156. A method according to claim 153 and wherein said structure of clusters is presented to the user as a hierarchical tree.

157. A method according to claim 153 and wherein a preferred cluster is identified within a collection of items, the method comprising:

selecting a group of candidate clusters, each cluster comprising a set of items having at least one descriptor;

calculating cluster quality metric CQM for all said clusters;

optionally enhancing each of said clusters; and selecting the cluster having the highest CQM.

158. A method according to claim 157 and wherein a collection of items is determined to include qualified item for enhancement of a cluster by addition to the cluster, the method comprising:

determining the qualified descriptors for each of said items in said collection;

determining the number of said qualified descriptors for said collection (NQDC) of items;

determining the number of said qualified descriptors for each said item in said collection of items (NQDI); and selecting all said items of the collection having said qualified descriptors (NQDI) of at least some minimum percentage of said number of qualified descriptors (NQDC) for said collection of said items.

159. A method according to claim 157 and wherein a collection of items is determined to include qualified items for enhancement of a cluster by removal from the cluster, the method comprising:

determining the qualified descriptors for each of said items in said cluster;

determining the number of qualified descriptors for said cluster (NQDC);

determining the number of said qualified descriptors for each said item in said collection of items (NQDI); and selecting all items of said cluster having number of qualified descriptors (NQDI) of at the most some maximum percentage of said number of qualified descriptors (NQDC) for said cluster.

160. A method according to claim 157 and wherein the enhancement of a cluster causes a re-definition of the list of qualified descriptors, thereby giving occasion to additional additions and removals of items.

161. A method according to claim 160 and wherein the process of cluster enhancement is repeated until no change is effected.

162. A method according to claim 160 and wherein the process of cluster enhancement is repeated until a set number of iterations have taken place.

163. A method according to claim 160 for finding a preferred cluster within a collection of items each having at least one descriptor, the method comprising:

identifying all the unique descriptors of the items of the collection;

ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

164. A method according to claim 163 and wherein said identified unique descriptors are the highly ranking descriptors and wherein descriptors that exist in many items of the collection of items are ranked above descriptors existing in few items of the collection.

165. A method according to claim 163 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

166. A method according to claim 165 and wherein identifying, marking, selecting and retaining may be repeated recursively, taking as the collection either the items of said base cluster, disregarding any descriptors common to all said items, or said items of the collection exclusive of said base cluster.

167. A method according to claim 165 and wherein a directory tree is created automatically for the results of a free text search.

168. A method according to claim 167 and wherein said directory tree is built generally instantaneously.

169. A method according to claim 167 and wherein said directory tree is organized, and the information items are sorted into the directory tree, based on a commonality metric that involves several terms.

170. A method according to claim 167 and wherein said directory tree is organized, and the information items are sorted into the directory tree, based on a commonality metric that involves a plurality of terms.

171. A method according to claim 167 and wherein said directory tree is organized, and the information items are sorted into the directory tree, in an iterative manner where information items are added or removed from clusters to eliminate insufficient or redundant clustering.

172. A method according to claim 167 and wherein further queries are performed in response to a user's request for a particular preferred cluster.

173. A method of organizing information comprising:

breaking down clusters of information items, each item including at least one descriptor;

during breaking down of the clusters:

calculating a similarity score S for first and second ones of said items;

calculating a similarity metric for all possible item pairs in a collection of items, said calculating being based on said similarity score;

calculating a gravity score (GS) for one item in a collection with respect to a set of items in that collection, each item having at least one descriptor; and evaluating dynamically a metric of the cluster based on said similarity score, the metric of the cluster expressing at least whether the descriptors of the items in the cluster have more in common with each other than they have in common with items outside of the cluster.

174. A method of organizing information according to claim 173 and wherein said cluster metric is a commonality metric.

175. A method of organizing information according to claim 173 and wherein said cluster metric is a similarity metric.

176. A method of organizing information according to claim 173 and wherein said cluster metric is a non-commonality metric.

177. A method of organizing information according to claim 173 and wherein said cluster metric is a non-similarity metric.

178. A method according to claim 173 and wherein said similarity score S is calculated for each descriptor in each item of a pair of items, by determining whether the same descriptor exists in both items of the pair.

179. A method according to claim 173 and wherein said similarity calculating is carried out on selected descriptors among the descriptors of each item, said selected descriptors being qualified descriptors.

180. A method according to claim 179 and wherein said qualified descriptors are selected according to a rule.

181. A method according to claim 173 and wherein calculating said similarity score includes assigning at least one of a match count and an unmatch count to a pair of items.

182. A method according to claim 181 and also comprising weighting at least one of said match count and said unmatch count.

183. A method according to claim 173 and wherein said cluster metric includes a function which grows as commonality between said items in said cluster grows and diminishes as uncommonality between said items in said cluster grows.

184. A method according to claim 173 wherein calculating of said gravity score (GS) for a given item with respect to a given set of items employs said similarity metric calculated for each item pair that may be formed including said given item and another item in said set.

185. A method according to claim 173 wherein calculating of said gravity score (GS) for a given item with respect to a given set of items employs a commonality metric for each item pair calculated for each item pair that may be formed including the given item and another item in said set.

186. A method according to claim 173 and wherein a cluster quality metric CQM is calculated for a cluster and wherein said cluster is a selected set of items in a collection of items, each item having at least one descriptor.

187. A method according to claim 186 and wherein said cluster quality metric CQM represents a measure of the quality of differentiation between said cluster and the remaining body of information.

188. A method according to claim 186 and wherein said cluster quality metric CQM includes a function that increases as the cluster increasingly contains information that is substantially similar to the remaining body of the information in said cluster and diminishes as said cluster increasingly contains information that is substantially different from the remaining body of the information in said collection.

189. A method according to claim 173 and wherein an intra cluster gravity score ICGS is calculated based on said similarity score and wherein said intra cluster gravity score represents the similarity among the information items within said cluster.

190. A method according to claim 173 and wherein an extra cluster gravity score ECGS is calculated based on said similarity score and wherein said extra cluster gravity score represents the similarity between the information items within said cluster and information items outside said cluster.

191. A method according to claim 173 and wherein an intra cluster gravity score ICGS is calculated and wherein said intra cluster gravity score is equal to the total of said gravity scores for each item in said cluster with respect to all items inside said cluster in said collection divided by the number of items in said cluster.

192. A method according to claim 173 and wherein an extra cluster gravity score ECGS is calculated and wherein said ECGS is equal to the total of said gravity scores for each item in said cluster with respect to all items outside said cluster in said collection divided by the number of items in said cluster.

193. A method according to claim 186 and wherein said cluster quality metric CQM increases as an intra-cluster gravity score grows.

194. A method according to claim 186 and wherein said cluster quality metric for said cluster is increased by adding or removing items to or from a cluster.

195. A method according to claim 186 for creating a best cluster of items, the method involving creating a cluster, modifying said cluster, measuring said cluster quality metric CQM of the modified cluster and selecting said cluster having the highest CQM.

196. A method according to claim 173 and also comprising creating a structure of clusters, wherein a first cluster is a most preferred cluster within the collection of items and wherein a second cluster is a most preferred cluster within the first cluster.

197. A method according to claim 173 and also comprising creating a structure of clusters, wherein a first cluster is a most preferred cluster within the collection of items and wherein a second cluster is a most preferred cluster within the items not included in the first cluster.

198. A method according to claim 196 and wherein said most preferred cluster has the highest Cluster Quality Metric of all possible first clusters available for comparison.

199. A method according to claim 196 and wherein said structure of clusters is presented to the user as a hierarchical tree.

200. A method according to claim 196 and wherein a preferred cluster is identified within a collection of items, the method comprising:
  selecting a group of candidate clusters, each cluster comprising a set of items having at least one descriptor;
  calculating cluster quality metric CQM for all said clusters;
  optionally enhancing each of said clusters; and
  selecting the cluster having the highest CQM.

201. A method according to claim 200 and wherein a collection of items is determined to include qualified item for enhancement of a cluster by addition to the cluster, the method comprising:
  determining the qualified descriptors for each of said items in said collection;
  determining the number of said qualified descriptors for said collection (NQDC) of items;
  determining the number of said qualified descriptors for each said item in said collection of items (NQDI); and
  selecting all said items of the collection having said qualified descriptors (NQDI) of at least some minimum percentage of said number of qualified descriptors (NQDC) for said collection of said items.

202. A method according to claim 200 and wherein a collection of items is determined to include qualified item for enhancement of a cluster by removal from the cluster, the method comprising:
  determining the qualified descriptors for each of said items in said collection; determining the number of said qualified descriptors for said collection (NQDC) of items;
  determining the number of said qualified descriptors for each said item in said collection of items (NQDI); and
  selecting all said items of the collection having said qualified descriptors (NQDI) of at least some maximum percentage of said number of qualified descriptors (NQDC) for said collection of said items.

203. A method according to claim 200 and wherein the enhancement of a cluster causes a re-definition of the list of qualified descriptors, thereby giving occasion to additional additions and removals of items.

204. A method according to claim 203 and wherein the process of cluster enhancement is repeated until no change is effected.

205. A method according to claim 203 and wherein the process of cluster enhancement is repeated until a set number of iterations have taken place.

206. A method according to claim 203 for finding a preferred cluster within a collection of items each having at least one descriptor, the method comprising:
  identifying all the unique descriptors of the items of the collection;
  ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

207. A method according to claim 206 and wherein said identified unique descriptors are the highly ranking descriptors and wherein descriptors that exist in many items of the collection of items are ranked above descriptors existing in few items of the collection.

208. A method according to claim 206 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

209. A method according to claim 208 and wherein identifying, marking, selecting and retaining may be repeated recursively, taking as the collection either the items of said base cluster, disregarding any descriptors common to all said items, or said items of the collection exclusive of said base cluster.

210. A method according to claim 206 and wherein a directory tree is created automatically for the results of a free text search.

211. A method according to claim 210 and wherein said directory tree is built generally instantaneously.

212. A method according to claim 210 and wherein said directory tree is organized, and the information items are sorted into the directory tree, based on a commonality metric that involves several terms.

213. A method according to claim 210 and wherein said directory tree is organized, and the information items are sorted into the directory tree, based on a commonality metric that involves a plurality of terms.

214. A method according to claim 210 and wherein said directory tree is organized, and the information items are sorted into the directory tree, in an iterative manner where information items are added or removed from clusters to eliminate insufficient or redundant clustering.

215. A method according to claim 210 and wherein further queries are performed in response to a user's request for a particular preferred cluster.

216. A method of organizing information comprising:

changing the population of clusters of information items, each item including at least one descriptor, during changing the population of the clusters:

calculating a similarity score S for first and second ones of said items;

calculating a similarity metric for all possible item pairs in a collection of items, said calculating being based on said similarity score;

calculating a gravity score (GS) for one item in a collection with respect to a set of items in that collection, each item having at least one descriptor; and evaluating dynamically a metric of the cluster based on said similarity score, the metric of the cluster expressing at least whether the descriptors of the items the cluster have more in common with each other than they have in common with items outside of the cluster.

217. A method of organizing information according to claim 216 and wherein said cluster metric is a commonality metric.

218. A method of organizing information according to claim 216 and wherein said cluster metric is a similarity metric.

219. A method of organizing information according to claim 216 and wherein said cluster metric is a non-commonality metric.

220. A method of organizing information according to claim 216 and wherein said cluster metric is a non-similarity metric.

221. A method according to claim 216 and wherein said similarity score S is calculated for each descriptor in each item of a pair of items, by determining whether the same descriptor exists in both items of the pair.

222. A method according to claim 216 and wherein said similarity calculating is carried out on selected descriptors among the descriptors of each item, said selected descriptors being qualified descriptors.

223. A method according to claim 222 and wherein said qualified descriptors are selected according to a rule.

224. A method according to claim 216 and wherein calculating said similarity score includes assigning at least one of a match count and an unmatch count to a pair of items.

225. A method according to claim 224 and also comprising weighting at least one of said match count and said unmatch count.

226. A method according to claim 216 and wherein said cluster metric includes a function which grows as commonality between said items in said cluster grows and diminishes as uncommonality between said items in said cluster grows.

227. A method according to claim 216 wherein calculating of said gravity score (GS) for a given item with respect to a given set of items employs said similarity metric calculated for each item pair that may be formed including said given item and another item in said set.

228. A method according to claim 216 wherein calculating of said gravity score (GS) for a given item with respect to a given set of items employs a commonality metric for each item pair calculated for each item pair that may be formed including the given item and another item in said set.

229. A method according to claim 216 and wherein a cluster quality metric CQM is calculated for a cluster and wherein said cluster is a selected set of items in a collection of items, each item having at least one descriptor.

230. A method according to claim 229 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

231. A method according to claim 216 wherein an intra cluster gravity score ICGS is calculated based on said similarity score and wherein said intra cluster gravity score represents the similarity among the information items within said cluster.

232. A method according to claim 216 and wherein an extra cluster gravity score ECGS is calculated based on said similarity score and wherein said extra cluster gravity score represents the similarity between the information items within said cluster and information items outside said cluster.

233. A method according to claim 216 and wherein an intra cluster gravity score ICGS is calculated and wherein said ICGS is equal to the total of said gravity scores for each item in said cluster with respect to all items inside said cluster in said collection divided by the number of items in said cluster.

234. A method according to claim 216 and wherein an intra cluster gravity score ECGS is calculated and wherein said ECGS is equal to the total of said gravity scores for each item in said cluster with respect to all items outside said cluster in said collection divided by the number of items in the cluster.

235. A method according to claim 229 and wherein said cluster quality metric CQM increases as an intra cluster gravity score grows.

236. A method according to claim 229 and wherein said cluster quality metric for said cluster is increased by adding or removing items to or from said cluster.

237. A method according to claim 229 for creating a best cluster of items, the method involving creating a cluster, modifying the cluster, measuring the cluster quality metric CQM of the modified cluster and selecting the cluster having the highest CQM.

238. A method according to claim 216 and also comprising creating a structure of clusters, wherein a first cluster is a most preferred cluster within the collection of items and wherein a second cluster is a most preferred cluster within the first cluster.

239. A method according to claim 216 and also comprising creating a structure of clusters, wherein a first cluster is a most preferred cluster within the collection of items and wherein a second cluster is a most preferred cluster within the items not included in the first cluster.

240. A method according to claim 238 and wherein said most preferred cluster has the highest Cluster Quality Metric of all possible first clusters available for comparison.

241. A method according to claim 238 and wherein a structure of clusters is presented to the user as a hierarchical tree.

242. A method according to claim 238 and wherein a preferred cluster is identified within a collection of items, the method comprising:
    selecting a group of candidate clusters, each cluster comprising a set of items having at least one descriptor;
    calculating cluster quality metric CQM for all said clusters;
    optionally enhancing each of said clusters; and
    selecting the cluster having the highest CQM.

243. A method according to claim 242 and wherein a collection of items is determined to include qualified item for enhancement of a cluster by addition to the cluster, the method comprising:
    determining the qualified descriptors for each of said items in said collection;
    determining the number of said qualified descriptors for said collection (NQDC) of items;
    determining the number of said qualified descriptors for each said item in said collection of items (NQDI); and
    selecting all said items of the collection having said qualified descriptors (NQDI) of at least some minimum percentage of said number of qualified descriptors (NQDC) for said collection of said items.

244. A method according to claim 243 and wherein a collection of items is determined to include qualified item for enhancement of a cluster by removal from the cluster, the method comprising:
    determining the qualified descriptors for each of said items in said collection;
    determining the number of said qualified descriptors for said collection (NQDC) of items;
    determining the number of said qualified descriptors for each said item in said collection of items (NQDI); and
    selecting all said items of the collection having said qualified descriptors (NQDI) of at least some maximum percentage of said number of qualified descriptors (NQDC) for said collection of said items.

245. A method according to claim 242 and wherein the enhancement of a cluster causes a re-definition of the list of qualified descriptors, thereby giving occasion to additional additions and removals of items.

246. A method according to claim 245 and wherein the process of cluster enhancement is repeated until no change is effected.

247. A method according to claim 245 and wherein the process of cluster enhancement is repeated until a set number of iterations have taken place.

248. A method according to claim 245 or finding a preferred cluster within a collection of items each having at least one descriptor, the method comprising:
    identifying all the unique descriptors of the items of the collection;
    ranking said identified descriptors according to their popularity in the collection;
    selecting a "base item" as a first item of a "base cluster";
    selecting a plurality of "comparison items", each said comparison item is considered to be a first item in a "comparison cluster"; and
    retaining said "base cluster" as the desired preferred cluster for the collection.

249. A method according to claim 248 and wherein said identified unique descriptors are the highly ranking descriptors and wherein descriptors that exist in many items of the collection of items are ranked above descriptors existing in few items of the collection.

250. A method according to claim 248 and also method comprising:
    selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

251. A method according to claim 250 and wherein identifying, marking, selecting and retaining may be repeated recursively, taking as the collection either the items of said base cluster, disregarding any descriptors common to all said items, or said items of the collection exclusive of said base cluster.

252. A method according to claim 248 and wherein a directory tree is created automatically for the results of a free text search.

253. A method according to claim 252 and wherein said directory tree is built generally instantaneously.

254. A method according to claim 252 and wherein said directory tree is organized, and the information items are sorted into the directory tree, based on a commonality metric that involves several terms.

255. A method according to claim 252 and wherein said directory tree is organized, and the information items are sorted into the directory tree, based on a commonality metric that involves a plurality of terms.

256. A method according to claim 252 and wherein said directory tree is organized, and the information items are sorted into the directory tree, in an iterative manner where information items are added or removed from clusters to eliminate insufficient or redundant clustering.

257. A method according to claim 252 and wherein further queries are performed in response to a user's request for a particular preferred cluster.

258. A method of organizing items comprising:
building up clusters of items, each item having information including at least one descriptor associated therewith;
during building up of the clusters:
calculating a similarity score S for first and second ones of said items;
calculating an intra cluster gravity score ICGS, said intra cluster gravity score representing the similarity among the information items within a cluster; and
evaluating dynamically a metric of the cluster based on said similarity score, the metric of the cluster expressing at least whether the descriptors of the items in the cluster have more in common with each other than they have in common with items outside of the cluster.

259. A method of organizing items according to claim 258 and wherein said metric is a commonality metric.

260. A method of organizing items according to claim 258 and wherein said metric is a similarity metric.

261. A method of organizing items according to claim 258 and wherein said metric is a non-commonality metric.

262. A method of organizing items according to claim 258 and wherein said metric is a non-similarity metric.

263. A method according to claim 258 and wherein said similarity score S is calculated for each descriptor in each item of a pair of items, by determining whether the same descriptor exists in both items of the pair.

264. A method according to claim 258 and wherein said similarity calculating is carried out on selected descriptors among the descriptors of each item, said selected descriptors being qualified descriptors.

265. A method according to claim 264 and wherein said qualified descriptors are selected according to a rule.

266. A method according to claim 258 and wherein calculating said similarity score includes assigning at least one of a match count and an unmatch count to a pair of items.

267. A method according to claim 266 and also comprising weighting at least one of said match count and said unmatch count.

268. A method according to claim 258 and wherein said metric includes a function which grows as commonality between said items in said cluster grows and diminishes as uncommonality between said items in said cluster grows.

269. A method according to claim 258 and also comprising calculating a similarity metric for all possible item pairs in a collection of items, said calculating being based on said similarity score.

270. A method according to claim 269 and also comprising calculating a gravity score (GS) for one item in a collection with respect to a set of items in that collection, each item having at least one descriptor.

271. A method according to claim 270 wherein calculating of said gravity score (GS) for a given item with respect to a given set of items employs said similarity metric calculated for each item pair that may be formed including said given item and another item in said set.

272. A method according to claim 270 wherein calculating of said gravity score (GS) for a given item with respect to a given set of items employs a commonality metric for each item pair calculated for each item pair that may be formed including the given item and another item in said set.

273. A method according to claim 258 and wherein a cluster quality metric CQM is calculated for a cluster and wherein said cluster is a selected set of items in a collection of items, each item having at least one descriptor.

274. A method according to claim 273 and wherein said cluster quality metric CQM represents a measure of the quality of differentiation between said cluster and the remaining body of information.

275. A method according to claim 273 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

276. A method according to claim 258 and wherein an extra cluster gravity score ECGS is calculated based on said similarity score, and wherein said extra cluster gravity score represents said similarity between the information items within said cluster and information items outside said cluster.

277. A method according to claim 270 and wherein said intra cluster gravity score is equal to the total of said gravity scores for each item in said cluster with respect to all items inside said cluster in said collection divided by the number of items in said cluster.

278. A method according to claim 270 and wherein an extra cluster gravity score ECGS is calculated and wherein said ECGS is equal to the total of said gravity scores for each item in said cluster with respect to all items outside said cluster in said collection divided by the number of items in said cluster.

279. A method according to claim 273 and wherein said cluster quality metric CQM increases as an intra-cluster gravity score grows.

280. A method according to claim 273 and wherein said cluster quality metric for said cluster is increased by adding or removing items to or from said cluster.

281. A method according to claim 273 for creating a best cluster of items, the method involving creating a cluster, modifying said cluster, measuring said cluster quality metric CQM of said modified cluster and selecting the cluster having the highest CQM.

282. A method according to claim 258 and also comprising creating a structure of clusters, wherein a first cluster is a most preferred cluster within the collection of items and wherein a second cluster is a most preferred cluster within the first cluster.

283. A method according to claim 258 and also comprising creating a structure of clusters, wherein a first cluster is a most preferred cluster within the collection of items and wherein a second cluster is a most preferred cluster within the items not included in the first cluster.

284. A method according to claim 282 and wherein said most preferred cluster has the highest Cluster Quality Metric of all possible first clusters available for comparison.

285. A method according to claim 282 and wherein said structure of clusters is presented to the user as a hierarchical tree.

286. A method according to claim 282 and wherein a preferred cluster is identified within a collection of items, the method comprising:
selecting a group of candidate clusters, each cluster comprising a set of items having at least one descriptor;

calculating cluster quality metric CQM for all said clusters;

optionally enhancing each of said clusters; and selecting the cluster having the highest CQM.

287. A method according to claim 286 and wherein a collection of items is determined to include qualified item for enhancement of a cluster by addition to the cluster, the method comprising:

determining the qualified descriptors for each of said items in said collection;

determining the number of said qualified descriptors for said collection (NQDC) of items;

determining the number of said qualified descriptors for each said item in said collection of items (NQDI); and selecting all said items of the collection having said qualified descriptors (NQDI) of at least some minimum percentage of said number of qualified descriptors (NQDC) for said collection of said items.

288. A method according to claim 286 and wherein a collection of items is determined to include qualified items for enhancement of a cluster by removal from the cluster, the method comprising:

determining the qualified descriptors for each of said items in said cluster;

determining the number of qualified descriptors for said cluster (NQDC);

determining the number of said qualified descriptors for each said item in said collection of items (NQDI); and selecting all items of said cluster having number of qualified descriptors (NQDI) of at the most some maximum percentage of said number of qualified descriptors (NQDC) for said cluster.

289. A method according to claim 286 and wherein the enhancement of a cluster causes a re-definition of the list of qualified descriptors, thereby giving occasion to additional additions and removals of items.

290. A method according to claim 289 and wherein the process of cluster enhancement is repeated until no change is effected.

291. A method according to claim 289 and wherein the process of cluster enhancement is repeated until a set number of iterations have taken place.

292. A method according to claim 289 for finding a preferred cluster within a collection of items each having at least one descriptor, the method comprising:

identifying all the unique descriptors of the items of the collection;

ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

293. A method according to claim 292 and wherein said identified unique descriptors are the highly ranking descriptors and wherein descriptors that exist in many items of the collection of items are ranked above descriptors existing in few items of the collection.

294. A method according to claim 292 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

295. A method according to claim 294 and wherein identifying, marking, selecting and retaining may be repeated recursively, taking as the collection either the items of said base cluster, disregarding any descriptors common to all said items, or said items of the collection exclusive of said base cluster.

296. A method according to claim 292 and wherein a directory tree is created automatically for the results of a free text search.

297. A method according to claim 297 and wherein said directory tree is built generally instantaneously.

298. A method according to claim 296 and wherein said directory tree is organized, and the information items are sorted into the directory tree, based on a commonality metric that involves several terms.

299. A method according to claim 296 and wherein said directory tree is organized, and the information items are sorted into the directory tree, based on a commonality metric that involves a plurality of terms.

300. A method according to claim 296 and wherein said directory tree is organized, and the information items are sorted into the directory tree, in an iterative manner where information items are added or removed from clusters to eliminate insufficient or redundant clustering.

301. A method according to claim 296 and wherein further queries are performed in response to a user's request for a particular preferred cluster.

302. A method of organizing information comprising:

breaking down clusters of information items, each item including at least one descriptor;

during breaking down of the clusters:

calculating a similarity score S for first and second ones of said items;

calculating an intra cluster gravity score ICGS, said intra cluster gravity score representing the similarity among the information items within a cluster; and evaluating dynamically a metric of the cluster based on said similarity score, the metric of the cluster expressing at least whether the descriptors of the items in the cluster have more in common with each other than they have in common with items outside of the cluster.

303. A method of organizing information according to claim 302 and wherein said metric is a commonality metric.

304. A method of organizing information according to claim 302 and wherein said metric is a similarity metric.

305. A method of organizing information according to claim 302 and wherein said metric is a non-commonality metric.

306. A method of organizing information according to claim 302 and wherein said metric is a non-similarity metric.

307. A method according to claim 302 and wherein said similarity score S is calculated for each descriptor in each item of a pair of items, by determining whether the same descriptor exists in both items of the pair.

308. A method according to claim 302 and wherein said similarity calculating is carried out on selected descriptors among the descriptors of each item, said selected descriptors being qualified descriptors.

309. A method according to claim 308 and wherein said qualified descriptors are selected according to a rule.

310. A method according to claim 302 and wherein calculating said similarity score includes assigning at least one of a match count and an unmatch count to a pair of items.

311. A method according to claim 310 and also comprising weighting at least one of said match count and said unmatch count.

312. A method according to claim 302 and wherein said metric includes a function which grows as commonality between said items in said cluster grows and diminishes as uncommonality between said items in said cluster grows.

313. A method according to claim 302 and also comprising calculating a similarity metric for all possible item pairs in a collection of items, said calculating being based on said similarity score.

314. A method according to claim 313 and also comprising calculating a gravity score (GS) for one item in a collection with respect to a set of items in that collection, each item having at least one descriptor.

315. A method according to claim 314 wherein calculating of said gravity score (GS) for a given item with respect to a given set of items employs said similarity metric calculated for each item pair that may be formed including said given item and another item in said set.

316. A method according to claim 314 wherein calculating of said gravity score (GS) for a given item with respect to a given set of items employs a commonality metric for each item pair calculated for each item pair that may be formed including the given item and another item in said set.

317. A method according to claim 302 and wherein a cluster quality metric CQM is calculated for a cluster and wherein said cluster is a selected set of items in a collection of items, each item having at least one descriptor.

318. A method according to claim 317 and wherein said cluster quality metric CQM represents a measure of the quality of differentiation between said cluster and the remaining body of information.

319. A method according to claim 317 and wherein said cluster quality metric CQM includes a function that increases as the cluster increasingly contains information that is substantially similar to the remaining body of the information in said cluster and diminishes as said cluster increasingly contains information that is substantially different from the remaining body of the information in said collection.

320. A method according to claim 302 and wherein an extra cluster gravity score ECGS is calculated based on said similarity score and wherein said extra cluster gravity score represents the similarity between the information items within said cluster and information items outside said cluster.

321. A method according to claim 314 and wherein said intra cluster gravity score is equal to the total of said gravity scores for each item in said cluster with respect to all items inside said cluster in said collection divided by the number of items in said cluster.

322. A method according to claim 314 and wherein an extra cluster gravity score ECGS is calculated and wherein said ECGS is equal to the total of said gravity scores for each item in said cluster with respect to all items outside said cluster in said collection divided by the number of items in said cluster.

323. A method according to claim 317 and wherein said cluster quality metric CQM increases as an intra-cluster gravity score grows.

324. A method according to claim 317 and wherein said cluster quality metric for said cluster is increased by adding or removing items to or from a cluster.

325. A method according to claim 317 for creating a best cluster of items, the method involving creating a cluster, modifying said cluster, measuring said cluster quality metric CQM of the modified cluster and selecting said cluster having the highest CQM.

326. A method according to claim 302 and also comprising creating a structure of clusters, wherein a first cluster is a most preferred cluster within the collection of items and wherein a second cluster is a most preferred cluster within the first cluster.

327. A method according to claim 302 and also comprising creating a structure of clusters, wherein a first cluster is a most preferred cluster within the collection of items and wherein a second cluster is a most preferred cluster within the items not included in the first cluster.

328. A method according to claim 326 and wherein said most preferred cluster has the highest Cluster Quality Metric of all possible first clusters available for comparison.

329. A method according to claim 326 and wherein said structure of clusters is presented to the user as a hierarchical tree.

330. A method according to claim 326 and wherein a preferred cluster is identified within a collection of items, the method comprising:
   selecting a group of candidate clusters, each cluster comprising a set of items having at least one descriptor;
   calculating cluster quality metric CQM for all said clusters;
   optionally enhancing each of said clusters; and
   selecting the cluster having the highest CQM.

331. A method according to claim 330 and wherein a collection of items is determined to include qualified item for enhancement of a cluster by addition to the cluster, the method comprising:
   determining the qualified descriptors for each of said items in said collection;
   determining the number of said qualified descriptors for said collection (NQDC) of items;
   determining the number of said qualified descriptors for each said item in said collection of items (NQDI); and
   selecting all said items of the collection having said qualified descriptors (NQDI) of at least some minimum percentage of said number of qualified descriptors (NQDC) for said collection of said items.

332. A method according to claim 330 and wherein a collection of items is determined to include qualified item for enhancement of a cluster by removal from the cluster, the method comprising:
   determining the qualified descriptors for each of said items in said collection;
   determining the number of said qualified descriptors for said collection (NQDC) of items;
   determining the number of said qualified descriptors for each said item in said collection of items (NQDI); and
   selecting all said items of the collection having said qualified descriptors (NQDI) of at least some maximum percentage of said number of qualified descriptors (NQDC) for said collection of said items.

333. A method according to claim 330 and wherein the enhancement of a cluster causes a re-definition of the list of qualified descriptors, thereby giving occasion to additional additions and removals of items.

334. A method according to claim 333 and wherein the process of cluster enhancement is repeated until no change is effected.

335. A method according to claim 333 and wherein the process of cluster enhancement is repeated until a set number of iterations have taken place.

336. A method according to claim 333 for finding a preferred cluster within a collection of items each having at least one descriptor, the method comprising:

identifying all the unique descriptors of the items of the collection;

ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

337. A method according to claim 336 and wherein said identified unique descriptors are the highly ranking descriptors and wherein descriptors that exist in many items of the collection of items are ranked above descriptors existing in few items of the collection.

338. A method according to claim 339 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

339. A method according to claim 338 and wherein identifying, marking, selecting and retaining may be repeated recursively, taking as the collection either the items of said base cluster, disregarding any descriptors common to all said items, or said items of the collection exclusive of said base cluster.

340. A method according to claim 336 and wherein a directory tree is created automatically for the results of a free text search.

341. A method according to claim 340 and wherein said directory tree is built generally instantaneously.

342. A method according to claim 340 and wherein said directory tree is organized, and the information items are sorted into the directory tree, based on a commonality metric that involves several terms.

343. A method according to claim 340 and wherein said directory tree is organized, and the information items are sorted into the directory tree, based on a commonality metric that involves a plurality of terms.

344. A method according to claim 340 and wherein said directory tree is organized, and the information items are sorted into the directory tree, in an iterative manner where information items are added or removed from clusters to eliminate insufficient or redundant clustering.

345. A method according to claim 340 and wherein further queries are performed in response to a user's request for a particular preferred cluster.

346. A method of organizing information comprising:

changing the population of clusters of information items, each item including at least one descriptor, during changing the population of the clusters:

calculating a similarity score S for first and second ones of said items;

calculating an intra cluster gravity score ICGS, said intra cluster gravity score representing the similarity among the information items within a cluster; and evaluating dynamically a metric of the cluster based on said similarity score, the metric of the cluster expressing at least whether the descriptors of the items the cluster have more in common with each other than they have in common with items outside of the cluster.

347. A method of organizing information according to claim 346 and wherein said metric is a commonality metric.

348. A method of organizing information according to claim 346 and wherein said metric is a similarity metric.

349. A method of organizing information according to claim 346 and wherein said metric is a non-commonality metric.

350. A method of organizing information according to claim 346 and wherein said metric is a non-similarity metric.

351. A method according to claim 346 and wherein said similarity score S is calculated for each descriptor in each item of a pair of items, by determining whether the same descriptor exists in both items of the pair.

352. A method according to claim 346 and wherein said similarity calculating is carried out on selected descriptors among the descriptors of each item, said selected descriptors being qualified descriptors.

353. A method according to claim 352 and wherein said qualified descriptors are selected according to a rule.

354. A method according to claim 346 and wherein calculating said similarity score includes assigning at least one of a match count and an unmatch count to a pair of items.

355. A method according to claim 354 and also comprising weighting at least one of said match count and said unmatch count.

356. A method according to claim 346 and wherein said metric includes a function which grows as commonality between said items in said cluster grows and diminishes as uncommonality between said items in said cluster grows.

357. A method according to claim 346 and, also comprising calculating a similarity metric for all possible item pairs in a collection of items, said calculating being based on said similarity score.

358. A method according to claim 357 and also comprising calculating a gravity score (GS) for one item in a collection with respect to a set of items in that collection, each item having at least one descriptor.

359. A method according to claim 358 wherein calculating of said gravity score (GS) for a given item with respect to a given set of items employs said similarity metric calculated for each item pair that may be formed including said given item and another item in said set.

360. A method according to claim 358 wherein calculating of said gravity score (GS) for a given item with respect to a given set of items employs a commonality metric for each item pair calculated for each item pair that may be formed including the given item and another item in said set.

361. A method according to claim 346 and wherein a cluster quality metric CQM is calculated for a cluster and wherein said cluster is a selected set of items in a collection of items, each item having at least one descriptor.

362. A method according to claim 361 and wherein said cluster quality metric CQM represents a measure of the quality of differentiation between said cluster and the remaining body of information.

363. A method according to claim 361 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

364. A method according to claim 346 and wherein an extra cluster gravity score ECGS is calculated based on said similarity score and wherein said extra cluster gravity score represents the similarity between the information items within said cluster and information items outside said cluster.

365. A method according to claim 358 and wherein said ICGS is equal to the total of said gravity scores for each item in said cluster with respect to all items inside said cluster in said collection divided by the number of items in said cluster.

366. A method according to claim 358 and wherein an intra cluster gravity score ECGS is calculated and wherein said ECGS is equal to the total of said gravity scores for each item in said cluster with respect to all items outside said cluster in said collection divided by the number of items in the cluster.

367. A method according to claim 361 and wherein said cluster quality metric CQM increases as an intra cluster gravity score grows.

368. A method according to claim 361 and wherein said cluster quality metric for said cluster is increased by adding or removing items to or from said cluster.

369. A method according to claim 361 for creating a best cluster of items, the method involving creating a cluster, modifying the cluster, measuring the cluster quality metric CQM of the modified cluster and selecting the cluster having the highest CQM.

370. A method according to claim 346 and also comprising creating a structure of clusters, wherein a first cluster is a most preferred cluster within the collection of items and wherein a second cluster is a most preferred cluster within the first cluster.

371. A method according to claim 346 and also comprising creating a structure of clusters, wherein a first cluster is a most preferred cluster within the collection of items and wherein a second cluster is a most preferred cluster within the items not included in the first cluster.

372. A method according to claim 370 and wherein said most preferred cluster has the highest Cluster Quality Metric of all possible first clusters available for comparison.

373. A method according to claim 370 and wherein a structure of clusters is presented to the user as a hierarchical tree.

374. A method according to claim 370 and wherein a preferred cluster is identified within a collection of items, the method comprising:
  selecting a group of candidate clusters, each cluster comprising a set of items having at least one descriptor;
  calculating cluster quality metric CQM for all said clusters;
  optionally enhancing each of said clusters; and
  selecting the cluster having the highest CQM.

375. A method according to claim 374 and wherein a collection of items is determined to include qualified item for enhancement of a cluster by addition to the cluster, the method comprising:
  determining the qualified descriptors for each of said items in said collection;
  determining the number of said qualified descriptors for said collection (NQDC) of items;
  determining the number of said qualified descriptors for each said item in said collection of items (NQDI); and
  selecting all said items of the collection having said qualified descriptors (NQDI) of at least some minimum percentage of said number of qualified descriptors (NQDC) for said collection of said items.

376. A method according to claim 374 and wherein a collection of items is determined to include qualified item for enhancement of a cluster by removal from the cluster, the method comprising:
  determining the qualified descriptors for each of said items in said collection;
  determining the number of said qualified descriptors for said collection (NQDC) of items;
  determining the number of said qualified descriptors for each said item in said collection of items (NQDI); and
  selecting all said items of the collection having said qualified descriptors (NQDI) of at least some maximum percentage of said number of qualified descriptors (NQDC) for said collection of said items.

377. A method according to claim 374 and wherein the enhancement of a cluster causes a re-definition of the list of qualified descriptors, thereby giving occasion to additional additions and removals of items.

378. A method according to claim 377 and wherein the process of cluster enhancement is repeated until no change is effected.

379. A method according to claim 377 and wherein the process of cluster enhancement is repeated until a set number of iterations have taken place.

380. A method according to claim 377 for finding a preferred cluster within a collection of items each having at least one descriptor, the method comprising:
  identifying all the unique descriptors of the items of the collection;
  ranking said identified descriptors according to their popularity in the collection;
  selecting a "base item" as a first item of a "base cluster";
  selecting a plurality of "comparison items", each said comparison item is considered to be a first item in a "comparison cluster"; and
  retaining said "base cluster" as the desired preferred cluster for the collection.

381. A method according to claim 380 and wherein said identified unique descriptors are the highly ranking descriptors and wherein descriptors that exist in many items of the collection of items are ranked above descriptors existing in few items of the collection.

382. A method according to claim 380 and also method comprising:
  selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

383. A method according to claim 382 and wherein identifying, marking, selecting and retaining may be repeated recursively, taking as the collection either the items of said base cluster, disregarding any descriptors common to all said items, or said items of the collection exclusive of said base cluster.

384. A method according to claim 380 and wherein a directory tree is created automatically for the results of a free text search.

385. A method according to claim 384 and wherein said directory tree is built generally instantaneously.

386. A method according to claim 384 and wherein said directory tree is organized, and the information items are sorted into the directory tree, based on a commonality metric that involves several terms.

387. A method according to claim 384 and wherein said directory tree is organized, and the information items are sorted into the directory tree, based on a commonality metric that involves a plurality of terms.

388. A method according to claim 384 said directory tree is organized, and the information items are sorted into the directory tree, in an iterative manner where information items are added or removed from clusters to eliminate insufficient or redundant clustering.

389. A method according to claim 384 and wherein further queries are performed in response to a user's request for a particular preferred cluster.

390. A method of organizing items comprising:
building up clusters of items, each item having information including at least one descriptor associated therewith;
during building up of the clusters:
calculating a similarity score S for first and second ones of said items;
calculating an extra cluster gravity score EGGS, said extra cluster gravity score representing the similarity between the information items within a cluster and information items outside said cluster; and
evaluating dynamically a metric of the cluster based on said similarity score, the metric of the cluster expressing at least whether the descriptors of the items in the cluster have more in common with each other than they have in common with items outside of the cluster.

391. A method of organizing items according to claim 390 and wherein said metric is a commonality metric.

392. A method of organizing items according to claim 390 and wherein said metric is a similarity metric.

393. A method of organizing items according to claim 390 and wherein said metric is a non-commonality metric.

394. A method of organizing items according to claim 390 and wherein said metric is a non-similarity metric.

395. A method according to claim 390 and wherein said similarity score S is calculated for each descriptor in each item of a pair of items, by determining whether the same descriptor exists in both items of the pair.

396. A method according to claim 390 and wherein said similarity calculating is carried out on selected descriptors among the descriptors of each item, said selected descriptors being qualified descriptors.

397. A method according to claim 396 and wherein said qualified descriptors are selected according to a rule.

398. A method according to claim 390 and wherein calculating said similarity score includes assigning at least one of a match count and an unmatch count to a pair of items.

399. A method according to claim 398 and also comprising weighting at least one of said match count and said unmatch count.

400. A method according to claim 390 and wherein said metric includes a function which grows as commonality between said items in said cluster grows and diminishes as uncommonality between said items in said cluster grows.

401. A method according to claim 390 and also comprising calculating a similarity metric for all possible item pairs in a collection of items, said calculating being based on said similarity score.

402. A method according to claim 401 and also comprising calculating a gravity score (GS) for one item in a collection with respect to a set of items in that collection, each item having at least one descriptor.

403. A method according to claim 402 wherein calculating of said gravity score (GS) for a given item with respect to a given set of items employs said similarity metric calculated for each item pair that may be formed including said given item and another item in said set.

404. A method according to claim 402 wherein calculating of said gravity score (GS) for a given item with respect to a given set of items employs said commonality metric for each item pair calculated for each item pair that may be formed including the given item and another item in said set.

405. A method according to claim 390 and wherein a cluster quality metric CQM is calculated for a cluster and wherein said cluster is a selected set of items in a collection of items, each item having at least one descriptor.

406. A method according to claim 405 and wherein said cluster quality metric CQM represents a measure of the quality of differentiation between said cluster and the remaining body of information.

407. A method according to claim 405 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

408. A method according to claim 390 and wherein an intra cluster gravity score ICGS is calculated based on said similarity score, and wherein said intra cluster gravity score represents the similarity among the information items within said cluster.

409. A method according to claim 402 and wherein an intra cluster gravity score ICGS is calculated and wherein said ICGS is equal to the total of said gravity scores for each item in said cluster with respect to all items inside said cluster in said collection divided by the number of items in said cluster.

410. A method according to claim 402 and wherein said ECGS is equal to the total of said gravity scores for each item in said cluster with respect to all items outside said cluster in said collection divided by the number of items in said cluster.

411. A method according to claim 405 and wherein said cluster quality metric CQM increases as an intra-cluster gravity score grows.

412. A method according to claim 405 and wherein said cluster quality metric for said cluster is increased by adding or removing items to or from said cluster.

413. A method according to claim 405 for creating a best cluster of items, the method involving creating a cluster, modifying said cluster, measuring said cluster quality metric CQM of said modified cluster and selecting the cluster having the highest CQM.

414. A method according to claim 390 and also comprising creating a structure of clusters, wherein a first cluster is a most preferred cluster within the collection of items and wherein a second cluster is a most preferred cluster within the first cluster.

415. A method according to claim 390 and also comprising creating a structure of clusters, wherein a first cluster is a most preferred cluster within the collection of items and wherein a second cluster is a most preferred cluster within the items not included in the first cluster.

416. A method according to claim 414 and wherein said most preferred cluster has the highest Cluster Quality Metric of all possible first clusters available for comparison.

417. A method according to claim 414 and wherein said structure of clusters is presented to the user as a hierarchical tree.

418. A method according to claim 414 and wherein a preferred cluster is identified within a collection of items, the method comprising:
selecting a group of candidate clusters, each cluster comprising a set of items having at least one descriptor;
calculating cluster quality metric CQM for all said clusters;
optionally enhancing each of said clusters; and
selecting the cluster having the highest CQM.

419. A method according to claim 418 and wherein a collection of items is determined to include qualified item for enhancement of a cluster by addition to the cluster, the method comprising:
determining the qualified descriptors for each of said items in said collection;
determining the number of said qualified descriptors for said collection (NQDC) of items;
determining the number of said qualified descriptors for each said item in said collection of items (NQDI); and
selecting all said items of the collection having said qualified descriptors (NQDI) of at least some minimum percentage of said number of qualified descriptors (NQDC) for said collection of said items.

420. A method according to claim 418 and wherein a collection of items is determined to include qualified items for enhancement of a cluster by removal from the cluster, the method comprising:
determining the qualified descriptors for each of said items in said cluster;
determining the number of qualified descriptors for said cluster (NQDC);
determining the number of said qualified descriptors for each said item in said collection of items (NQDI); and
selecting all items of said cluster having number of qualified descriptors (NQDI) of at the most some maximum percentage of said number of qualified descriptors (NQDC) for said cluster.

421. A method according to claim 418 and wherein the enhancement of a cluster causes a re-definition of the list of qualified descriptors, thereby giving occasion to additional additions and removals of items.

422. A method according to claim 421 and wherein the process of cluster enhancement is repeated until no change is effected.

423. A method according to claim 421 and wherein the process of cluster enhancement is repeated until a set number of iterations have taken place.

424. A method according to claim 421 for finding a preferred cluster within a collection of items each having at least one descriptor, the method comprising:
identifying all the unique descriptors of the items of the collection;
ranking said identified descriptors according to their popularity in the collection;
selecting a "base item" as a first item of a "base cluster";
selecting a plurality of "comparison items", each said comparison item is considered to be a first item in a "comparison cluster"; and
retaining said "base cluster" as the desired preferred cluster for the collection.

425. A method according to claim 424 and wherein said identified unique descriptors are the highly ranking descriptors and wherein descriptors that exist in many items of the collection of items are ranked above descriptors existing in few items of the collection.

426. A method according to claim 424 and also comprising:
selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

427. A method according to claim 426 and wherein identifying, marking, selecting and retaining may be repeated recursively, taking as the collection either the items of said base cluster, disregarding any descriptors common to all said items, or said items of the collection exclusive of said base cluster.

428. A method according to claim 424 and wherein a directory tree is created automatically for the results of a free text search.

429. A method according to claim 428 and wherein said directory tree is built generally instantaneously.

430. A method according to claim 428 and wherein said directory tree is organized, and the information items are sorted into the directory tree, based on a commonality metric that involves several terms.

431. A method according to claim 428 and wherein said directory tree is organized, and the information items are sorted into the directory tree, based on a commonality metric that involves a plurality of terms.

432. A method according to claim 428 and wherein said directory tree is organized, and the information items are sorted into the directory tree, in an iterative manner where information items are added or removed from clusters to eliminate insufficient or redundant clustering.

433. A method according to claim 428 and wherein further queries are performed in response to a user's request for a particular preferred cluster.

434. A method of organizing information comprising:
breaking down clusters of information items, each item including at least one descriptor;
during breaking down of the clusters:
calculating a similarity score S for first and second ones of said items;
calculating an extra cluster gravity score ECGS, said extra cluster gravity score representing the similarity between the information items within a cluster and information items outside said cluster; and
evaluating dynamically a metric of the cluster based on said similarity score, the metric of the cluster expressing at least whether the descriptors of the items in the cluster have more in common with each other than they have in common with items outside of the cluster.

435. A method of organizing information according to claim 434 and wherein said metric is a commonality metric.

436. A method of organizing information according to claim 434 and wherein said metric is a similarity metric.

437. A method of organizing information according to claim 434 and wherein said metric is a non-commonality metric.

438. A method of organizing information according to claim 434 and wherein said metric is a non-similarity metric.

439. A method according to claim 434 and wherein said similarity score S is calculated for each descriptor in each item of a pair of items, by determining whether the same descriptor exists in both items of the pair.

440. A method according to claim 434 and wherein said similarity calculating is carried out on selected descriptors among the descriptors of each item, said selected descriptors being qualified descriptors.

441. A method according to claim 440 and wherein said qualified descriptors are selected according to a rule.

442. A method according to claim 434 and wherein calculating said similarity score includes assigning at least one of a match count and an unmatch count to a pair of items.

443. A method according to claim 442 and also comprising weighting at least one of said match count and said unmatch count.

444. A method according to claim 434 and wherein said metric includes a function which grows as commonality between said items in said cluster grows and diminishes as uncommonality between said items in said cluster grows.

445. A method according to claim 434 and also comprising calculating a similarity metric for all possible item pairs in a collection of items, said calculating being based on said similarity score.

446. A method according to claim 445 and also comprising calculating a gravity score (GS) for one item in a collection with respect to a set of items in that collection, each item having at least one descriptor.

447. A method according to claim 446 wherein calculating of said gravity score (GS) for a given item with respect to a given set of items employs said similarity metric calculated for each item pair that may be formed including said given item and another item in said set.

448. A method according to claim 446 wherein calculating of said gravity score (GS) for a given item with respect to a given set of items employs said commonality metric for each item pair calculated for each item pair that may be formed including the given item and another item in said set.

449. A method according to claim 434 and wherein a cluster quality metric CQM is calculated for a cluster and wherein said cluster is a selected set of items in a collection of items, each item having at least one descriptor.

450. A method according to claim 449 and wherein said cluster quality metric CQM represents a measure of the quality of differentiation between said cluster and the remaining body of information.

451. A method according to claim 449 and wherein said cluster quality metric CQM includes a function that increases as the cluster increasingly contains information that is substantially similar to the remaining body of the information in said cluster and diminishes as said cluster increasingly contains information that is substantially different from the remaining body of the information in said collection.

452. A method according to claim 434 and wherein an intra cluster gravity score ICGS is calculated based on said similarity score and wherein said intra cluster gravity score represents the similarity among the information items within said cluster.

453. A method according to claim 446 and wherein an intra cluster gravity score ICGS is calculated and wherein said intra cluster gravity score is equal to the total of said gravity scores for each item in said cluster with respect to all items inside said cluster in said collection divided by the number of items in said cluster.

454. A method according to claim 446 and wherein said ECGS is equal to the total of said gravity scores for each item in said cluster with respect to all items outside said cluster in said collection divided by the number of items in said cluster.

455. A method according to claim 449 and wherein said cluster quality metric CQM increases as an intra-cluster gravity score grows.

456. A method according to claim 449 and wherein said cluster quality metric for said cluster is increased by adding or removing items to or from a cluster.

457. A method according to claim 449 for creating a best cluster of items, the method involving creating a cluster, modifying said cluster, measuring said cluster quality metric CQM of the modified cluster and selecting said cluster having the highest CQM.

458. A method according to claim 434 and also comprising creating a structure of clusters, wherein a first cluster is a most preferred cluster within the collection of items and wherein a second cluster is a most preferred cluster within the first cluster.

459. A method according to claim 434 and also comprising creating a structure of clusters, wherein a first cluster is a most preferred cluster within the collection of items and wherein a second cluster is a most preferred cluster within the items not included in the first cluster.

460. A method according to claim 458 and wherein said most preferred cluster has the highest Cluster Quality Metric of all possible first clusters available for comparison.

461. A method according to claim 458 and wherein said structure of clusters is presented to the user as a hierarchical tree.

462. A method according to claim 458 and wherein a preferred cluster is identified within a collection of items, the method comprising:

selecting a group of candidate clusters, each cluster comprising a set of items having at least one descriptor;

calculating cluster quality metric CQM for all said clusters;

optionally enhancing each of said clusters; and selecting the cluster having the highest CQM.

463. A method according to claim 462 and wherein a collection of items is determined to include qualified item for enhancement of a cluster by addition to the cluster, the method comprising:

determining the qualified descriptors for each of said items in said collection;

determining the number of said qualified descriptors for said collection (NQDC) of items;

determining the number of said qualified descriptors for each said item in said collection of items (NQDI); and selecting all said items of the collection having said qualified descriptors (NQDI) of at least some minimum percentage of said number of qualified descriptors (NQDC) for said collection of said items.

464. A method according to claim 462 and wherein a collection of items is determined to include qualified item for enhancement of a cluster by removal from the cluster, the method comprising:

determining the qualified descriptors for each of said items in said collection;

determining the number of said qualified descriptors for said collection (NQDC) of items;

determining the number of said qualified descriptors for each said item in said collection of items (NQDI); and selecting all said items of the collection having said qualified descriptors (NQDI) of at least some maximum percentage of said number of qualified descriptors (NQDC) for said collection of said items.

465. A method according to claim 462 and wherein the enhancement of a cluster causes a re-definition of the list of qualified descriptors, thereby giving occasion to additional additions and removals of items.

466. A method according to claim 465 and wherein the process of cluster enhancement is repeated until no change is effected.

467. A method according to claim 465 and wherein the process of cluster enhancement is repeated until a set number of iterations have taken place.

468. A method according to claim 465 for finding a preferred cluster within a collection of items each having at least one descriptor, the method comprising:

identifying all the unique descriptors of the items of the collection;

ranking said identified descriptors according to their popularity in the collection;

selecting a "base item" as a first item of a "base cluster";

selecting a plurality of "comparison items", each said comparison item is considered to be a first item in a "comparison cluster"; and retaining said "base cluster" as the desired preferred cluster for the collection.

469. A method according to claim 468 and wherein said identified unique descriptors are the highly ranking descriptors and wherein descriptors that exist in many items of the collection of items are ranked above descriptors existing in few items of the collection.

470. A method according to claim 468 and also comprising:

selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

471. A method according to claim 470 and wherein identifying, marking, selecting and retaining may be repeated recursively, taking as the collection either the items of said base cluster, disregarding any descriptors common to all said items, or said items of the collection exclusive of said base cluster.

472. A method according to claim 468 and wherein a directory tree is created automatically for the results of a free text search.

473. A method according to claim 472 and wherein said directory tree is built generally instantaneously.

474. A method according to claim 472 and wherein said directory tree is organized, and the information items are sorted into the directory tree, based on a commonality metric that involves several terms.

475. A method according to claim 472 and wherein said directory tree is organized, and the information items are sorted into the directory tree, based on a commonality metric that involves a plurality of terms.

476. A method according to claim 472 and wherein said directory tree is organized, and the information items are sorted into the directory tree, in an iterative manner where information items are added or removed from clusters to eliminate insufficient or redundant clustering.

477. A method according to claim 472 and wherein further queries are performed in response to a user's request for a particular preferred cluster.

478. A method of organizing information comprising:

changing the population of clusters of information items, each item including at least one descriptor, during changing the population of the clusters:

calculating a similarity score S for first and second ones of said items, said calculating being carried out on selected descriptors among the descriptors of each item, said selected descriptors being qualified descriptors;

selecting said qualified descriptors according to a rule; and evaluating dynamically a metric of the cluster based on said similarity score, the metric of the cluster expressing at least whether the descriptors of the items the cluster have more in common with each other than they have in common with items outside of the cluster.

479. A method of organizing information according to claim 478 and wherein said metric is a commonality metric.

480. A method of organizing information according to claim 478 and wherein said metric is a similarity metric.

481. A method of organizing information according to claim 478 and wherein said metric is a non-commonality metric.

482. A method of organizing information according to claim 478 and wherein said metric is a non-similarity metric.

483. A method according to claim 478 and wherein said similarity score S is calculated for each descriptor in each item of a pair of items, by determining whether the same descriptor exists in both items of the pair.

484. A method according to claim 478 and wherein said similarity calculating is carried out on selected descriptors among the descriptors of each item, said selected descriptors being qualified descriptors.

485. A method according to claim 484 and wherein said qualified descriptors are selected according to a rule.

486. A method according to claim 478 and wherein calculating said similarity score includes assigning at least one of a match count and an unmatch count to a pair of items.

487. A method according to claim 486 and also comprising weighting at least one of said match count and said unmatch count.

488. A method according to claim 478 and wherein said metric includes a function which grows as commonality between said items in said cluster grows and diminishes as uncommonality between said items in said cluster grows.

489. A method according to claim 478 and, also comprising calculating a similarity metric for all possible item pairs in a collection of items, said calculating being based on said similarity score.

490. A method according to claim 489 and also comprising calculating a gravity score (GS) for one item in a collection with respect to a set of items in that collection, each item having at least one descriptor.

491. A method according to claim 490 wherein calculating of said gravity score (GS) for a given item with respect to a liven set of items employs said similarity metric calculated for each item pair that may be formed including said given item and another item in said set.

492. A method according to claim 490 wherein calculating of said gravity score (GS) for a given item with respect to a given set of items employs said commonality metric for each item pair calculated for each item pair that may be formed including the given item and another item in said set.

493. A method according to claim 478 and wherein a cluster quality metric CQM is calculated for a cluster and wherein said cluster is a selected set of items in a collection of items, each item having at least one descriptor.

494. A method according to claim 493 and wherein said cluster quality metric CQM represents a measure of the quality of differentiation between said cluster and the remaining body of information.

495. A method according to claim 493 and wherein said cluster quality metric CQM includes a function that increases as said cluster increasingly contains information that is substantially similar to the remaining body of the information in said cluster and diminishes as said cluster increasingly contains information that is substantially different from the remaining body of the information in said collection.

496. A method according to claim 478 and wherein an intra cluster gravity score ICGS is calculated based on said similarity score and wherein said intra cluster gravity score represents the similarity among the information items within said cluster.

497. A method according to claim 478 and wherein an extra cluster gravity score ECGS is calculated based on said similarity score and wherein said extra cluster gravity score represents the similarity between the information items within said cluster and information items outside said cluster.

498. A method according to claim 490 and wherein an intra cluster gravity score ICGS is calculated and wherein said ICGS is equal to the total of said gravity scores for each item in said cluster with respect to all items inside said cluster in said collection divided by the number of items in said cluster.

499. A method according to claim 490 and wherein an intra cluster gravity score ECGS is calculated and wherein said ECGS is equal to the total of said gravity scores for each item in said cluster with respect to all items outside said cluster in said collection divided by the number of items in the cluster.

500. A method according to claim 493 and wherein said cluster quality metric CQM increases as an intra cluster gravity score grows.

501. A method according to claim 493 and wherein said cluster quality metric for said cluster is increased by adding or removing items to or from said cluster.

502. A method according to claim 493 for creating a best cluster of items, the method involving creating a cluster, modifying the cluster, measuring the cluster quality metric CQM of the modified cluster and selecting the cluster having the highest CQM.

503. A method according to claim 478 and also comprising creating a structure of clusters, wherein a first cluster is a most preferred cluster within the collection of items and wherein a second cluster is a most preferred cluster within the first cluster.

504. A method according to claim 478 and also comprising creating a structure of clusters, wherein a first cluster is a most preferred cluster within the collection of items and wherein a second cluster is a most preferred cluster within the items not included in the first cluster.

505. A method according to claim 503 and wherein said most preferred cluster has the highest Cluster Quality Metric of all possible first clusters available for comparison.

506. A method according to claim 503 and wherein a structure of clusters is presented to the user as a hierarchical tree.

507. A method according to claim 503 and wherein a preferred cluster is identified within a collection of items, the method comprising:
selecting a group of candidate clusters, each cluster comprising a set of items having at least one descriptor;
calculating cluster quality metric CQM for all said clusters;
optionally enhancing each of said clusters; and
selecting the cluster having the highest CQM.

508. A method according to claim 507 and wherein a collection of items is determined to include qualified item for enhancement of a cluster by addition to the cluster, the method comprising:
determining the qualified descriptors for each of said items in said collection;
determining the number of said qualified descriptors for said collection (NQDC) of items;
determining the number of said qualified descriptors for each said item in said collection of items (NQDI); and
selecting all said items of the collection having said qualified descriptors (NQDI) of at least some minimum percentage of said number of qualified descriptors (NQDC) for said collection of said items.

509. A method according to claim 507 and wherein a collection of items is determined to include qualified item for enhancement of a cluster by removal from the cluster, the method comprising:
determining the qualified descriptors for each of said items in said collection;
determining the number of said qualified descriptors for said collection (NQDC) of items;
determining the number of said qualified descriptors for each said item in said collection of items (NQDI); and
selecting all said items of the collection having said qualified descriptors (NQDI) of at least some maximum percentage of said number of qualified descriptors (NQDC) for said collection of said items.

510. A method according to claim 507 and wherein the enhancement of a cluster causes a re-definition of the list of qualified descriptors, thereby giving occasion to additional additions and removals of items.

511. A method according to claim 510 and wherein the process of cluster enhancement is repeated until no change is effected.

512. A method according to claim 510 and wherein the process of cluster enhancement is repeated until a set number of iterations have taken place.

513. A method according to claim 510 for finding a preferred cluster within a collection of items each having at least one descriptor, the method comprising:
identifying all the unique descriptors of the items of the collection;
ranking said identified descriptors according to their popularity in the collection;
selecting a "base item" as a first item of a "base cluster";
selecting a plurality of "comparison items", each said comparison item is considered to be a first item in a "comparison cluster"; and
retaining said "base cluster" as the desired preferred cluster for the collection.

514. A method according to claim 513 and wherein said identified unique descriptors are the highly ranking descriptors and wherein descriptors that exist in many items of the collection of items are ranked above descriptors existing in few items of the collection.

515. A method according to claim 513 and also method comprising:
selecting a base cluster and a plurality of comparison clusters, each of these clusters having a single item, calculating a gravity score for each item of the collection with respect to said base cluster and with respect to each said comparison cluster, and adding each item to said cluster with respect to which it has the highest gravity score.

516. A method according to claim 515 and wherein identifying, marking, selecting and retaining may be repeated recursively, taking as the collection either the items of said base cluster, disregarding any descriptors common to all said items, or said items of the collection exclusive of said base cluster.

517. A method according to claim 513 and wherein a directory tree is created automatically for the results of a free text search.

518. A method according to claim 517 and wherein said directory tree is built generally instantaneously.

519. A method according to claim 517 and wherein said directory tree is organized, and the information items are sorted into the directory tree, based on a commonality metric that involves several terms.

520. A method according to claim 517 and wherein said directory tree is organized, and the information items are sorted into the directory tree, based on a commonality metric that involves a plurality of terms.

521. A method according to claim 517 and wherein said directory tree is organized, and the information items are sorted into the directory tree, in an iterative manner where information items are added or removed from clusters to eliminate insufficient or redundant clustering.

522. A method according to claim 517 and wherein further queries are performed in response to a user's request for a particular preferred cluster.

* * * * *

UNITED STATES PATENT AND TRADEMARK OFFICE
CERTIFICATE OF CORRECTION

PATENT NO. : 7,072,902 B2  Page 1 of 1
APPLICATION NO. : 10/308987
DATED : July 4, 2006
INVENTOR(S) : Pul Kleinberger et al.

It is certified that error appears in the above-identified patent and that said Letters Patent is hereby corrected as shown below:

Title Page; item (73);

Please add the Assignee:

-- Tzunami, Inc., New York, NY --.

Signed and Sealed this

Twenty-first Day of October, 2008

JON W. DUDAS
*Director of the United States Patent and Trademark Office*